United States Patent
Fujihara et al.

(10) Patent No.: US 9,727,525 B2
(45) Date of Patent: Aug. 8, 2017

(54) DATA EXCHANGE SYSTEM AND DATA EXCHANGE METHOD

(71) Applicant: SOPHIA CO., LTD., Tokyo (JP)

(72) Inventors: Mutsumi Fujihara, Kanagawa (JP); Yukio Fujimoto, Tokyo (JP)

(73) Assignee: SOPHIA CO., LTD., Tokyo (JP)

( * ) Notice: Subject to any disclaimer, the term of this patent is extended or adjusted under 35 U.S.C. 154(b) by 410 days.

(21) Appl. No.: 14/092,969

(22) Filed: Nov. 28, 2013

(65) Prior Publication Data
US 2014/0156859 A1 Jun. 5, 2014

(30) Foreign Application Priority Data

Nov. 30, 2012 (JP) ................................. 2012-262728

(51) Int. Cl.
*G06F 15/173* (2006.01)
*H04L 12/58* (2006.01)

(52) U.S. Cl.
CPC ........ *G06F 15/17306* (2013.01); *H04L 51/12* (2013.01)

(58) Field of Classification Search
CPC ........................... G06F 15/17306; H04L 51/12
See application file for complete search history.

(56) References Cited

U.S. PATENT DOCUMENTS

| | | | |
|---|---|---|---|
| 6,636,587 B1 | 10/2003 | Nagai et al. | |
| 7,912,960 B2 * | 3/2011 | Bansod | H04L 63/061 370/232 |
| 8,447,630 B2 * | 5/2013 | O'Brien | G06Q 20/02 705/3 |
| 9,160,568 B2 * | 10/2015 | Sargent | G06Q 10/10 |
| 2002/0019850 A1 | 2/2002 | Nakamura | |
| 2006/0053279 A1 * | 3/2006 | Coueignoux | H04L 12/585 713/154 |
| 2006/0195536 A1 | 8/2006 | Tsuboi et al. | |
| 2007/0174427 A1 | 7/2007 | Shigeeda et al. | |
| 2007/0263632 A1 | 11/2007 | Sobue et al. | |

(Continued)

FOREIGN PATENT DOCUMENTS

| | | |
|---|---|---|
| JP | 2003-108507 A | 4/2003 |
| JP | 3628030 B2 | 3/2005 |
| JP | 2006-236264 A | 9/2006 |

(Continued)

*Primary Examiner* — Philip Chea
*Assistant Examiner* — Robert B McAdams
(74) *Attorney, Agent, or Firm* — Brundidge & Stanger, P.C.

(57) ABSTRACT

Data exchange section 104 has a step of determining whether or not pairs of the transmission selecting conditions and reception selecting conditions satisfy a standard for exchanging, through a determined pair, data between a transmission user who corresponds to a transmission selecting condition in the determined pair and a reception user who corresponds to a reception selecting condition in the determined pair. Data exchange system 100 exchanges data satisfying both the transmission selecting condition and the reception selecting condition in the determined pair between the transmission user and the reception user, respectively corresponding to the transmission selecting condition and the reception selecting condition in the determined pair.

11 Claims, 24 Drawing Sheets

(56) References Cited

U.S. PATENT DOCUMENTS

2008/0189367 A1   8/2008  Okumura
2009/0013375 A1*  1/2009  MacIntosh ............ H04L 63/168
                                                            726/1

FOREIGN PATENT DOCUMENTS

| JP | 3980326 B2 | 9/2007 |
| JP | 2007-264730 A | 10/2007 |
| JP | 2008-191748 A | 8/2008 |
| JP | 2010-176449 A | 8/2010 |
| WO | 02/51079 A1 | 6/2002 |

* cited by examiner

FIG. 24

| TIME | SHOP | TOPIC | USER – MESSAGE # (ALIAS) | POINTS | COMMENT |
|---|---|---|---|---|---|
| 2012/6/1 10:05:30 | "CHINESE RESTAURANT: SHINJUKU WEST EXIT BRANCH" | RAMEN APPEARANCE | 7256-57 | 80 POINTS | PORK BONE BROTH SOUP LOOKS RICH, STIMULATING APPETITE |
| 2012/06/03 13:25:00 | "CHINESE RESTAURANT: SHINJUKU WEST EXIT BRANCH" | POT STICKER TASTE | 2954-38 | 60 POINTS | SKIN NOT CRISPY ENOUGH OK FILLING. NOT ENOUGH CABBAGE. |
| 2012/06/06 10:08:00 | "CHINESE RESTAURANT: SHINJUKU WEST EXIT BRANCH" | POT STICKER TASTE | 6141-86 | 75 POINTS | JUICY FILLING WITH RICH MEAT CONTENT. NO GARLIC. 60 POINTS BY 2954-38 MAY BE TOO HARSH |

FIG. 25

| TIME | SHOP | TOPIC | USER – MESSAGE # (ALIAS) | POINTS | COMMENT |
|---|---|---|---|---|---|
| 2012/01/01 00:00:00 | "CHINESE RESTAURANT: SHINJUKU WEST EXIT BRANCH" | RAMEN APPEARANCE RAMEN TASTE | | | |

FIG. 26

| TIME | SHOP | TOPIC | USER – MESSAGE # (ALIAS) | POINTS | COMMENT |
|---|---|---|---|---|---|
| | "RAMEN PROFESSIONALS" | RAMEN TASTE | | 30 POINTS | [TASTES BAD TASTES TERRIBLE] NOT [TASTY] |

DATA EXCHANGE SYSTEM AND DATA EXCHANGE METHOD

CROSS REFERENCE TO RELATED APPLICATIONS

This application is entitled and claims the benefit of Japanese Patent Application No. 2012-262728, filed on Nov. 30, 2012, the disclosure of which including the specification, drawings and abstract is incorporated herein by reference in its entirety.

TECHNICAL FIELD

The present invention relates to a data exchange system and a data exchange method capable of selecting the most suitable data exchange partner when exchanging data on a network.

BACKGROUND ART

Systems using an e-mail system and the Internet are known as common systems for data exchange.

In the conventional system, a transmission user exchanges data by individually specifying the reception partner by an address or a user identifier when exchanging data through an e-mail system. When the address or the user identifier is already known, the reception user also receives unnecessary messages from an unspecified transmission user.

In a website or a discussion board on the Internet, the transmission user can receive data owned by an unspecified number of transmission users, without specifying a communication partner individually each time. However, since there is no way to limit reception users accessible to data items uploaded on the website by the transmission user, all of data items uploaded on a website by the transmission user are treated as data items to be transmitted, and are open to an unspecified number of reception users.

As described above, the conventional technology is inconvenient to a transmission user in that the transmission user cannot provide data only to unspecified reception users who satisfy conditions preferred by the transmission user himself. In addition, the conventional technology is inconvenient to the reception user in that a data item necessary for the reception user cannot be received only from an unspecified transmission user who satisfies conditions preferred by the reception user.

The following techniques are presented as techniques for partially solving the problems.

PTL 1 discloses a technique in a system for sending e-mail after specifying a group address based on a mailing list, the technique being for automatically determining an address of a partner satisfying a predetermined condition when sending e-mail as a member belonging to a group address, and sending the e-mail.

PTL 2 discloses a system for collectively managing whether or not personal information can be disclosed by a disclosure route managing server as a method for controlling disclosure by disclosing information only when a right to disclose personal information exists, in order to prevent the personal information from leaking.

Conventionally, documents and data with keywords and classifications assigned are accumulated, and the documents and the data are selected for a search by specifying a keyword and a classification by a searcher. With this, unspecified searchers may be limited by a keyword or a classification.

CITATION LIST

Patent Literature

PTL 1
Japanese Patent Application Laid-Open No. 2003-108507
PTL 2
Japanese Patent Application Laid-Open No. 2008-191748

SUMMARY OF INVENTION

Technical Problem

With the technique according to PTL 1, although the transmission user can specify a condition that a reception user who is a member of a group address should satisfy, the reception user cannot specify a condition that the transmission user should satisfy. The condition can be used for specifying only a member belonging to a group address, not an unspecified user.

According to the technique disclosed in PTL 2, it is necessary for a disclosure route management server to update a list of servers included in a disclosure range in real time each time a disclosure range of personal information is updated. In addition, it is necessary for the disclosure route management server to find out whether or not a server of each vendor is included in a disclosure range regarding the personal information.

In the conventional technique for assigning a plurality of keywords and classifications to documents and data, there is a problem that it takes a considerable effort to assign keywords and classifications to each document and data in advance when there is a large amount of documents and data, and that a flexible response to changes on a standard for assigning keywords and classifications is difficult. There is another problem in the conventional technique that the assigned keywords and classifications do not necessarily reflect the details of the documents and data precisely.

It is an object of the present invention to provide a data exchange system and data exchange method that allow each user to exchange only data satisfying a condition set by the user with only users satisfying a condition set by the user, without disclosing the user identification information to another user, when exchanging data with unspecified users.

Solution to Problem

A data exchange system according to an aspect of the present invention is a data exchange system which is used for exchanging data between a transmission user who transmits the data and a reception user who receives the data, and in which a transmission selecting condition is a condition set by the transmission user for selecting a data item to be transmitted, and a reception selecting condition is a condition set by the reception user for selecting a data item to be received, the data exchange system including a data exchange section having a step of selecting, from pairs of the transmission selecting conditions and the reception selecting conditions, where each pair includes a transmission selecting condition and a reception selecting condition, a pair of a transmission selecting condition and a reception selecting condition that satisfy a predetermined standard, in which the data exchange section exchanges a data item satisfying both the transmission selecting condition and the reception selecting condition in the selected pair between a transmission user and a reception user corresponding to the transmission selecting condition and the reception selecting condition in the selected pair.

A data exchange method according to an aspect of the present invention is a data exchange method which is used for exchanging data between a transmission user who transmits data and a reception user who receives data, and in which a transmission selecting condition is a condition set by the transmission user for selecting a data item to be transmitted, and a reception selecting condition is a condition set by the reception user for selecting a data item to be received, the data exchange method including: a step of selecting, from pairs of the transmission selecting conditions and the reception selecting conditions, where each pair includes a transmission selecting condition and a reception selecting condition, a pair of a transmission selecting condition and a reception selecting condition that satisfy a predetermined standard; and a step of exchanging a data item satisfying both the transmission selecting condition and the reception selecting condition in the selected pair between a transmission user and a reception user corresponding to the transmission selecting condition and the reception selecting condition in the selected pair.

Advantageous Effects of Invention

According to the present invention, the transmission user and the reception user who exchange data specify conditions for selecting data items to be transmitted/received as a reception selecting condition and the transmission selecting condition. Data items satisfying both of the conditions are exchanged only when the two conditions satisfy a separately-defined standard for a data exchange between the transmission user and the reception user through the conditions. With this, when exchanging data between unspecified users, each user can exchange only data items matching a condition set by the user himself, without disclosing user identification of the user to another user.

Furthermore, according to the present invention, conditions that should be mutually satisfied between the transmission user and the reception user for granting the execution of data exchange are specified as a transmission granting condition and a reception granting condition, and data is exchanged between a transmission user and a reception user only with a partner who satisfies the two conditions at the same time. With this, when exchanging data between unspecified users, each user can exchange data with a partner satisfying a condition set by the user.

BRIEF DESCRIPTION OF DRAWINGS

The present invention will become more fully understood from the detailed description given herein below and the appended drawings which are given by way of illustration only, and thus are not intended as a definition of the limits of the present invention, and wherein:

FIG. 24 illustrates an example of a message in Example 1 of a data exchange system according to the present invention;

FIG. 25 illustrates an example of a data sequence in Example 1 of a data exchange system according to the present invention; and FIG. 26 illustrates an example of a message in Example 1 of a data exchange system according to the present invention.

DESCRIPTION OF EMBODIMENTS

Figure 1:
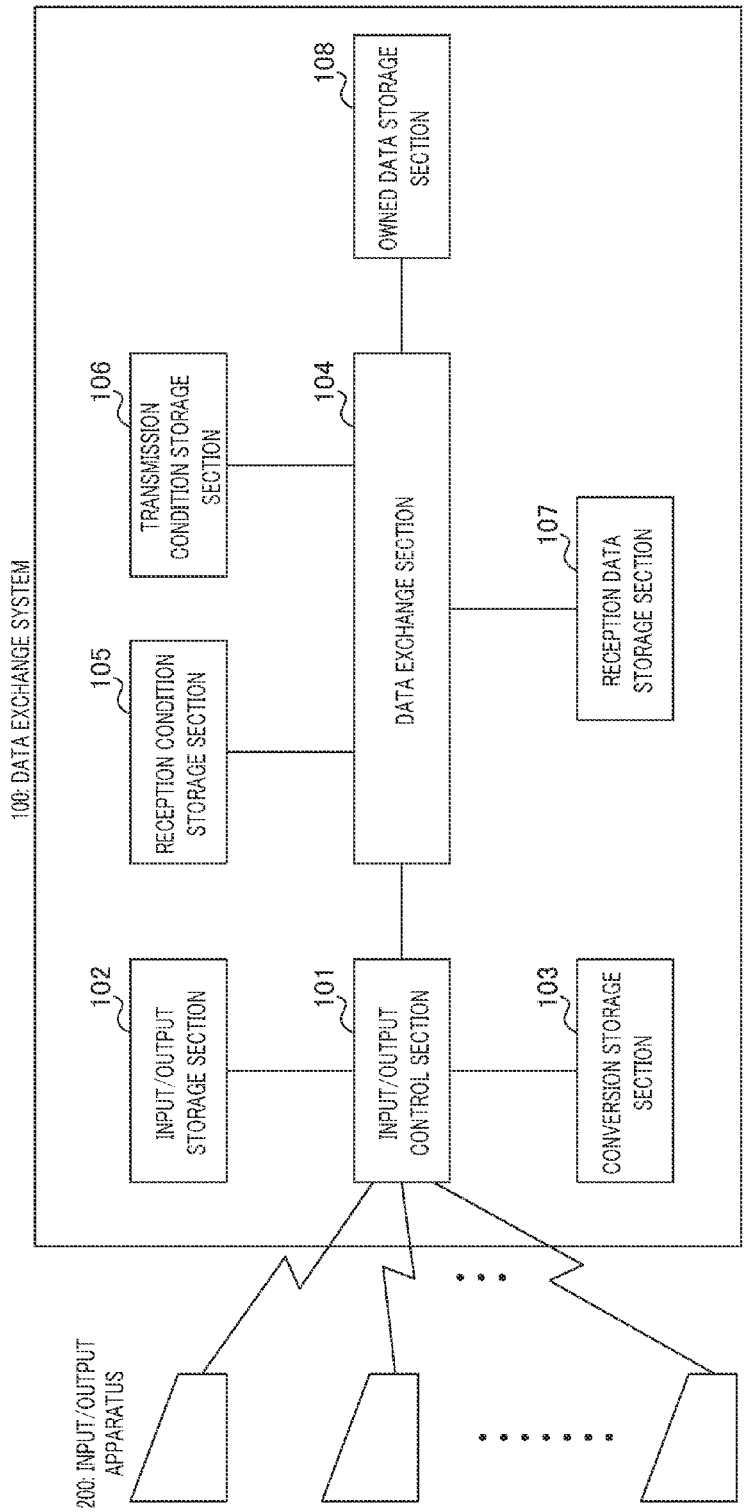
FIG. 1 is a functional block diagram illustrating components of a data exchange system according to the present invention.

Embodiments of the present invention will be described in detail as follows with reference to the attached drawings.

DEFINITION OF TERMS

First, the following is the description of terms and concepts used in embodiments of the present invention. Functions of a data exchange system according to the present invention (hereafter referred to as "the system") will be described as well.

(1) "User, Owner User, Transmission User, Reception User"

The system allows a plurality of users to exchange data. In the system, "user" refers to a uniquely identified user, and corresponds to an external user using the system in a one-to-one correspondence. Stated differently, the system presumes that no user uses the system using false identities of a plurality of users.

A user owning data is referred to as an "owner user" of the data. When the data exchange is performed or when there is a possibility of the data exchange, the users are referred to as a "transmission user" and a "reception user" for clearly describing their roles. The "transmission user" refers to a user owning the data, and the "reception user" refers to a user receiving the data disclosed. When the data is actually handed over to the reception user, the reception user "received the data", and the transmission user who owns the data "transmitted the data." Alternatively, this operation may also be referred to as "data transmission/reception is performed" from the transmission user to the reception user, or "data exchange is performed" between the transmission user and the reception user.

Note that, in the system, the user is represented by an identifier such as user identification information or a user ID unique to the user. In the following description, the term "user" refers to an "identifier representing the user" unless otherwise noted.

(2) Regarding "Data"

In this specification, a data item consisting of a unit for an exchange between the users through the system may be referred to as "data". A data item is owned by at least one user. The data exchange by the system is performed by a disclosure of the data to a user other than an owner user of the data.

To the reception user, disclosure of the data to the reception user is reception of the data, and to the owner user (transmission user), the disclosure is transmission of the data. To put it differently, the data transmission/reception is performed between the transmission user and the reception user, and thus the data is exchanged between the transmission user and the reception user.

Note that, in the system, the data is collectively processed with information on the owner user, which will be described later. However, user identification information for identifying the owner user (user) is not disclosed to another user.

(3) Regarding "Reception Selecting Condition and Transmission Selecting Condition"

The data exchange according to the system is performed by selecting data items matching conditions set by each user and transmitting/receiving data items for each condition. In this specification, a condition set by each reception user for selecting the reception data item is referred to as a "reception selecting condition". Similarly, a condition set by each transmission user for selecting transmitting data is referred to as a "transmission selecting condition".

As the data exchange in the system, only data satisfying the pair of the reception selecting condition and the transmission selecting condition may be exchanged between the transmission user and the reception user through the conditions. In the system, the transmission/reception is performed between users setting the conditions only when both the reception selecting condition and the transmission selecting condition satisfy a standard defined separately for data exchange between the transmission user and the reception user through the conditions. With this, the data to be transmitted/received is selected, and the users transmitting/receiving data is selected as well. Note that, in the following description, the reception selecting condition and the transmission selecting condition are described as "connectable" when the reception selecting condition and the transmission selecting condition satisfy the standard.

Note that, in the present invention, a possibility that a data item satisfying both of the conditions exists (both of the conditions are not exclusive to each other) is a requirement for the reception selecting condition and the transmission selecting condition to be "connectable".

In the present invention, the standard for determining whether the conditions are "connectable" may be any standard sufficient for an objective determination, and may be freely set in Embodiments. The reception user and the transmission user may set the reception selecting condition and the transmission selecting condition in consideration of the standard in Embodiment.

Note that, the standard on whether or not the condition is "connectable" is not limited to a standard regarding a group of data items selected by the reception selecting condition and a group of data items selected by the transmission selecting condition. For example, in Embodiment where the conditions are specified by a sequence of a group of keywords that should be included in a data item, a standard which determines a reception selecting condition and a transmission selecting condition indicating "match in a keyword at the beginning of both conditions (keyword sequence)" as connectable may be adopted. This standard is based on an assumption and expectation that a keyword that is considered as the most important by a user who set the condition is positioned at the beginning of the sequence. In this case, even if the set of keywords, that is, the group of data items to be selected is identical, a reception selecting condition and a transmission selecting condition are not determined as "connectable" when their beginning keywords are not identical.

(4) Regarding "Reception Granting Condition and Transmission Granting Condition"

In this Specification, a condition defined by each reception user for defining, for each reception selecting condition, a transmission user who is allowed to transmit the data satisfying the reception selecting condition is referred to as a "reception granting condition". Even if a data item satisfies the reception selecting condition and the transmission selecting condition and is held by a transmission user who set a transmission selecting condition connectable to the reception selecting condition, the data item from a transmission user who does not satisfy the "reception granting condition" assigned to the reception selecting condition of the reception user is not received.

The reception granting condition is a condition regarding a given data item owned by the transmission user. More specifically, the reception granting condition is a condition that must be satisfied by a transmission user who sets a transmission selecting condition connectable to a reception selecting condition associated with the reception granting condition, and who is to transmit a data item satisfying the transmission selecting condition and the reception selecting condition to a reception user who sets the reception selecting condition.

A condition for defining, by a transmission user, a reception user to allow reception of a data item satisfying the transmission selecting condition for each transmission selecting condition is referred to as a "transmission granting condition". Even if a data item held by the transmission user satisfies the reception selecting condition and the transmission selecting condition, the data item is not transmitted to a reception user who does not satisfy the "transmission granting condition" assigned to the transmission selecting condition of the transmission user.

The transmission granting condition is a condition regarding a given data item owned by the reception user. More specifically, the transmission granting condition is a condition that must be satisfied by a reception user who set a reception selecting condition connectable to the a transmission selecting condition associated with the transmission granting condition, and who is to receive, from a transmission user who sets the transmission selecting condition, a data item satisfying the reception selecting condition and the transmission selecting condition.

(5) Regarding "Reception Data"

A data item received satisfying the reception selecting condition (and the reception granting condition) of each reception user, and the transmission selecting condition (and the transmission granting condition) of each transmission user is referred to as "reception data" associated with the reception user and the reception selecting condition (and the reception granting condition).

(6) Regarding "Data Transmission/Reception and Data Exchange"

"Performing data transmission/reception" or "data exchange" in the system actually means associating data items with the reception user and the reception selecting condition (and reception granting condition) as the reception data. In this case, the data item is associated with the transmission user and a transmission selecting condition (and a transmission granting condition) connectable to the reception selecting condition. Actual data disclosure to the reception user may be performed at any time after the association is completed, as long as there is no change on the data or conditions contradicting the association.

When exchanging data, each data item is associated with a reception user, a transmission user, a reception selecting condition, a transmission selecting condition, a reception granting condition, and a transmission granting condition.

There is a case where the reception data should no longer be received due to changes in the reception data, and data owned by the transmission user and the reception user, or changes in a reception selecting condition, a transmission selecting condition, a reception granting condition, and a transmission granting condition. In this case, it is preferable that the association among reception data, a reception user, and a reception selecting condition (and a reception granting condition) is terminated, and the data is removed from the receiving data. When the "real-time" transmission/reception described above is not performed, and in the case that a reception user makes a request, the received data is then temporarily regenerated and then is discarded after being viewed. To view a generated data item that has been updated, the user will have to request for the reception of the updated data.

In this system, when data items owned by the transmission user and the reception user are fixed, and a reception selecting condition, a transmission selecting condition, a reception granting condition, and a transmission granting condition are set for each reception user and each transmission user, a user "capable of" transmitting/receiving each data item is theoretically determined at that point in time (state).

The data exchange method according to the present invention selects a data item to be actually transmitted/received for disclosing the data item to the reception user (changing the state of the data item to a state actually capable of disclosure) from among the transmission/reception that are theoretically available. To put it differently, the system is capable of determining and listing transmission/reception to be performed according to a request for data exchange (command) from among data the transmission/reception that are theoretically available described above.

Types of commands and ranges of data transmission/reception vary depending on Embodiment. Accordingly, only one data transmission/reception may be selected, and a command listing all of the available transmission/reception may be possible.

Furthermore, a user issuing a command is not limited in this system. A reception user, a transmission user, or a third party may issue a command in the system whenever the state described above (data and each condition) is satisfied. For example, the system itself may regularly issue a command, and exchange (newest) data at that point in time.

(7) Regarding "Alias"

As described above, when transmission/reception is performed, association regarding possibility of transmission/reception among the reception user, the reception selecting condition, the reception granting condition, the transmission user, the transmission selecting condition, the transmission granting condition, and the reception data is checked. Accordingly, the transmission user of each reception data item can be identified in the system. Reception data items owned by the same transmission user are displayed as data owned by one user, distinguished from the other reception data items.

In the system, each reception data item is disclosed to the reception user after assigning an alias distinguishing the transmission user to another user instead of the identification information of the transmission user so as to communicate the distinction to the reception user, without disclosing identification information of the transmission user to the reception user. Furthermore, when the user identification information is included in the content of the reception data item, for example, when a user ID of the transmission user is included in the text data in the system, the reception data item is displayed after the user identification information and the user ID are converted to an alias assigned to distinguish the user. With this, even if the reception data item includes the user identification information, the system does not disclose the user identification information, and can disclose user identity information including information on data owned by the user with the reception data item.

The system provides a function displaying the user identity information including the information on the data owned by the user without disclosing the user identification information.

Provided Function

The system may be regarded as a type of database system for a specific user to search for data owned by another user. Features of functions of the system will be described from viewpoints of both a database system and a data exchange system.

(1) First Feature Function

The first feature function of the system is that each transmission user sets a transmission selecting condition, and each reception user sets a reception selecting condition. With this, each user selects the data items to be transmitted/received, and selects a partner (user) for transmission/reception. In the system, only data items satisfying both a transmission selecting condition and a reception selecting connection are transmitted/received between a transmission user and a reception user who set the transmission selecting condition and the reception selecting condition that are connectable.

The reception selecting condition and the transmission selecting condition plays similar roles to a session (ID), a connection (ID), or a port (ID) which is implementation of the protocols, upon selecting a communication partner. However, no function is implemented in the session, the connection, or the port themselves for limiting data to be transferred.

(2) Second Feature Function

The second feature function of the system is as follows: when attempting to exchange a data item satisfying a certain condition (connectable transmission selecting condition and reception selecting condition) between an unspecified transmission user and an unspecified reception user, communication partners are mutually selected by setting a transmission granting condition or a reception granting condition by each user.

The reception data is a type of view displaying a search result. A condition for determining a data item to be disclosed as a reception data item, that is, a search condition for generating a view includes a reception selecting condition and a reception granting condition set with regard to a reception user who browses the view, and a transmission selecting condition and a transmission granting condition set with regard to a transmission user who owns the data.

Basic conditions for selecting a data item in one view are a reception selecting condition and a transmission selecting condition that are connectable to each other. Accordingly, conditions for determining whether the data can be transmitted/received may be the following conditions; two selecting conditions that are connectable and a reception granting condition or a transmission granting condition.

The reception user does not receive a data item from a transmission user who does not satisfy the transmission granting condition set by the transmission user, even if the data item satisfies both a reception selecting condition and a transmission selecting condition that are connectable to each other. Furthermore, even if a data item satisfies a reception selecting condition and a transmission selecting condition that are connectable to each other, the transmission user does not transmit the data item to a reception user who does not satisfy the reception granting condition set by the reception user.

(3) Third Feature Function

Data and owner user information of the data item (information representing a user owning the data) are disclosed by a view. The third feature function of the system is to disclose the owner user information with the data item, without disclosing identification information of the owner user. The disclosure of the owner user information is to distinguish and disclose data items owned by the same user from data items owned by another user.

In the system, an identifier of each transmission (owner) user for each data item is converted to an alias assigned to a user only for disclosing the owner user information before outputting the data item. When the data item includes a user identifier, the user identifier is also converted into an alias. Alternatively, if a newly registered data includes an alias, the alias is converted into its corresponding user identifier and the modified data is registered.

Note that, with regard to each data item output, data items owned by the same user may be treated collectively, distinguished from data items owned by another user, if only difference in the owner (transmission) user is disclosed or used for calculation.

Note that, the present invention relates to methods for communication and data search, and is not limited to a specific feature of data items to be processed and conditions. Accordingly, in the following description, Embodiments composed of generic concepts unrelated to specific features of the data to be processed and the conditions will be described first. Subsequently, in Example in which Embodiments are applied as specific data items and conditions, technical features of the present invention will be described while applying specific data and condition.

Embodiment

Embodiment describing an example of the present invention in a generic concept will be described with reference to the drawings.

Note that, in the following description, information record represented as information input/output between sections and stored in each storage section (referred to as "data item") is represented by corresponding information items segmented by "," (comma), and surrounded by a sign "[" and a sign "]". For example, an information record in which the owner user is associated with the data item is represented as [owner user, data]. An information record in which five information items, that is, a reception user, a reception selecting condition, a transmission user, a transmission selecting condition, and a data item are associated is represented as [reception user, reception selecting condition, transmission user, transmission selecting condition, data].

Furthermore, in the following description, similar expressions will be used for representing a set of information items in a part of an information record. For example, a set of a transmission user and a transmission selecting condition in an information record including the five information items described above are represented as [transmission user, transmission selecting condition].

Note that, in the following description, a part of information items in an information record may be represented as a replaced name representing a specific value or a group of specific values for the information record having a configuration of information items clearly indicated by context. For example, [owner user, data] in which the owner user represents a specific transmission user may be represented as [transmission user, data].

FIG. 1 is a functional block diagram illustrating components of a data exchange system (the system) according to the embodiment. System 100 performs data communication with a plurality of input/output apparatuses 200.

System 100 processes a command instructing one of the following operations provided from input/output apparatus 200 along with an information record including information necessary for processing, and displays data on predetermined input/output apparatus 200, or stops the display of data.

(1) Selection Receiving Operation

In the selection receiving operation, system 100 determines, among the data owned by a transmission user who sets a transmission selecting condition connectable to a specified reception selecting condition and who satisfies the reception granting condition assigned to the reception selecting condition and who has a transmission granting condition assigned to the transmission selecting condition satisfied by a reception user who set the reception selecting condition, a data item satisfying both the transmission selecting condition and the reception selecting condition as a reception data item associating with the reception selecting condition.

(2) Reception Condition Removing Operation

In the reception condition removing operation, system 100 removes the data that falls under the reception data selection condition from the reception data when system 100 removes from the storage a specified selecting condition and the reception granting condition assigned thereto that were specified by a reception user.

(3) Selection Transmitting Operation

In the selection transmitting operation, system 100 determines, among data items owned by the transmission user, a data item satisfying both the transmission selecting condition and the reception selecting condition associated with the reception selecting condition of a reception user who sets a reception selecting condition connectable to the specified transmission selecting condition, satisfies the transmission granting condition assigned to the transmission selecting condition, and has a reception granting condition assigned to the reception selecting condition satisfied by the transmission user who set the transmission selecting condition as the reception data item.

Note that, when transmitting data with a data item specified, the transmitting operation above may be limited to "specified data" in a part of "data owned by the transmission user", with every transmission selecting condition satisfied by the specified data item and set by the owned user of the specified data item. Since the specified data item is included in "data owned by the transmission user", the transmission operation is performed nonetheless, even if the data item is specified.

(4) Transmission Condition Removing Operation

In the transmission condition removing operation, system 100 removes a transmission selecting condition specified by a specified transmission user and a transmission granting condition assigned to the transmission selecting condition from the storage, and removes the data item of the transmission user that was treated as the reception data item satisfying the reception selection condition connectable to the transmission selecting condition from the reception data.

(5) Data Adding Operation

In the data adding operation, system 100 not only adds the specified data item to the storage as a data item owned by the specified transmission (owner) user, and associates only data items owned by the transmission user available for transmission/reception in a state after the data item is added with each reception selecting condition that is connectable to the transmission selecting condition of the transmission user and determine the associated data items as a reception data item. Note that, in the operation for adding data items, a selection receiving operation is performed for each reception selecting condition of the transmission user, and only data items available for transmission/reception by the transmission user as the reception user in a state after the data item is added is determined as the reception data item.

(6) Data Removing Operation

In the data removing operation, system 100 removes a specified data item from the storage of the data item of the specified transmission (owner) user, associates, with a reception selecting condition connectable to each transmission selecting condition of the transmission user, only data items owned by the transmission user available for transmission/reception in a state after the data item is removed, and determines the associated data item as the reception data item. Note that, in the operation for removing data items, a selection receiving operation is performed for each reception selecting condition of the transmission user, and only data items available for transmission/reception by the transmission user as the reception user in a state after the data item is removed is determined as the reception data item.

[Reception selecting condition, reception granting condition] and [transmission selecting condition, transmission granting condition] provided along with the selection receiving operation and the selection transmitting operation are stored in system 100, and used for future transmission/reception operations. The selection receiving operation and the selection transmitting operation are a reception selecting condition adding operation and a transmission selecting condition adding operation in that sense, respectively.

In the system, a user identifier is used for identifying each user. In the operations described above, a user identifier for identifying a transmission user is not output when outputting the transmission user and the data item to the reception user, the user identifier is converted into an alias, and the alias is used for the output. Stated differently, a user identifier representing the same user is converted into an alias distinguished from another user. When a data item includes a user identifier, the user identifier is also converted into an alias. When registering a data item, an alias included in the data item is converted to a corresponding user identifier if the alias is included in a data item.

In the operations, when a data item including a reception selecting condition and a transmission selecting condition other than [reception user, reception selecting condition] and [transmission user, transmission selecting condition] that are already stored is input, system 100 stores the conditions. The storing operation changes transmission/reception available in system 100.

With regard to [reception user, reception selecting condition] associated with a reception data item having a possibility of a change before and after the change in the available transmission/reception, system 100 associates only data items available for transmission/reception in the new state with the reception selecting condition and causes input/output apparatus 200 (reception user) to display the data item.

In addition, in the reception condition removing operation and the transmission condition removing operation, system 100 removes [reception selecting condition, reception granting condition] and [transmission selecting condition, transmission granting condition] stored at the time of the prior selection receiving operation and the prior selection transmitting operation. System 100 cancels transmission/reception performed via the conditions, together with the removing process, and associates, only the data available for transmission/reception with the reception selecting condition when the conditions are not set, and causes input/output apparatus 200 (reception user) to display the data item.

The change in the state of system 100 along with the addition and removal of the data item affects transmission/ reception available in system 100 not only as the change in the data to be transmitted/received, but also as the change as to whether the reception granting condition and the transmission granting condition are satisfied. The influence may affect all of the transmission selecting conditions and all of the reception selecting conditions of the owner user of the added or removed data item, and further affect the reception granting condition of the reception selecting condition connectable to the transmission selecting condition, and the transmission granting condition of the transmission selecting condition connectable to the reception selecting condition. In view of these points, the data adding operation and the data removing operation are for associating only data items available for transmission/reception in a new state in a transmission selecting condition and a reception selecting condition of the owned data items of the data after the addition and removal of data item with the reception selecting condition, and displaying only the associated data item on input/output apparatus 200 (reception user).

Input/output apparatus 200 outputs a command for instructing each operation and information items necessary for each operation to system 100, and displays [reception user, reception selecting condition, transmission user, transmission selecting condition, data] output from system 100 for each [reception user, reception selecting condition] as the result of processing.

Input/output apparatus 200 stops displaying reception data [reception user, reception selecting condition, transmission user, transmission selecting condition, data] having the reception user and the reception selecting condition matching [reception user, reception selecting condition] output from system 100 with an instruction for removing a data item.

The following is a list of operations instructed by input/output apparatus 200 and information items necessary for processes associated with the operations. Selection receiving operation: [reception user, reception selecting condition, reception granting condition, input/output apparatus 200]

Reception condition removing operation: [reception user, reception selecting condition, input/output apparatus 200]
Selection transmitting operation: [transmission user, transmission selecting condition, transmission granting condition]
Transmission condition removing operation: [transmission user, transmission selecting condition]
Data adding operation: [owner user, data]
Data removing operation: [owner user, data]

Functions of sections in system 100 will be described. As illustrated in FIG. 1, system 100 includes input/output control section 101, input/output storage section 102, conversion storage section 103, data exchange section 104, reception condition storage section 105, transmission condition storage section 106, reception data storage section 107, and owned data storage section 108 as main components. In system 100, the functions of operations and identifier conversion are implemented by selectively using the functions provided by the following sections.

Through the operations, system 100 associates all of data items available for transmission/reception with all of (reception user, reception selecting condition) set to generate reception data items, and causes input/output apparatus 200 (reception user) to display the reception data items. Stated differently, system 100 according to Embodiment performs all of the available transmission/reception in real time and presents the results to the reception user. System 100 performs processing necessary for corresponding operations in data exchange section 104 and input/output control section 101 using the functions provided to the storage sections.

[Input/Output Control Section 101]

Input/output control section 101 acts as an interface with input/output apparatus 200, processes a command transmitted from input/output apparatus 200, and outputs the processing result to input/output apparatus 200.

Input/output control section 101 determines a type of the command, upon an input of a command and an information record from input/output apparatus 200, and performs a selection receiving command process, a reception condition removing command process, a selection transmitting command process, a transmission condition removing command process, a data adding command process, or a data removing command process, according to the determination.

Input/output control section 101 performs each of the processing by executing functions provided in conversion storage section 103, input/output storage section 102, and instructing data exchange section 104 to perform a process in an operation corresponding to each command. Note that, details of process flow performed by input/output control section 101 will be described later.

[Input/Output Storage Section 102]

Input/output storage section 102 stores an information record [reception user, reception selecting condition, input/output apparatus 200] including a correspondence between input/output apparatus 200 and [reception user, reception selecting condition] indicating a classification of the data to be displayed. Input/output storage section 102 includes the following functions concerning the information records.

(1) Reception Display Adding Function

Input/output storage section 102 is capable of adding the input [reception user, reception selecting condition, input/output apparatus 200] to the storage.

(2) Reception Display Removing Function

Input/output storage section 102 is capable of removing an information record matching the input [reception user, reception selecting condition, input/output apparatus 200] from the storage.

(3) Reception Input/Output Apparatus Searching Function
Input/output storage section 102 is capable of outputting [reception user, reception selecting condition, input/output apparatus] having [reception user, reception selecting condition] matching [reception user, reception selecting condition] input.

[Conversion Storage Section 103]

Conversion storage section 103 stores an information record [reception user, transmission user, alias] including correspondence between a transmission user (identifier) and an alias for each user in order to convert the user (identifier) into an alias. Conversion storage section 103 includes the following functions concerning the information records.

(1) Alias Searching Function

Conversion storage section 103 is capable of outputting [reception user, transmission user, alias] having [reception user, transmission user] matching [reception user, transmission user] input.

(2) Transmission User Searching Function

Conversion storage section 103 is capable of outputting [reception user, transmission user, alias] having [reception user, alias] matching [reception user, alias] input.

[Data Exchange Section 104]

Data exchange section 104 receives an instruction from input/output control section 101, and performs one of a selection receiving process, a reception condition removing process, a selection transmitting process, a transmission condition removing process, a data adding process, and a data removing process.

Data exchange section 104 performs processes by executing functions provided for reception condition storage section 105, transmission condition storage section 106, reception data storage section 107, and owned data storage section 108. Note that, details of the process flow performed by data exchange section 104 will be described later.

[Reception Condition Storage Section 105]

Reception condition storage section 105 stores an information record [reception user, reception selecting condition, reception granting condition] associating a set of reception user and a reception selecting condition and a reception granting condition assigned thereto. Reception condition storage section 105 includes functions related to a stored information record.

(1) Reception Condition Removing Function

Reception condition storage section 105 is capable of removing, from the storage, [reception user, reception selecting condition, reception granting condition] having [reception user, reception selecting condition] matching [reception user, reception selecting condition] input.

(2) Reception Condition Adding Function

Reception condition storage section 105 is capable of adding, to the storage, [reception user, reception selecting condition, reception granting condition] that is provided.

(3) Reception Selecting Condition Searching Function

Reception condition storage section 105 is capable of listing all of [reception user, reception selecting condition, reception granting condition] having a reception selecting condition connectable to a transmission selecting condition input.

(4) Reception Condition User Searching Function

Reception condition storage section 105 is capable of listing all of [reception user, reception selecting condition, reception granting condition] having a reception user matching the reception user input.

[Transmission Condition Storage Section 106]

Transmission condition storage section 106 stores an information record associating a set of transmission user and a transmission selecting condition, and a transmission granting condition attached thereto [transmission user, transmission selecting condition, transmission granting condition]. Transmission condition storage section 106 includes functions related to a stored information record.

(1) Transmission Condition Removing Function

Transmission condition storage section 106 is capable of removing, from the storage, [transmission user, transmission selecting condition, transmission granting condition] having [transmission user, transmission selecting condition] matching [transmission user, transmission selecting condition] input.

(2) Transmission Condition Adding Function

Transmission condition storage section 106 is capable of adding, to the storage, [transmission user, transmission selecting condition, transmission granting condition] input.

(3) Transmission Selecting Condition Searching Function

Transmission condition storage section 106 is capable of listing all of [transmission user, transmission selecting condition, transmission granting condition] having a transmission selecting condition connectable to the input reception selecting condition.

(4) Transmission Condition User Searching Function

Transmission condition storage section 106 is capable of listing all of [transmission user, transmission selecting condition, transmission granting condition] having a transmission user matching the transmission user input.

[Reception Data Storage Section 107]

Reception data storage section 107 stores an information record [reception user, reception selecting condition, transmission user, transmission selecting condition, data] in which a set of a transmission user, a transmission selecting condition, and a data item are associated with a set of a reception user who set a reception selecting condition connectable to the transmission selecting condition and the reception selecting condition. Reception data storage section 107 includes the following functions related to a stored information record.

(1) Reception Data Adding Function

Reception data storage section 107 is capable of adding input [reception user, reception selecting condition, transmission user, transmission selecting condition, data] to the storage.

(2) Reception Data Reception Selecting Condition Removing Function

Reception data storage section 107 is capable of removing, from the storage content, all of [reception user, reception selecting condition, transmission user, transmission selecting condition, data] having [reception user, reception selecting condition] matching [reception user, reception selecting condition] input.

(3) Reception Data Transmission Condition Specifying Removing Function

Reception data storage section 107 is capable of removing, from the storage content, all of [reception user, reception selecting condition, transmission user, transmission selecting condition, data] having [reception user, reception selecting condition, transmission user, transmission selecting condition] matching [reception user, reception selecting condition, transmission user, transmission selecting condition] input.

(4) Reception Data Reception Selecting Condition Searching Function

Reception data storage section 107 is capable of listing all of [reception user, reception selecting condition, transmission user, transmission selecting condition, data] having [reception user, reception selecting condition] matching [reception user, reception selecting condition] input.

[Owned Data Storage Section 108]

Owned data storage section 108 stores an information record [owner user, data] in which a data item is associated a user owning the data item. Owned data storage section 108 includes the following functions related to a stored information record. Note that, the owner user may be a transmission user or a reception user.

(1) Owned Data Adding Function

Owned data storage section 108 is capable of adding input [owner user, data] to the storage content provided.

(2) Owned Data Removing Function

Owned data storage section 108 is capable of removing input [owner user, data] from the storage content.

(3) Granting Condition Determining Function

Owned data storage section 108 is capable of determining whether or not a reception granting condition and a transmission granting condition are satisfied with regard to [transmission user, data] and [reception user, data] stored in the input [reception user, reception granting condition, transmission user, transmission granting condition].

(4) Selection Condition Searching Function

Owned data storage section 108 is capable of listing all of [transmission user, data] among [transmission user, data] stored, including a data item satisfying both the reception selecting condition and the transmission selecting condition, in [reception selecting condition, transmission user, transmission selecting condition] input.

Functions of storage sections other than the reception selecting condition searching function, the transmission selecting condition searching function, the granting condition determining function, and the selection condition searching function may be implemented by the following known technique. More specifically, each function includes, when storing and searching information records, specifying a concatenation key including a plurality of keys for the content of each information record upon search, and generating an index including entries associated with each information record in the order of the concatenation key. With this technique, the following operations regarding indexes are effectively performed. Techniques disclosed in Japanese patent No. 3628030 and Japanese patent No. 3980326 are examples of known techniques.

Operation 1

In this operation, an upper level (front) partial key of the concatenation key is specified, and if there is an information record matching the partial key, the first entry and/or the last entry in the sorting order is determined, and if there is no matching information record, a position on the index for inserting the entry of the information record of the concatenation key including a specified partial key is determined.

Operation 2

In this operation, an adjacent entry of the entry on the index (in the sorting order) is determined.

Operation 3 In this operation, content of an information record corresponding to the entry is read.

Operation 4

In this operation, an entry of an information record is inserted at a position that does not contradict the sorting order.

Operation 5 In this operation, an entry is removed.

Furthermore, Operation 1, Operation 2, and Operation 3 may be combined to configure the next Operation 6.

Operation 6

In this operation, the upper level (front) partial key of the concatenation key is specified, and if there is an information record matching the partial key, the information record (the specified part thereof) is listed in an ascending order or a descending order of the index.

Operation 7

In this operation, from the information record to which an index is assigned, an entry specifying the information record in the index can be obtained. When removing an information record, an entry in each index representing the information record is determined using the operation, and the entries are removed by Operation 5 described above. With these operations, maintenance and management of the index are carried out.

Note that, in the following description, an entry in each index representing an information record is removed when an indexed information record is removed.

Note that, as a result of Operation 6, 0 or more information record listed or a pointer to an information record can be combined into a list and the list may be outputted.

The lists including information records of the same type can be concatenated into one list. In the following procedure, when inputting/outputting a plurality of information records between sections, the information records are treated as the list described above.

Implementations of a reception selecting condition searching function, a transmission selection condition searching function, a granting condition determining function, and a selection condition searching function depend on (i) conditions and (ii) content and format of the data. Accordingly, the description shall be made based on the following specific Examples.

Next, the order of process performed by data exchange section 104 will be described with reference to flowcharts.

Note that, in the following description, when one information record is specified and process related to the information record is described, a sign is given to a value of each information item in the information record, and the values are represented by the signs in the subsequent steps. For example, after a step for "inputting [reception user RU, reception selecting condition RS, reception granting condition RG]", RU, RS, and RG represent a reception user, a reception selecting condition, and a reception granting condition input in the step, respectively, unless RU, RS, RG are assigned again.

In addition, in the following description, an information item (name) is represented by a sign representing a specific value for representing a group of information records having the specific value as a part of the information items. For example, [reception user, reception selecting condition, reception granting condition] in which the reception user matches RU and the reception selecting condition matches RS is represented as [RU, RS, reception granting condition].

[Description of Process Performed by Data Exchange Section 104]

Flow of each process performed by data exchange section 104 will be described.

(Flow of Selection Receiving Process)

Figure 2:
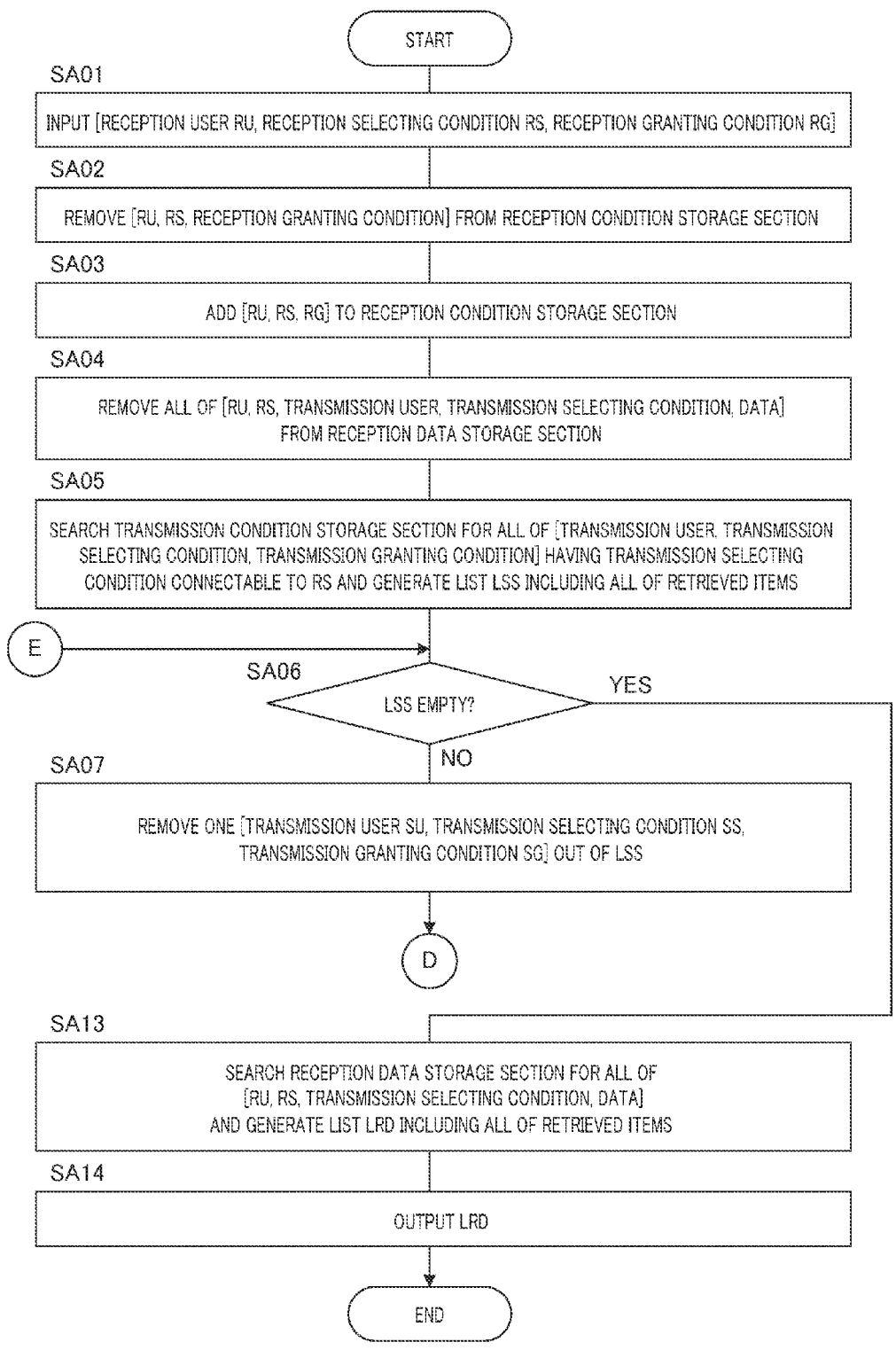
FIG. 2 is a flowchart illustrating a selection receiving process by the data exchange system according to the present invention.
Figure 3:
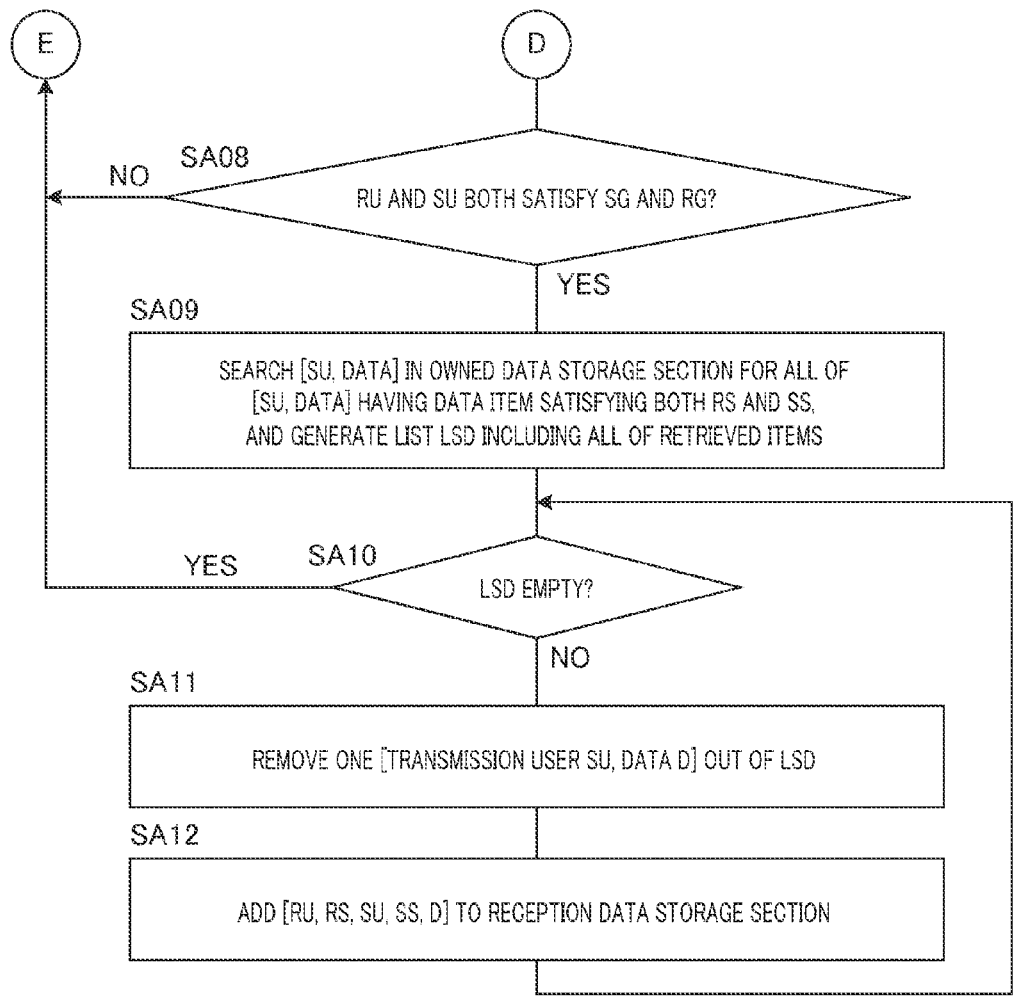
FIG. 3 is a flowchart illustrating a selection receiving process by the data exchange system according to the present invention.

FIGS. 2 and 3 are flowcharts illustrating the selection receiving process.

Data exchange section 104 first inputs [reception user RU, reception selecting condition RS, and reception granting condition RG] through input/output control section 101 (SA01).

Data exchange section 104 outputs [RU, RS] to reception condition storage section 105, causes reception condition storage section 105 to perform the reception condition removing function, and removes [RU, RS, reception granting condition] from reception condition storage section 105 (SA02).

Next, data exchange section 104 causes reception condition storage section 105 to output [RU, RS, RG], and to perform the reception condition adding function. Subsequently, data exchange section 104 adds [RU, RS, RG] to reception condition storage section 105 (SA03).

Data exchange section 104 also outputs [RU, RS] to reception data storage section 107, causes reception data storage section 107 to perform reception data reception selecting condition removing function, and removes all of [RU, RS, transmission user, transmission selecting condition, data] from reception data storage section 107 (SA04).

Subsequently, data exchange section 104 outputs RS to transmission condition storage section 106, causes transmission condition storage section 106 to perform the transmission selecting condition searching function for all of [transmission user, transmission selecting condition, transmission granting condition] having a transmission selecting condition connectable to RS, and generates list LSS including all of the retrieved items (SA05).

Next, data exchange section 104 determines whether or not LSS is empty (SA06). Subsequently, if the determination in SA06 is no, data exchange section 104 removes one [transmission user SU, transmission selecting condition SS, transmission granting condition SG] out of LSS (SA07).

Next, data exchange section 104 outputs [RU, RG, SU, SG] to owned data storage section 108, causes owned data storage section 108 to perform granting condition determining function, and determines whether or not RU and SU satisfy SG and RG, respectively (SA08).

If the determination in SA08 is no, the flow returns to SA06, and data exchange section 104 determines whether or not LSS is empty again. Hereafter, as long as the determination in SA06 is no and the determination in SA08 is no, data exchange section 104 repeats the process from SA06 to SA08.

If the determination in SA08 is yes, data exchange section 104 causes owned data storage section 108 to output [RS, SU, SS], to perform the selection condition searching function, to search for all of [SU, data] having a data item satisfying both RS and SS from owned data storage section 108. Data exchange section 104 generates list LSD including all of the retrieved items (SA09).

Next, data exchange section 104 determines whether or not LSD is empty (SA10). If the determination in SA10 is yes, the flow returns to SA06, and data exchange section 104 determines whether or not LSS is empty again. Hereafter, as long as the determination in SA06 is no and the determination in SA10 is yes, data exchange section 104 repeats the process from SA06 to SA10.

In contrast, if determination in SA10 is no, data exchange section 104 removes one [transmission user SU, data D] out of LSD (SA11).

Data exchange section 104 subsequently outputs [RU, RS, SU, SS, D] to reception data storage section 107, causes reception data storage section 107 to perform the reception data adding function, and adds [RU, RS, SU, SS, D] to reception data storage section 107 (SA12). Subsequently, the process returns to SA10, and data exchange section 104 determines whether or not LSD is empty again. Hereafter, as long as the determination in SA10 is no, data exchange section 104 repeats the process from SA10 to SA12.

If the determination in SA06 is yes, data exchange section 104 outputs [RU, RS] to reception data storage section 107, causes reception data storage section 107 to perform the reception data reception selecting condition searching function, and searches reception data storage section 107 for all of [RU, RS, transmission user, transmission selecting condition, data], and generates list LRD including all of the retrieved items (SA13).

Finally, data exchange section 104 outputs LRD (SA14), and ends the process.

(Flow of Reception Condition Removing Process)

Figure 4:
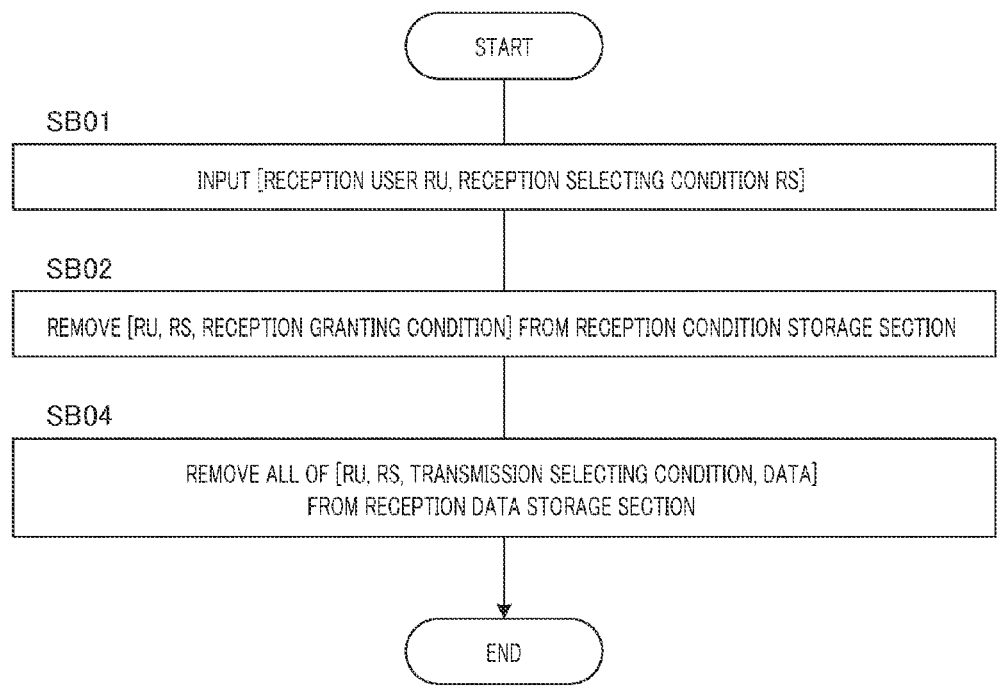
FIG. 4 is a flowchart illustrating a reception condition removing process by the data exchange system according to the present invention.

FIG. 4 is a flowchart illustrating flow of the reception condition removing process.

Data exchange section 104 first inputs [reception user RU, reception selecting condition RS, and reception granting condition RG] through input/output control section 101 (SB01).

Data exchange section 104 outputs [RU, RS] to reception condition storage section 105, causes reception condition storage section 105 to perform the reception condition removing function, and removes [RU, RS, reception granting condition] from reception condition storage section 105 (SB02).

Data exchange section 104 also outputs [RU, RS] to reception data storage section 107, causes reception data storage section 107 to perform reception data reception condition removing function, and removes all of [RU, RS, transmission user, transmission selecting condition, data] from reception data storage section 107 (SB04), and ends the process.

(Flow of Selection Transmitting Process)

Figure 5:
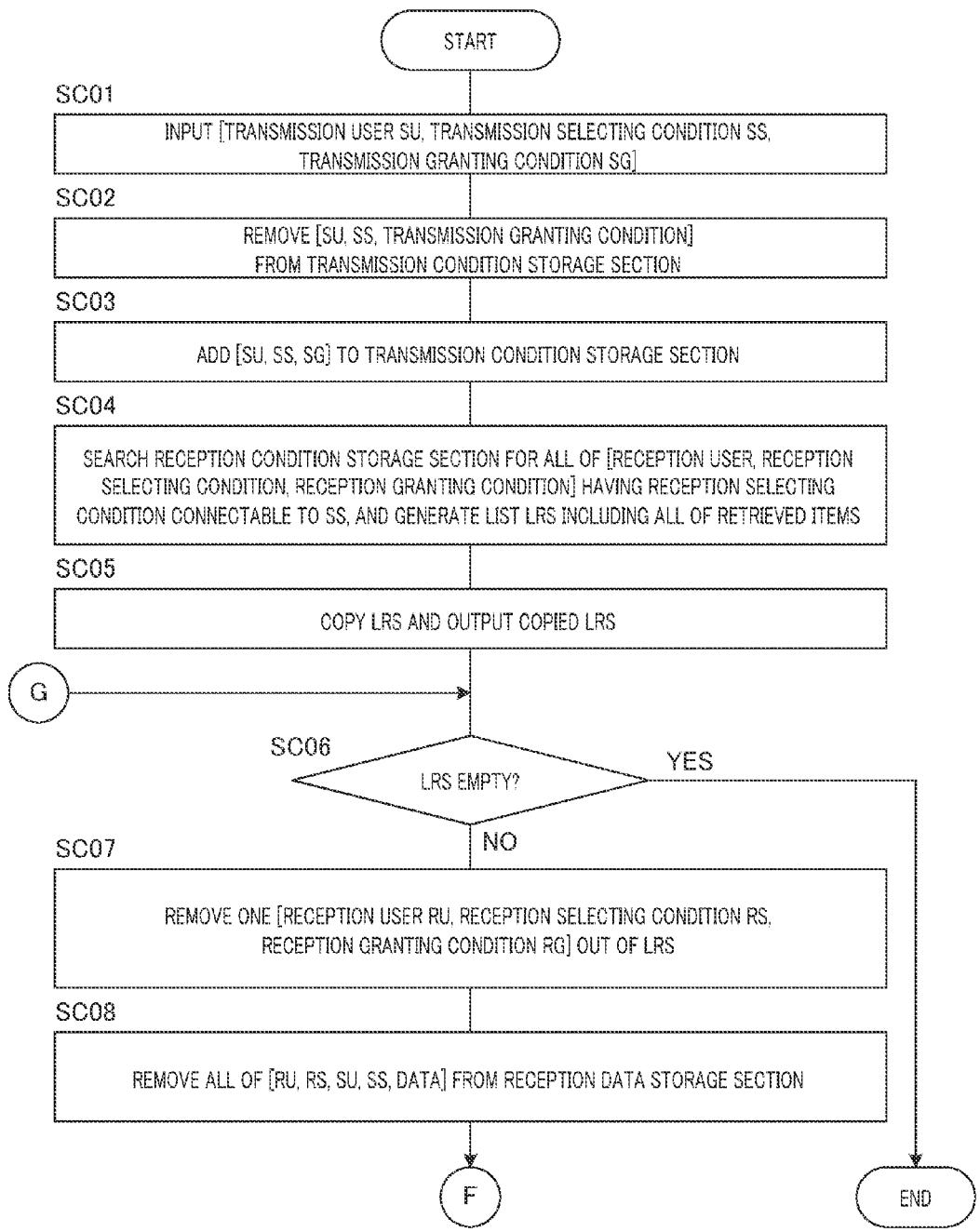
FIG. 5 is a flowchart illustrating a selection transmitting process by the data exchange system according to the present invention.
Figure 6:
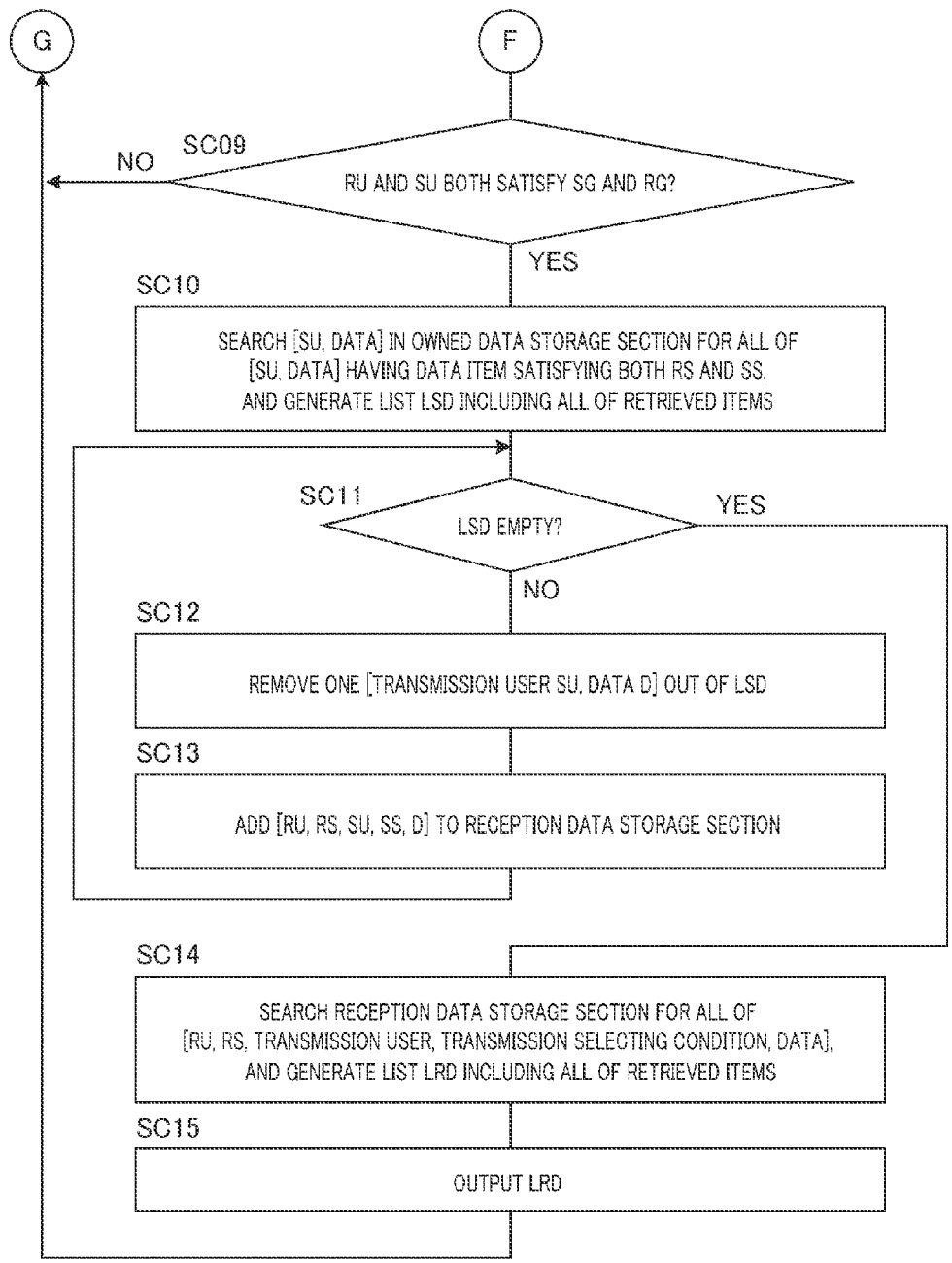
FIG. 6 is a flowchart illustrating a selection transmitting process by the data exchange system according to the present invention.

FIGS. 5 and 6 are flowcharts illustrating the selection transmitting process.

Data exchange section 104 first inputs [transmission user SU, transmission selecting condition SS, transmission granting condition SG] through input/output control section 101 (SC01).

Data exchange section 104 subsequently outputs [SU, SS] to transmission condition storage section 106, causes transmission condition storage section 106 to perform the transmission condition removing function, and removes [SU, SS, transmission granting condition] from transmission condition storage section 106 (SC02).

Data exchange section 104 subsequently outputs [SU, SS, SG] to transmission condition storage section 106, causes transmission condition storage section 106 to perform the transmission condition adding function, and adds [SU, SS, SG] to transmission condition storage section 106 (SC03).

Next, data exchange section 104 outputs, SS to reception condition storage section 105, causes reception condition storage section 105 to perform the reception selecting condition search function, searches reception condition storage section 105 for all of [reception user, reception selecting condition, reception granting condition] having a reception selecting condition connectable to SS, and generates list LRS including all the retrieved items (SC04).

Next, data exchange section 104 copies the LRS, and outputs the copied LRS (SC05).

Next, data exchange section 104 determines whether or not LRS is empty (SC06). Subsequently, if the determination in SC06 is yes, date exchange section 104 ends the process.

If the determination in SC06 is no, data exchange section 104 removes one [reception user RU, reception selecting condition RS, reception granting condition RG] out of LRS (SC07).

Next, data exchange section 104 outputs [RU, RS, SU, SS] to reception data storage section 107, causes reception data storage section 107 to perform the reception transmission condition specifying removing function, and removes all of [RU, RS, SU, SS, data] from reception data storage section 107 (SC08).

Next, data exchange section 104 outputs [RU, RG, SU, SG] to owned data storage section 108, causes owned data storage section 108 to perform the granting condition determining function, and determines whether or not RU and SU satisfy SG and RG, respectively (SC09).

If the determination in SC09 is no, the process returns to SC06, and data exchange section 104 repeats the process from SC06 to SC09.

If the determination in SC09 is yes, data exchange section 104 outputs [RS, SU, SS] to owned data storage section 108, causes owned data storage section 108 to execute selection condition searching function, searches owned data storage section 108 for all of [SU, data] having data satisfying both RS and SS, and generates list LSD including all of the retrieved items (SC10).

Next, data exchange section 104 determines whether or not LSD is empty (SC11). If determination in SC11 is no, data exchange section 104 removes one [transmission user SU, data D] out of LSD (SC12). Data exchange section 104 subsequently outputs [RU, RS, SU, SS, D] to reception data storage section 107, causes reception data storage section 107 to perform the reception data adding function, and adds [RU, RS, SU, SS, D] to reception data storage section 107 (SC13). Subsequently, the process returns to SC11, and data exchange section 104 determines whether or not LSD is empty again. Subsequently, as long as the determination in SC11 is no, data exchange section 104 repeats the process from SC11 to SC13.

In addition, if the determination in SC11 is yes, data exchange section 104 outputs [RU, RS] to reception data storage section 107, causes reception data storage section 107 to perform the reception data reception selecting condition searching function, searches reception data storage section 107 for all of [RU, RS, transmission user, transmission selecting condition, data], and generates list LRD including all of the retrieved items (SC14).

Subsequently, data exchange section 104 outputs the LRD (SC15). Subsequently, the process returns to SC06, and data exchange section 104 determines whether or not LRS is empty again. Subsequently, as long as the determination in SC06 is no, the determination in SC09 is yes, and the determination in SC11 is yes, data exchange section 104 repeats the process from SC06 to SC15.

(Flow of Transmission Condition Removing Process)

Figure 7:
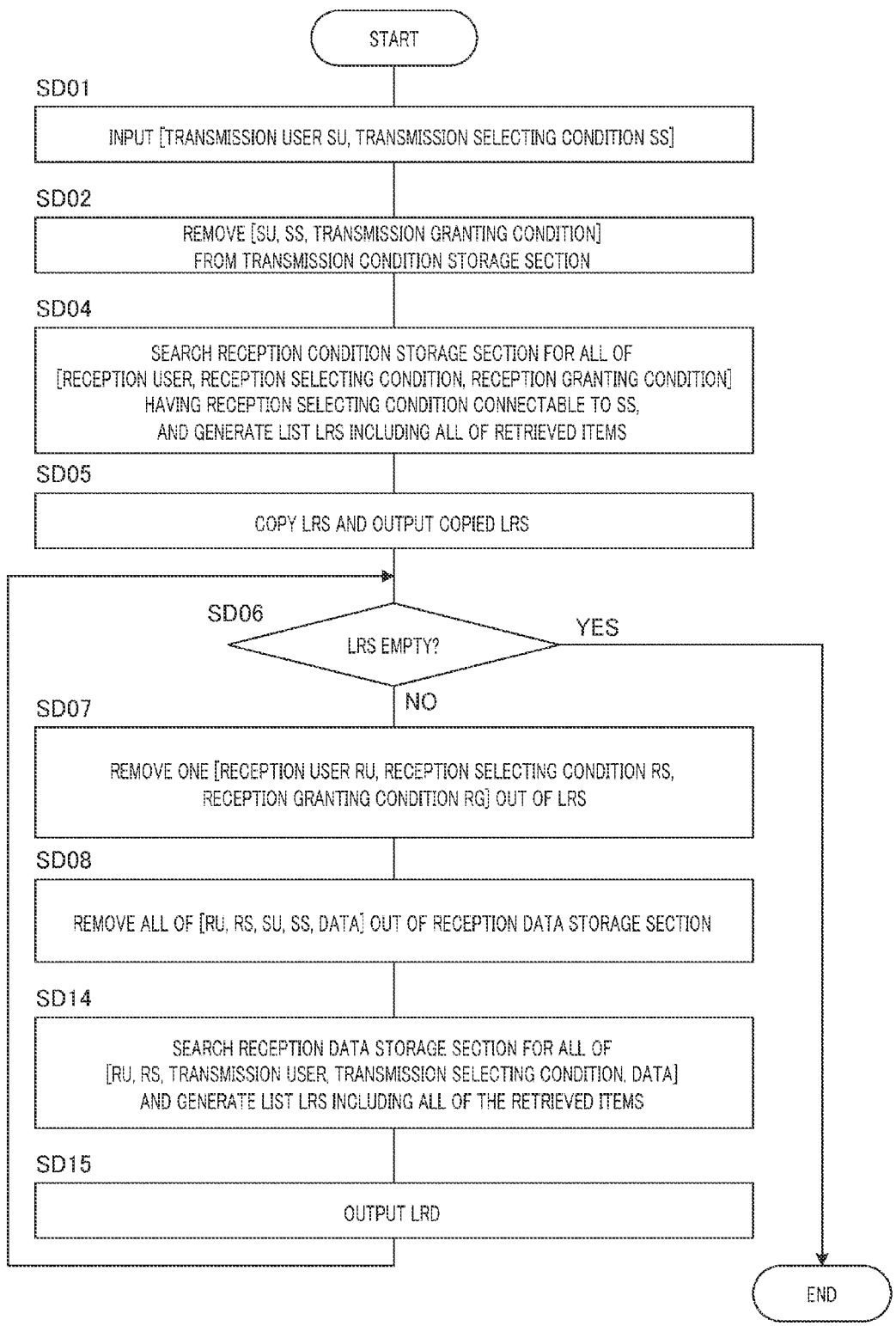
FIG. 7 is a flowchart illustrating a transmission condition removing process by the data exchange system according to the present invention.

FIG. 7 is a flowchart illustrating flow of the transmission condition removing process.

Data exchange section 104 first receives an input [transmission user SU, transmission selecting condition SS] from input/output control section 101 (SD01).

Data exchange section 104 subsequently causes transmission condition storage section 106 to output [RU, RS], and to perform the transmission condition removing function so as to remove [SU, SS, transmission granting condition] from transmission condition storage section 106 (SD02).

Next, data exchange section 104 outputs SS to reception condition storage section 105, causes reception condition storage section 105 to perform the reception selecting condition search function, searches reception condition storage section 105 for all of [reception user, reception selecting condition, reception granting condition] having a reception selecting condition connectable to SS, and generates list LRS including all the retrieved items (SD04).

Next, data exchange section 104 copies the LRS, and outputs the copied LRS (SD05).

Next, data exchange section 104 determines whether or not LRS is empty (SD06). If the determination on SD06 is yes, date exchange section 104 ends the process.

If the determination in SD06 is no, data exchange section 104 removes one [reception user RU, reception selecting condition RS, reception granting condition RG] out of LRS (SD07).

Next, data exchange section 104 causes reception data storage section 107 to output [RU, RS, SU, SS] and to perform the reception transmission condition specifying removing function, and removes all of [RU, RS, SU, SS, data] from reception data storage section 107 (SD08).

Data exchange section 104 outputs [RU, RS] to reception data storage section 107, causes reception data storage section 107 to perform the reception data reception selecting condition searching function, searches reception data storage section 107 for all of [RU, RS, transmission user, transmission selecting condition, data], and generates list LRS including all of the retrieved items (SD14).

Subsequently, data exchange section 104 outputs the LRD (SD15). Subsequently, the process returns to SD06, and data exchange section 104 determines whether or not the LRS is empty again. Subsequently, as long as the determination in SD06 is no, data exchange section 104 repeats the process from SD06 to SD15.

(Flow of Data Adding Process)

Figure 8:
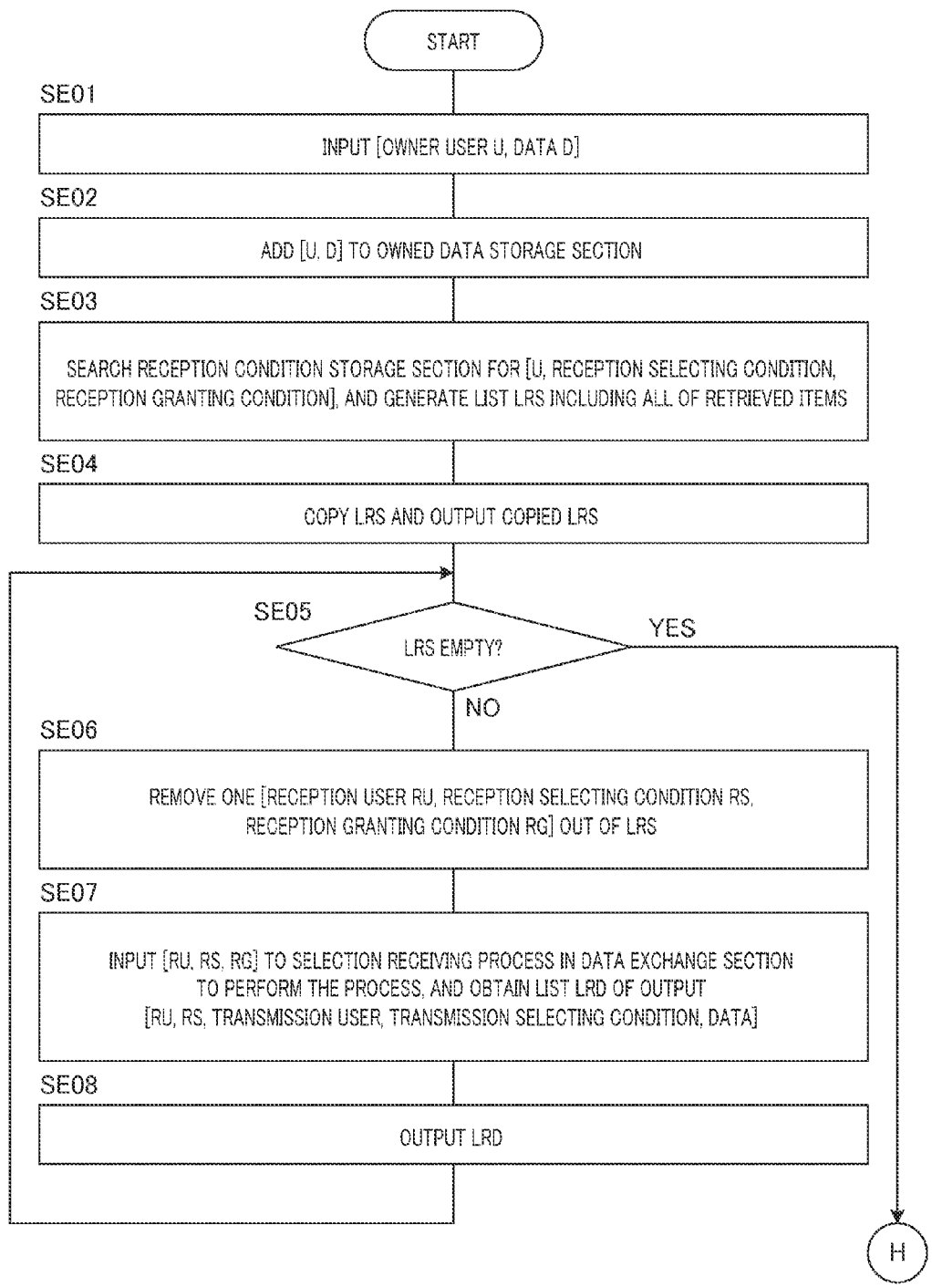
FIG. 8 is a flowchart illustrating a data adding process by the data exchange system according to the present invention.
Figure 9:
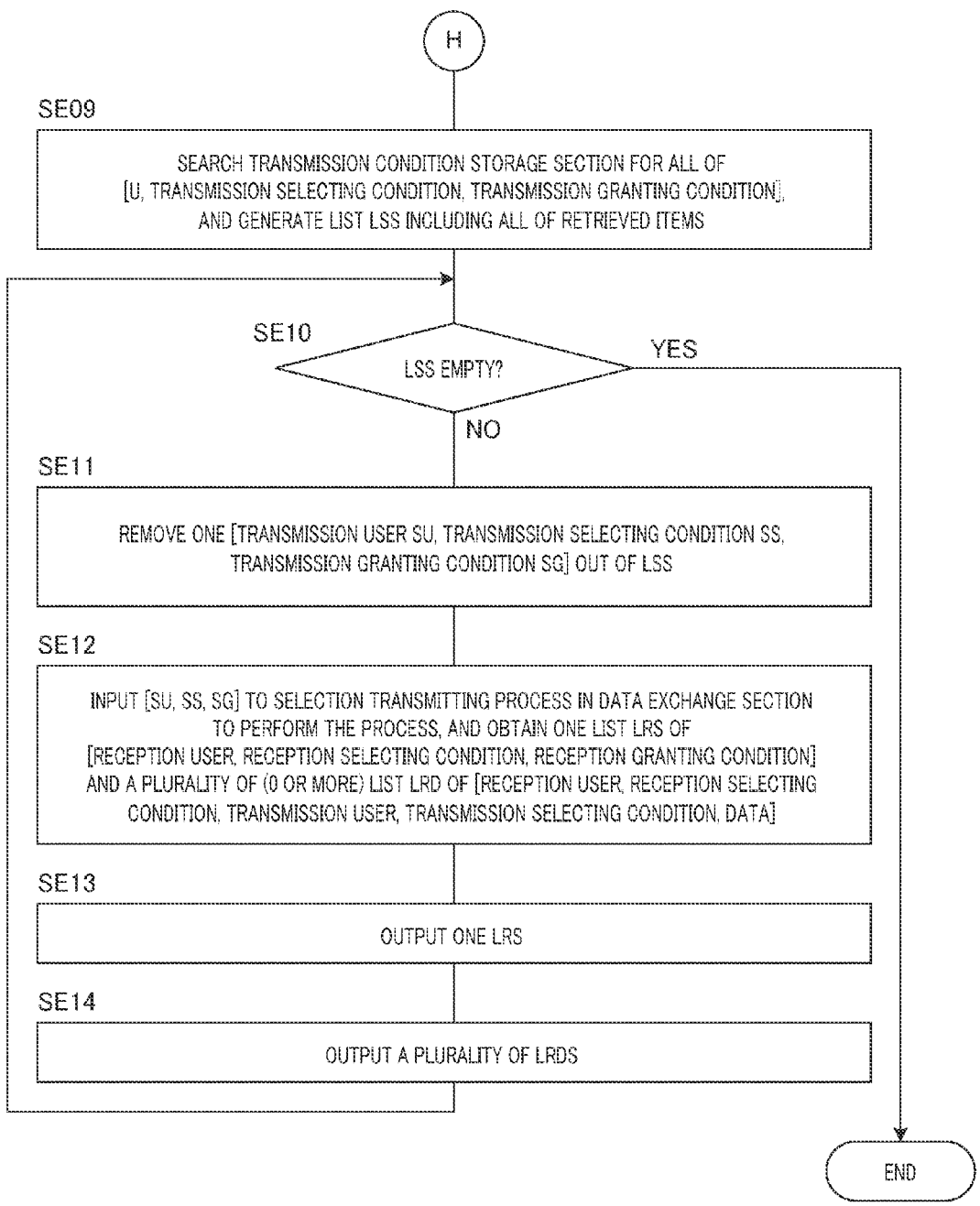
FIG. 9 is a flowchart illustrating a data adding process by the data exchange system according to the present invention.

FIGS. 8 and 9 are flowcharts illustrating the data adding process.

Data exchange section 104 first receives an input [owner user U, data D] from input/output control section 101 (SE01).

Data exchange section 104 outputs [U, D] to owned data storage section 108, causes owned data storage section to perform the owned data adding function, and adds [U, D] to owned data storage section 108 (SE02).

Data exchange section 104 subsequently outputs U to reception condition storage section 105, causes reception condition storage section 105 to perform the reception condition user search function, searches for all of [U, reception selecting condition, reception granting condition], and generates list LRS including all of the retrieved items (SE03).

Next, data exchange section 104 copies the LRS, and outputs the copied LRS (SE04).

Next, data exchange section 104 determines whether or not LRS is empty (SE05). If the determination in SE05 is no, data exchange section 104 removes one [reception user RU, reception selecting condition RS, reception granting condition RG] out of LRS (SE06).

Subsequently, data exchange section 104 performs the selection receiving process using [RU, RS, RG], and obtains list LRD of the output [RU, RS, transmission user, transmission selecting condition, data] (SE07).

Subsequently, data exchange section 104 outputs the LRD (SE08). Subsequently, the process returns to SE05, and data exchange section 104 determines whether or not the LRS is empty again. Subsequently, as long as the determination in SE05 is no, data exchange section 104 repeats the process from SE05 to SE08.

If the determination in SE05 is yes, data exchange section 104 outputs U to transmission condition storage section 106, causes transmission condition storage section 106 to perform the transmission condition user search function, searches for all of [U, transmission selecting condition, transmission granting condition] and generates list LSS including all of the retrieved items (SE09).

Next, data exchange section 104 determines whether or not LSS is empty (SE10). If the determination in SE10 is yes, date exchange section 104 ends the process.

If the determination in SE10 is no, data exchange section 104 removes one [transmission user SU, transmission selecting condition SS, transmission granting condition SG] out of LSS (SE11).

Next, data exchange section 104 performs the selection transmitting process using [SU, SS, SG], and obtains one list LRS including [reception user, reception selecting condition, reception granting condition] and 0 or more list LRD of [reception user, reception selecting condition, transmission user, transmission selecting condition, data] (SE12).

Data exchange section 104 subsequently outputs one LRS (SE13), and outputs a plurality of LRDs (SE14). Subsequently, the process returns to SE10, and data exchange section 104 determines whether or not the LSS is empty again. Data exchange section 104 repeats the process from SE10 to SE14 as long as the determination in SE10 is no.

(Flow of Data Removing Process)

Figure 10:
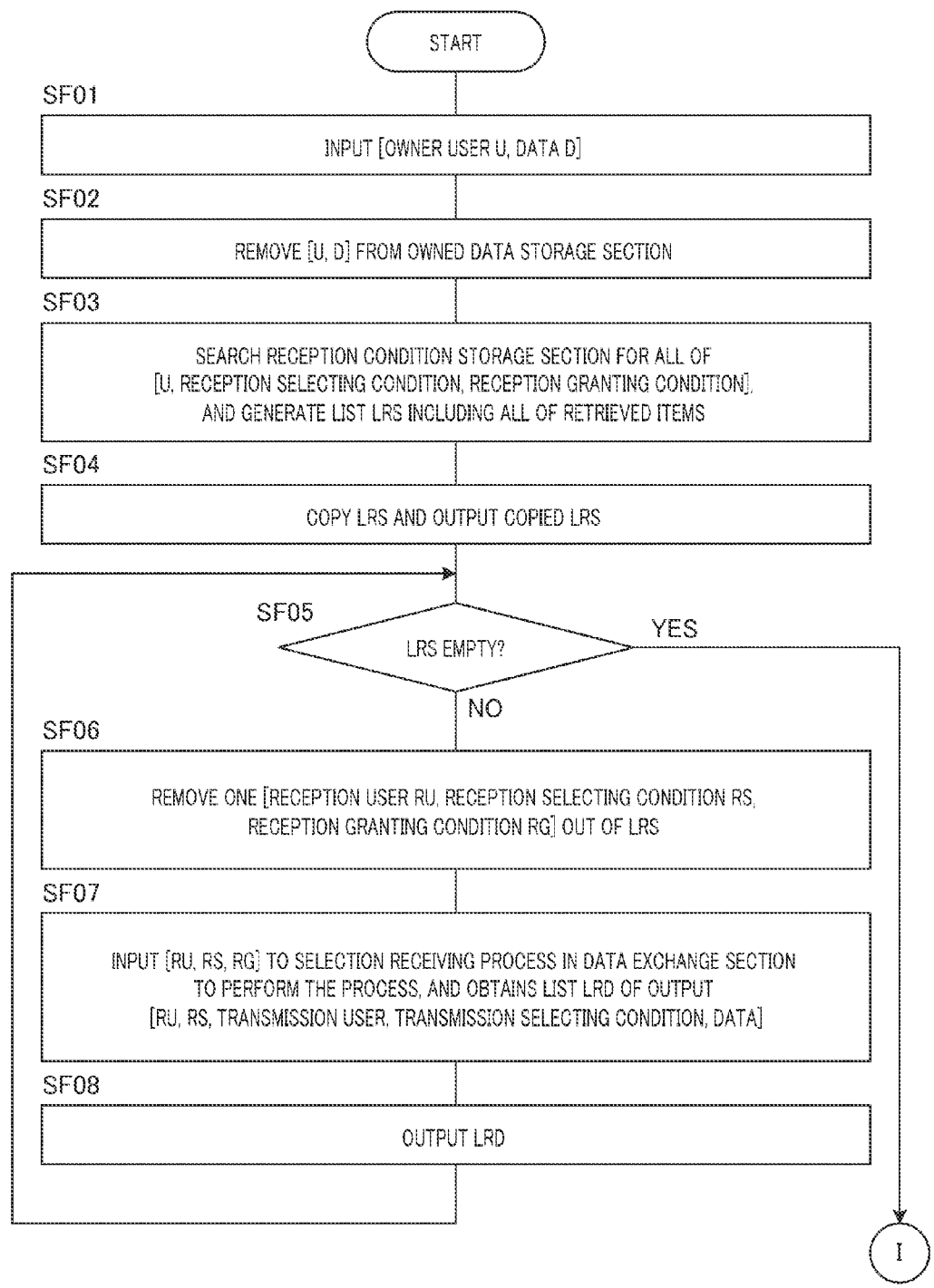
FIG. 10 is a flowchart illustrating a data removing process by the data exchange system according to the present invention.
Figure 11:
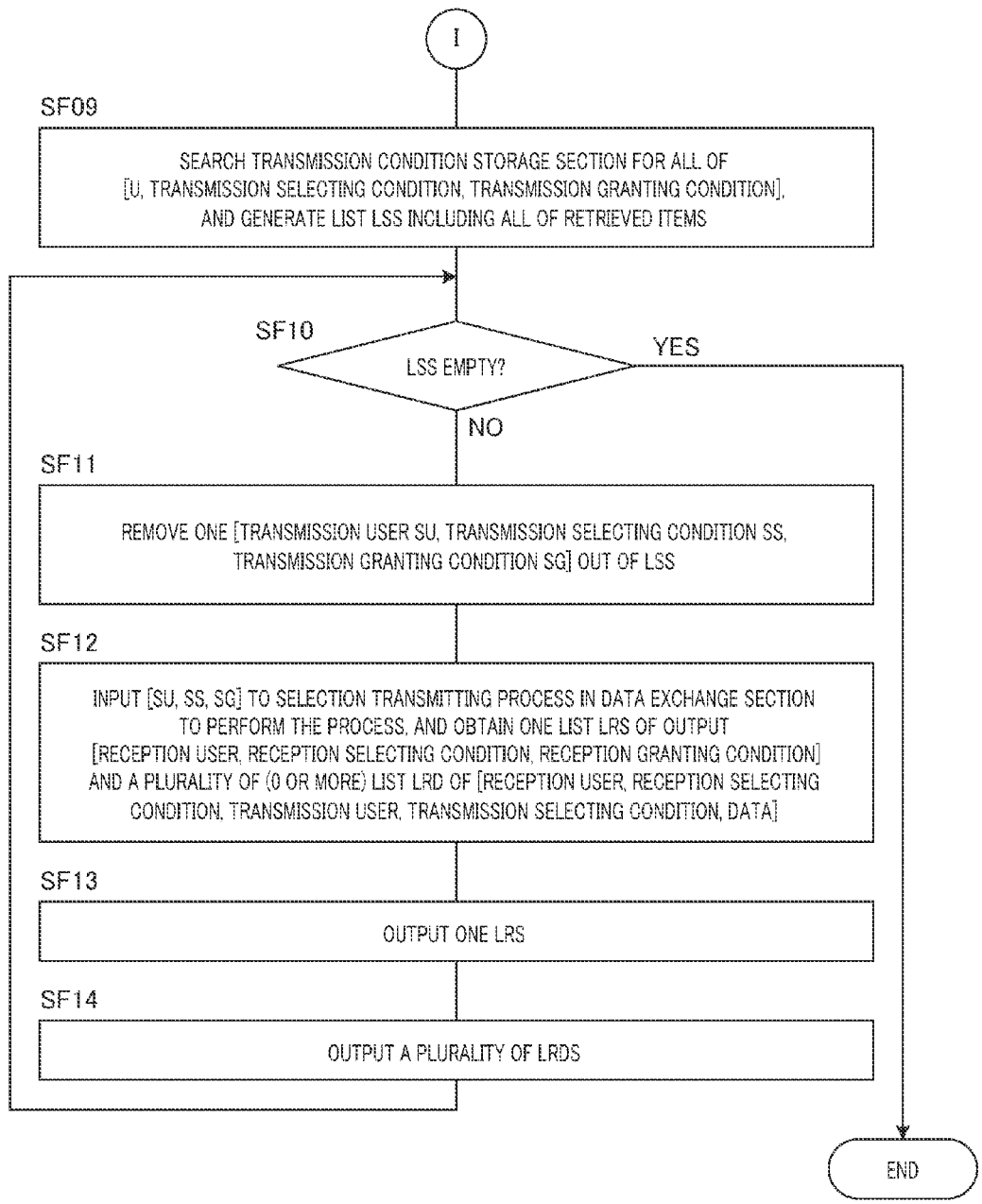
FIG. 11 is a flowchart illustrating a data removing process by the data exchange system according to the present invention.

FIGS. 10 and 11 are flowcharts illustrating the data removing process.

Data exchange section 104 first receives an input [owner user U, data D] from input/output control section 101 (SF01).

Next, data exchange section 104 outputs [U, D] to owned data storage section 108, causes owned data storage section 108 to perform the owned data removing function, and removes [U, D] from owned data storage section 108 (SF02).

Data exchange section 104 subsequently outputs U to reception condition storage section 105, causes reception condition storage section 105 to perform the reception condition user search function so as to search for all of [U, reception selecting condition, reception granting condition], and generates list LRS including all of the retrieved items (SF03).

Next, data exchange section 104 copies the LRS, and outputs the copied LRS (SF04).

Next, data exchange section 104 determines whether or not LRS is empty (SF05). If the determination in SF05 is no, data exchange section 104 removes one [reception user RU, reception selecting condition RS, reception granting condition RG] out of LRS (SF06).

Subsequently, data exchange section 104 performs the selection receiving process using [RU, RS, RG], and obtains list LRD of the output [RU, RS, transmission user, transmission selecting condition, data] (SF07).

Subsequently, data exchange section 104 outputs the LRD (SF08). Subsequently, the process returns to SF05, and data exchange section 104 determines whether or not the LRS is empty again. Subsequently, as long as the determination in SF05 is no, data exchange section 104 repeats the process from SF05 to SF08.

If the determination in SF05 is yes, data exchange section 104 outputs U to transmission condition storage section 106, causes transmission condition storage section 106 to perform the transmission condition user search function, searches for all of [U, transmission selecting condition, transmission granting condition], and generates list LSS including all of the retrieved items (SF09).

Next, data exchange section 104 determines whether or not LSS is empty (SF10). If the determination on SF10 is yes, date exchange section 104 ends the process.

If the determination in SF10 is no, data exchange section 104 removes one [transmission user SU, transmission selecting condition SS, transmission granting condition SG] out of LSS (SF11).

Next, data exchange section 104 performs the selection transmitting process using [SU, SS, SG], and obtains one list LRS of [reception user, reception selecting condition, reception granting condition] and 0 or more list LRD of [reception user, reception selecting condition, transmission user, transmission selecting condition, data] (SF12).

Data exchange section 104 subsequently outputs one LRS (SF13), and outputs a plurality of LRDs (SF14). Subsequently, the process returns to SF10, and data exchange section 104 determines whether or not the LSS is empty again. Data exchange section 104 repeats the process from SF10 to SF14 as long as the determination in SF10 is no.

[Description of Process Performed by Input/Output Control Section 101]

The flow of processes performed by input/output control section 101 will be described. First, flow of three partial processes used in common with the processes will be described.

(Flow of First Partial Process)

Figure 12:
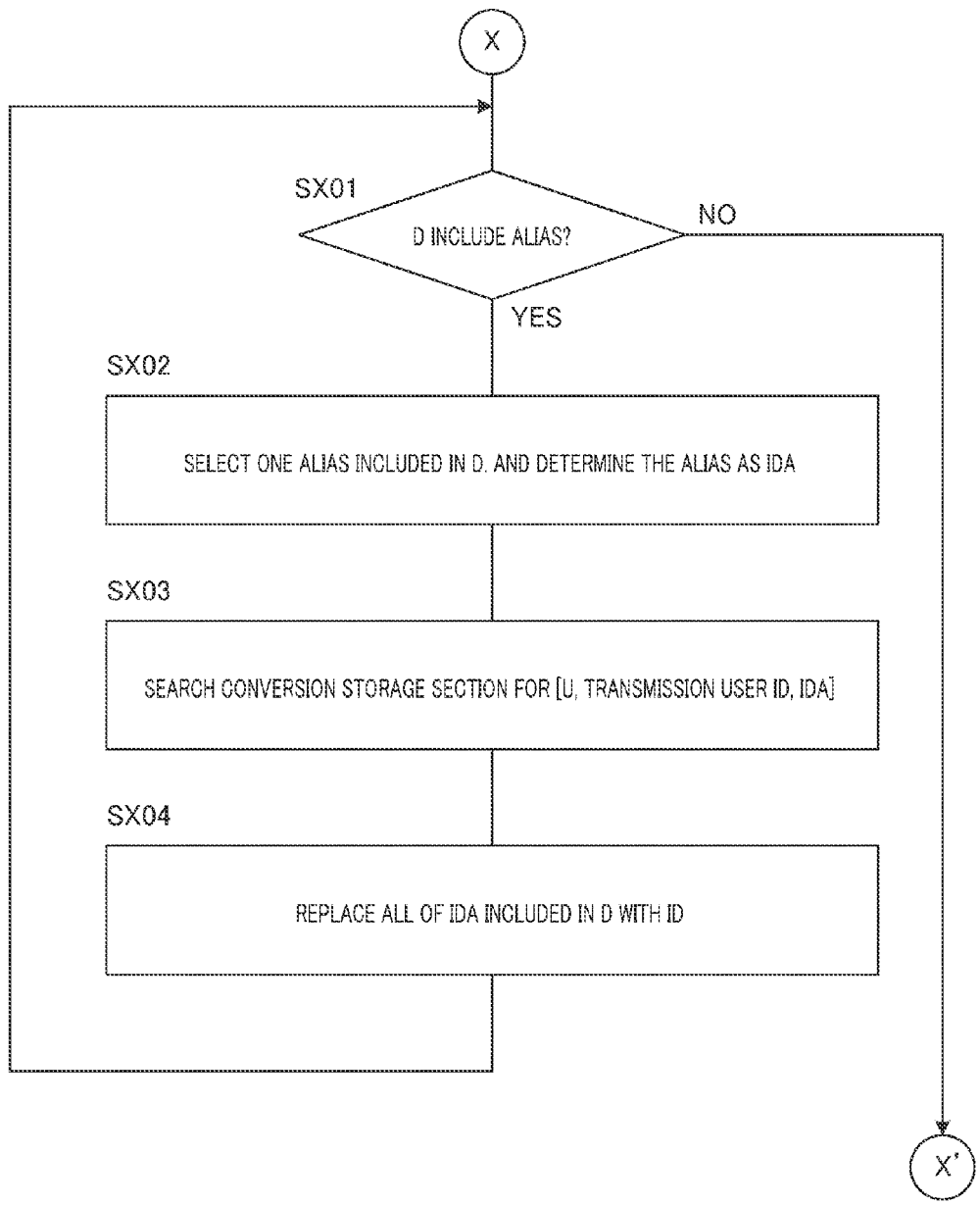
FIG. 12 is a flowchart illustrating a first partial process by the data exchange system according to the present invention.

FIG. 12 is a flowchart illustrating the first partial process. The first partial process is a process for "replacing an alias included in input data D with a user identifier".

Input/output control section 101 first determines whether or not an alias is included in D (SX01). If the determination in SX01 is no, input/output control section 101 ends the partial process.

In contrast, if the determination in SX01 is yes, input/output control section 101 selects one of the aliases and determines the selected alias as IDA (SX02).

Next, input/output control section 101 outputs [reception user U, IDA] to conversion storage section 103, causes conversion storage section 103 to perform the transmission user search function, and searches conversion storage section 103 for [U, transmission user ID, IDA] (SX03).

Subsequently, input/output control section 101 replaces all of IDA included in D with ID (SX04). Subsequently, the process returns to SX01, and input/output control section 101 determines whether or not D still includes an alias. Subsequently, as long as the determination in SX01 is yes, input/output control section 101 repeats the process from SX01 to SX04.

(Flow of Second Partial Process)

Figure 13:
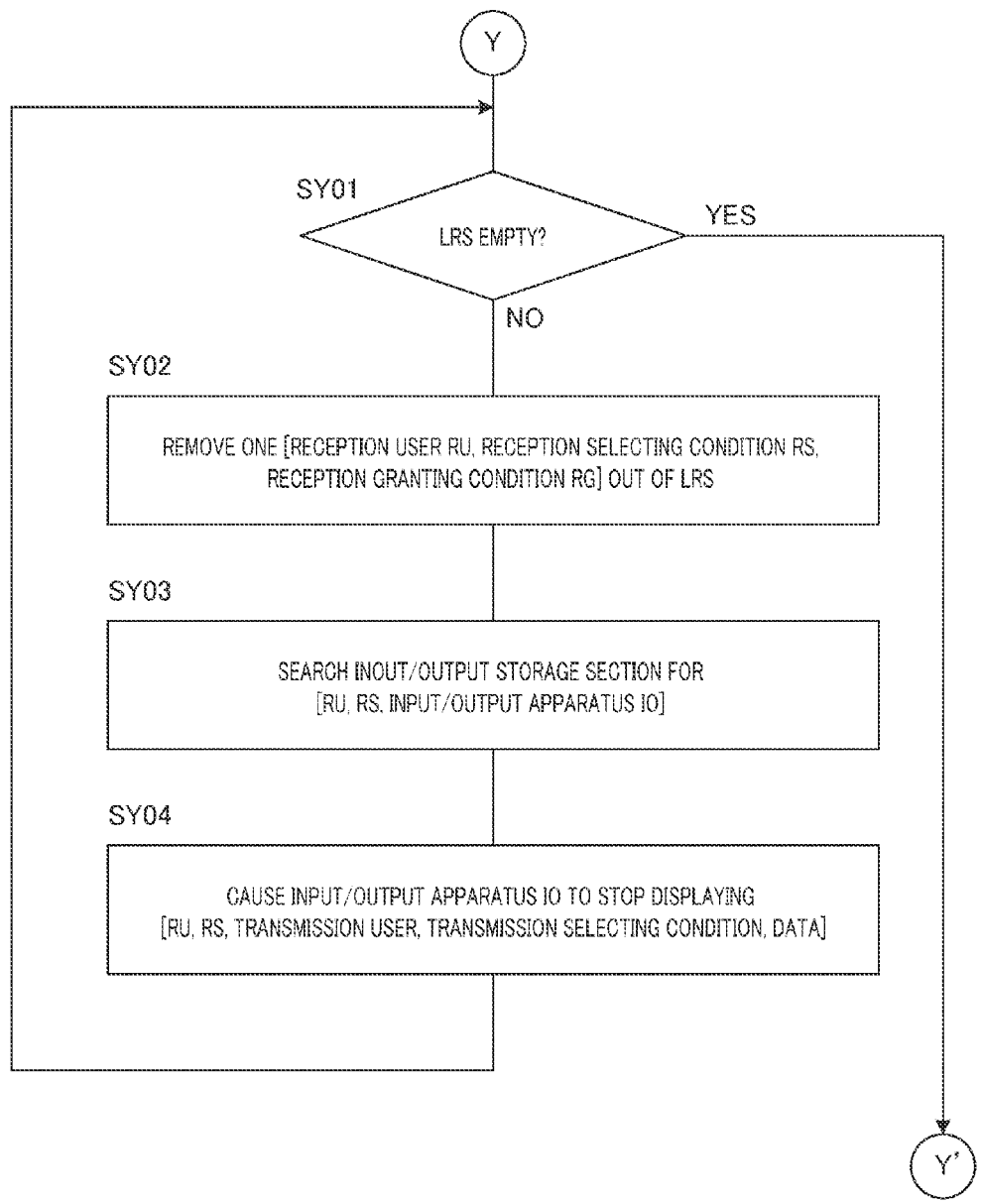
FIG. 13 is a flowchart illustrating a second partial process by the data exchange system according to the present invention.

FIG. 13 is a flowchart illustrating the second partial process. The second partial process is a process for "stopping display of each [RU, RS, transmission user, transmission selecting condition, data] displayed on input/output apparatus 200 for each [reception user RU, reception selecting condition RS] in list LRS of [reception user, reception selecting condition, reception granting condition]".

Input/output control section 101 first determines whether or not LRS is empty (SY01). If the determination in SY01 is yes, input/output control section 101 ends the partial process.

In contrast, if the determination in SY01 is no, input/output control section 101 removes one [reception user RU, reception selecting condition RS, reception granting condition RG] out of LRS (SY02).

Next, input/output control section 101 outputs [RU, RS] to input/output storage section 102, causes input/output storage section 102 to perform the function for searching for reception input/output apparatus 200, and searches input/output storage section 102 for [RU, RS, input/output apparatus IO] (SY03).

Subsequently, input/output control section 101 causes input/output apparatus IO to stop the display of all of [RU, RS, transmission user, transmission selecting condition, data] (SY04). The process returns to SY01 afterward, and input/output control section 101 determines whether or not LRS is empty again. Subsequently, as long as the determination in SY01 is yes, input/output control section 101 repeats the process from SY01 to SY04.

(Flow of Third Partial Process)

Figure 14:
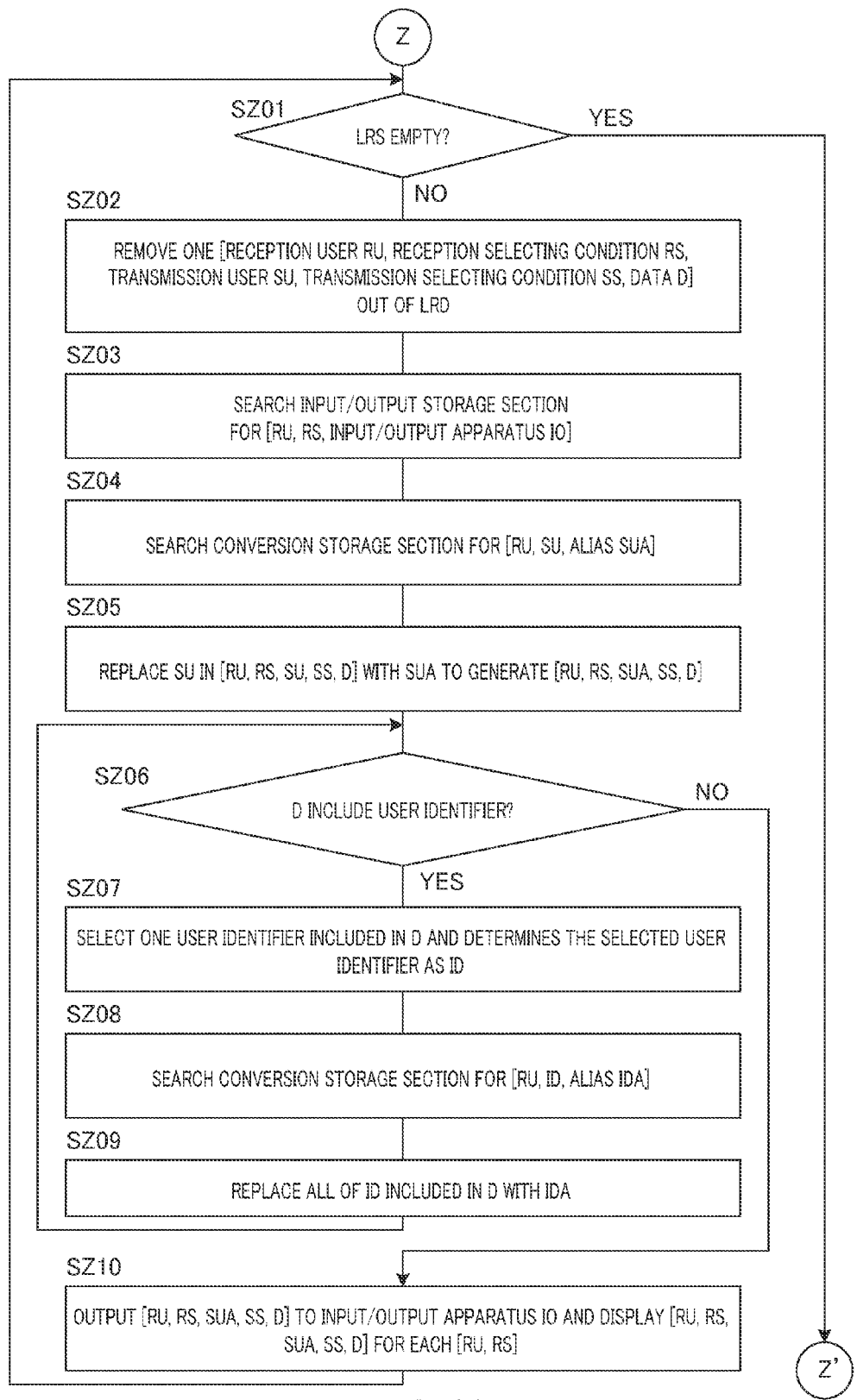
FIG. 14 is a flowchart illustrating a third partial process by the data exchange system according to the present invention.

FIG. 14 is a flowchart illustrating the third partial process. The third partial process is a process "for displaying, on input/output apparatus 200, each [reception user, reception selecting condition, transmission user, transmission selecting condition, data] in list LRD of [reception user, reception selecting condition, transmission user, transmission selecting condition, data]".

Input/output control section 101 first determines whether or not LRD is empty (SZ01). If the determination in SZ01 is yes, input/output control section 101 ends the partial process.

In contrast, if the determination in SZ01 is no, input/output control section 101 removes one of [reception user RU, reception selecting condition RS, transmission user SU, transmission selecting condition SS, data D] out of LRD (SZ02).

Next, input/output control section 101 outputs [RU, RS] to input/output storage section 102, causes input/output storage section 102 to perform the function for searching for reception input/output apparatus 200, and searches input/output storage section 102 for [RU, RS, input/output apparatus IO] (SZ03).

Input/output control section 101 outputs [RU, SU] to conversion storage section 103, performs the alias searching function, and searches conversion storage section 103 for [RU, SU, alias SUA] (SZ04).

Input/output control section 101 replaces SU in [RU, RS, SU, SS, D] with SUA to generate [RU, RS, SUA, SS, D] (SZ05).

Input/output control section 101 determines whether or not a user identifier is included in D (SZ06). If the determination in SZ06 is yes, input/output control section 101 selects one of the user identifiers as an ID (SZ07).

Input/output control section 101 outputs [RU, ID] to conversion storage section 103, causes conversion storage section 103 to perform the alias searching function, and searches conversion storage section 103 for [RU, ID, alias IDA] (SZ08).

Subsequently, input/output control section 101 replaces all of IDs included in D with IDA (SZ09). Subsequently, the process returns to SZ06, and input/output control section 101 determines whether or not D still includes a user identifier. Subsequently, as long as the determination in SZ06 is yes, input/output control section 101 repeats the process from SZ06 to SZ09.

In contrast, if the determination in SZ06 is no, input/output control section 101 causes input/output apparatus 200 to display [RU, RS, SUA, SS, D] for each [RU, RS] (SZ10). The process returns to SZ01 afterward, and input/output control section 101 determines whether or not LRD is empty again. Subsequently, as long as the determination in SZ01 is no, and the determination in SZ06 is no, input/output control section 101 repeats the process from SZ01 to SZ10.

Next, flow of each command process performed by input/output control section 101 including the partial processes will be described. However, reception condition removing command process does not include the partial process.

(Flow of Selection Receiving Command Process)

Figure 15:
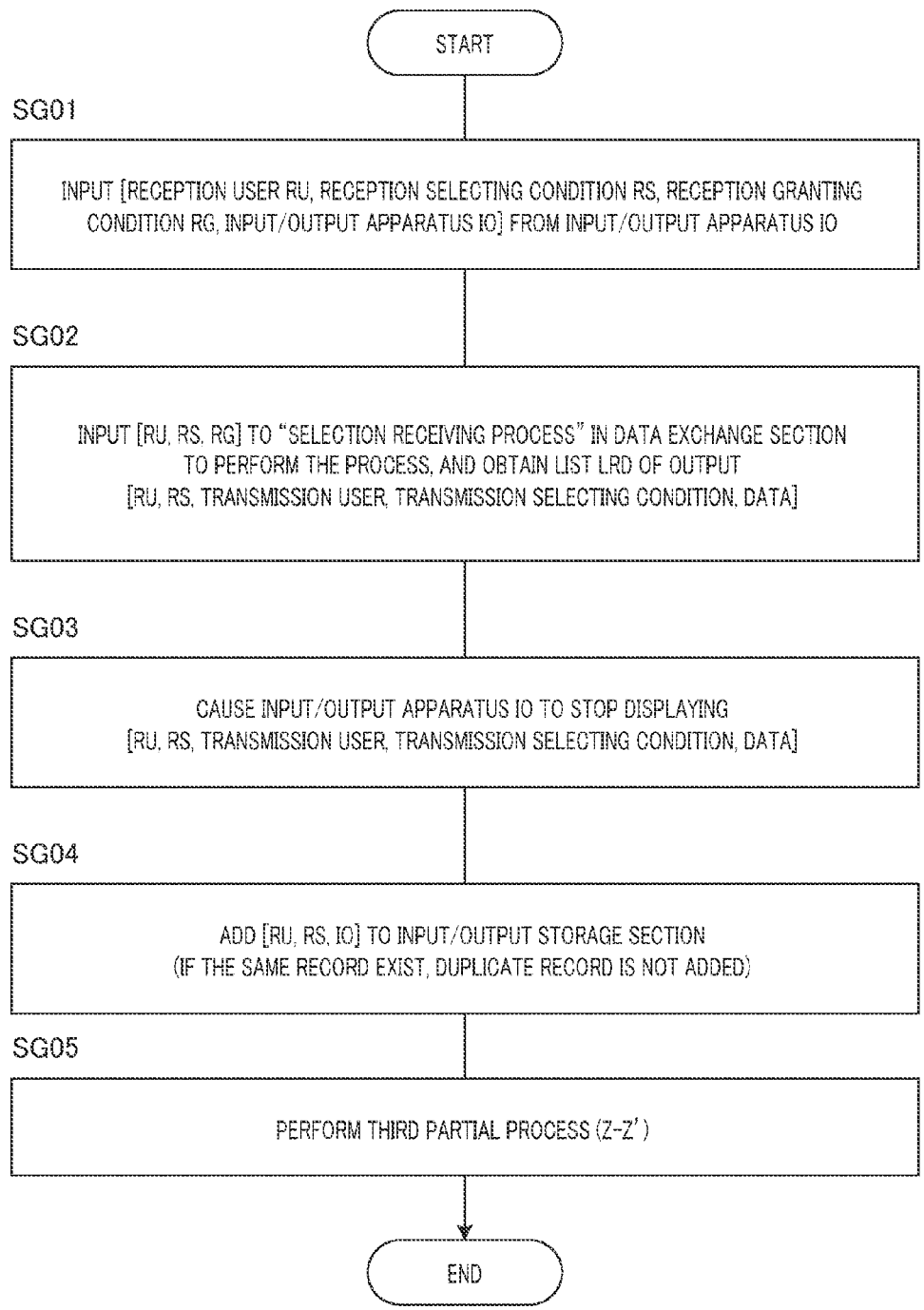
FIG. 15 is a flowchart illustrating a selection receiving command process by the data exchange system according to the present invention.

FIG. 15 is a flowchart illustrating the selection receiving command process.

Input/output control section 101 first receives an input, from input/output apparatus IO, [reception user RU, reception selecting condition RS, reception granting condition RG, input/output apparatus IO] (SG01).

Input/output control section 101 outputs [RU, RS, RG] to data exchange section 104, causes data exchange section 104 to perform selection receiving process, and obtains list LRD of [RU, RS, transmission user, transmission selecting condition, data] (SG02).

Subsequently, input/output control section 101 causes input/output apparatus IO to stop the display of all of [RU, RS, transmission user, transmission selecting condition, data] (SG03).

Input/output control section 101 outputs [RU, RS, IO] to input/output storage section 102, causes input/output storage section 102 to perform the reception display adding function, and adds [RU, RS, IO] to input/output storage section 102 (SG04).

Input/output control section 101 performs the third partial process on LRD obtained in SG02, causes input/output apparatus IO to display [RU, RS, transmission user, transmission selecting condition, data] included in LRD (SG05), and ends the process.

(Flow of Reception Condition Removing Command Process)

Figure 16:
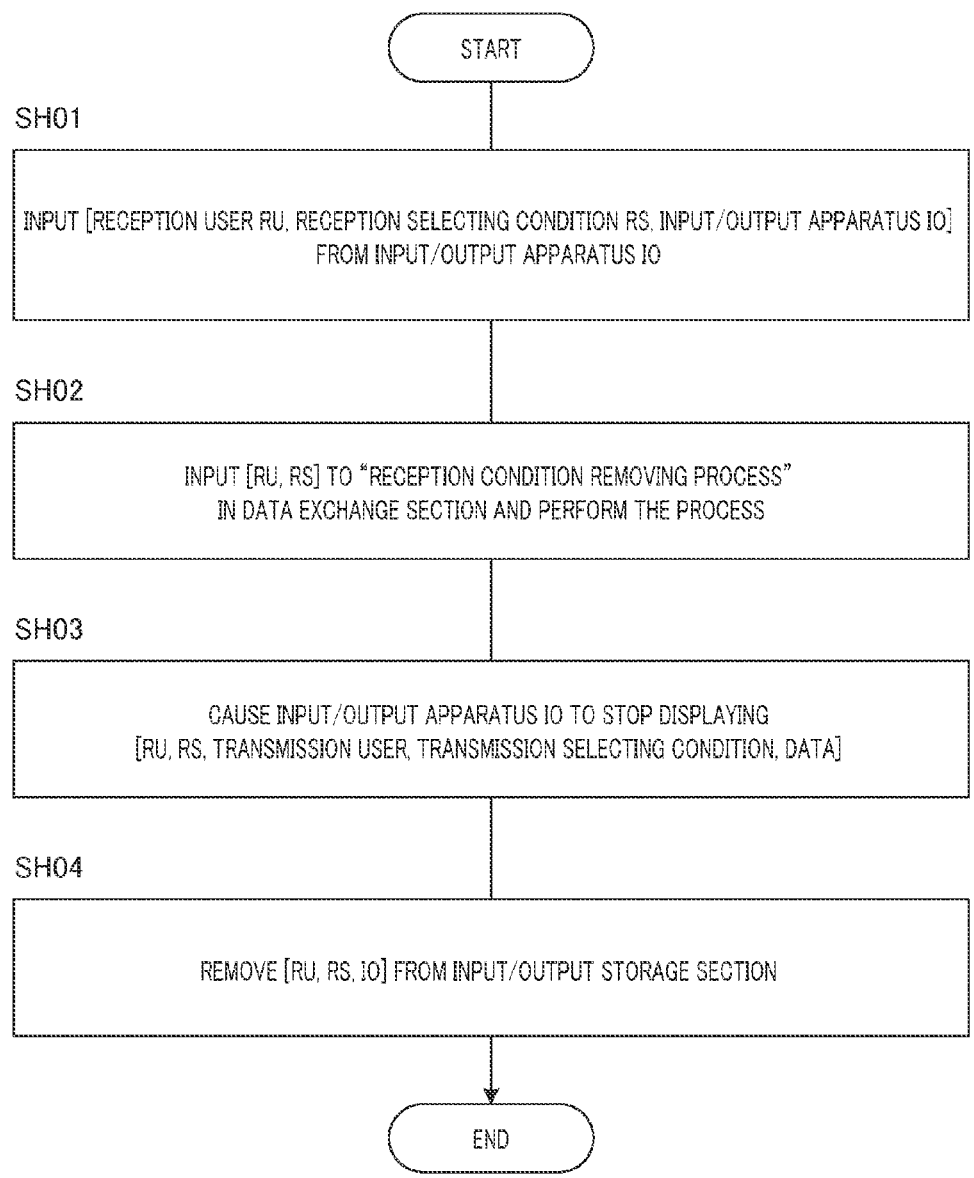
FIG. 16 is a flowchart illustrating a reception condition removing command process by the data exchange system according to the present invention.

FIG. 16 is a flowchart illustrating flow of the reception condition removing command process.

Input/output control section 101 first receives an input, from input/output apparatus IO, [reception user RU, reception selecting condition RS, input/output apparatus IO] (SH01).

Input/output control section 101 outputs [RU, RS] to data exchange section 104 and causes data exchange section 104 to perform reception condition removing process (SH02).

Subsequently, input/output control section 101 causes input/output apparatus IO to stop the display of all of [RU, RS, transmission user, transmission selecting condition, data] (SH03).

Input/output control section 101 then outputs [RU, RS, IO] to input/output storage section 102, causes input/output storage section 102 to perform the reception display removing function, so as to remove [RU, RS, IO] from input/output storage section 102 (SH04), and ends the process.

(Flow of Selection Transmitting Command Process)

Figure 17:
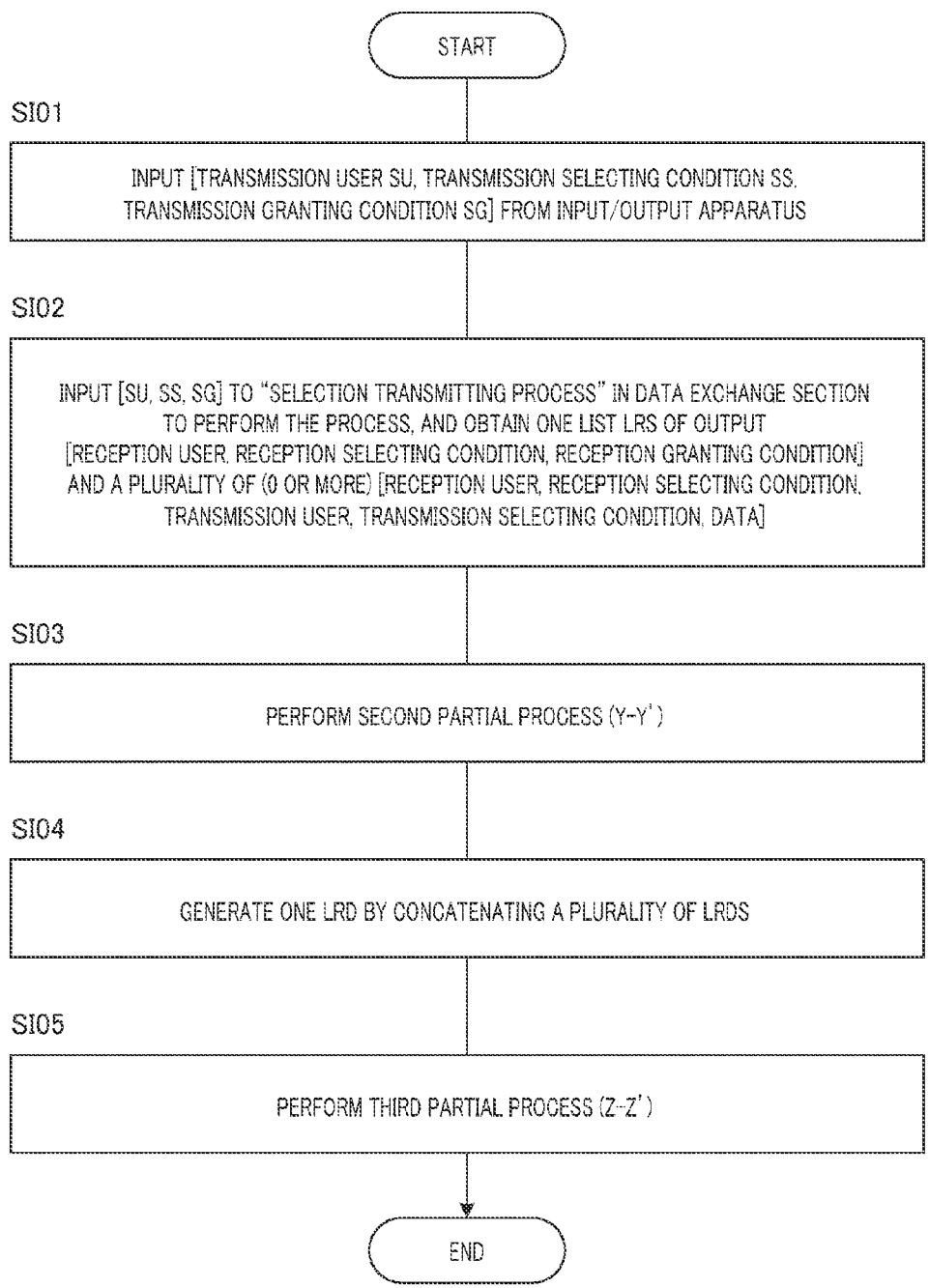
FIG. 17 is a flowchart illustrating a selection transmitting command process by the data exchange system according to the present invention.

FIG. 17 is a flowchart illustrating the selection transmitting command process.

Input/output control section 101 first receives an input [transmission user SU, transmission selecting condition SS, transmission granting condition SG] from input/output apparatus 200 (SI01).

Input/output control section 101 outputs [SU, SS, SG] to data exchange section 104 so as to cause data exchange section 104 to perform the selection transmitting process, and obtains one list LRS of [reception user, reception selecting condition, reception granting condition], and 0 or more list LRD of [reception user, reception selecting condition, transmission user, transmission selecting condition, data] (SI02).

Input/output control section 101 then performs the second partial process on LRS obtained in SI02, and stops display of each [RU, RS, transmission user, transmission selecting condition, data] displayed on input/output apparatus 200, regarding each [reception user RU, reception selecting condition RS] in LRS (SI03).

Next, input/output control section 101 generates one LRD by concatenating a plurality of LRDs obtained in SI02 (SI04).

Input/output control section 101 then performs the third partial process on the LRD, and causes input/output apparatus 200 suitable for the display of each [reception user RU, reception selecting condition RS, transmission user SUA, transmission selecting condition SS, data D], included in LRD (SI05), and ends the process.

(Flow of Transmission Condition Removing Command Process)

Figure 18:
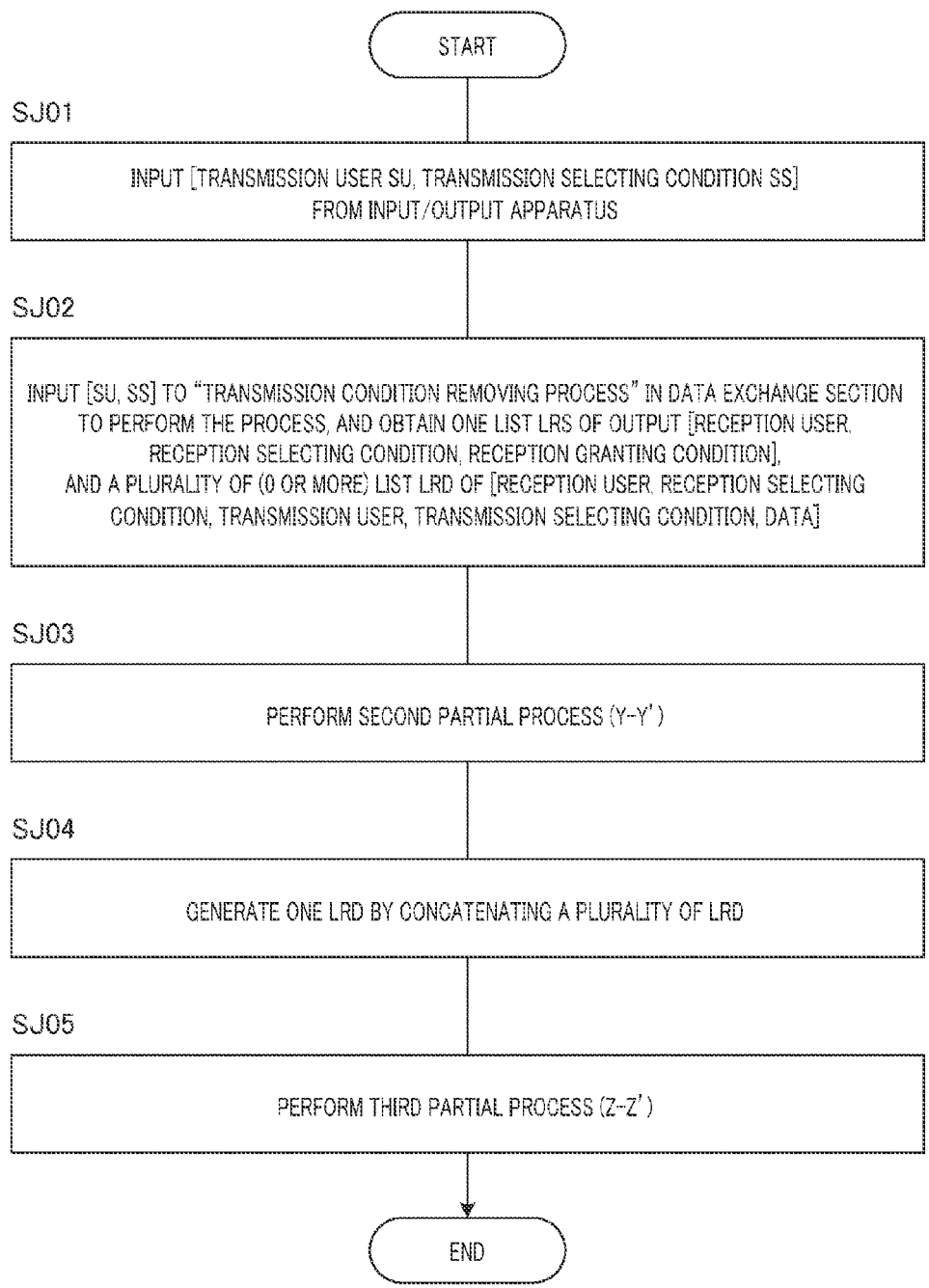
FIG. 18 is a flowchart illustrating a transmission condition removing command process by the data exchange system according to the present invention.

FIG. 18 is a flowchart illustrating flow of the transmission condition removing command process.

Input/output control section 101 first receives an input of [transmission user SU, transmission selecting condition SS] from input/output apparatus 200 (SJ01).

Input/output control section 101 then outputs [SU, SS] to data exchange section 104, causes data exchange section 104 to perform selection transmitting process, and obtains one list LRD of [reception user, reception selecting condition, reception granting condition] and 0 or more list LRD of [reception user, reception selecting condition, transmission user, transmission selecting condition, data] (SJ02).

Input/output control section 101 then performs the second partial process on LRS obtained in SJ02, and stops display of each [RU, RS, transmission user, transmission selecting condition, data] displayed on input/output apparatus 200 for each [reception user RU, reception selecting condition RS] in LRS (SJ03).

Next, input/output control section 101 generates one LRD by concatenating a plurality of LRDs obtained in SJ02 (SJ04).

Input/output control section 101 then performs the third partial process on the LRD, and causes input/output apparatus 200 suitable for the display of each [reception user RU, reception selecting condition RS, transmission user SUA, transmission selecting condition SS, data D] included in LRD to display the items (SJ05), and ends the process.

(Flow of Data Adding Command Process)

Figure 19:
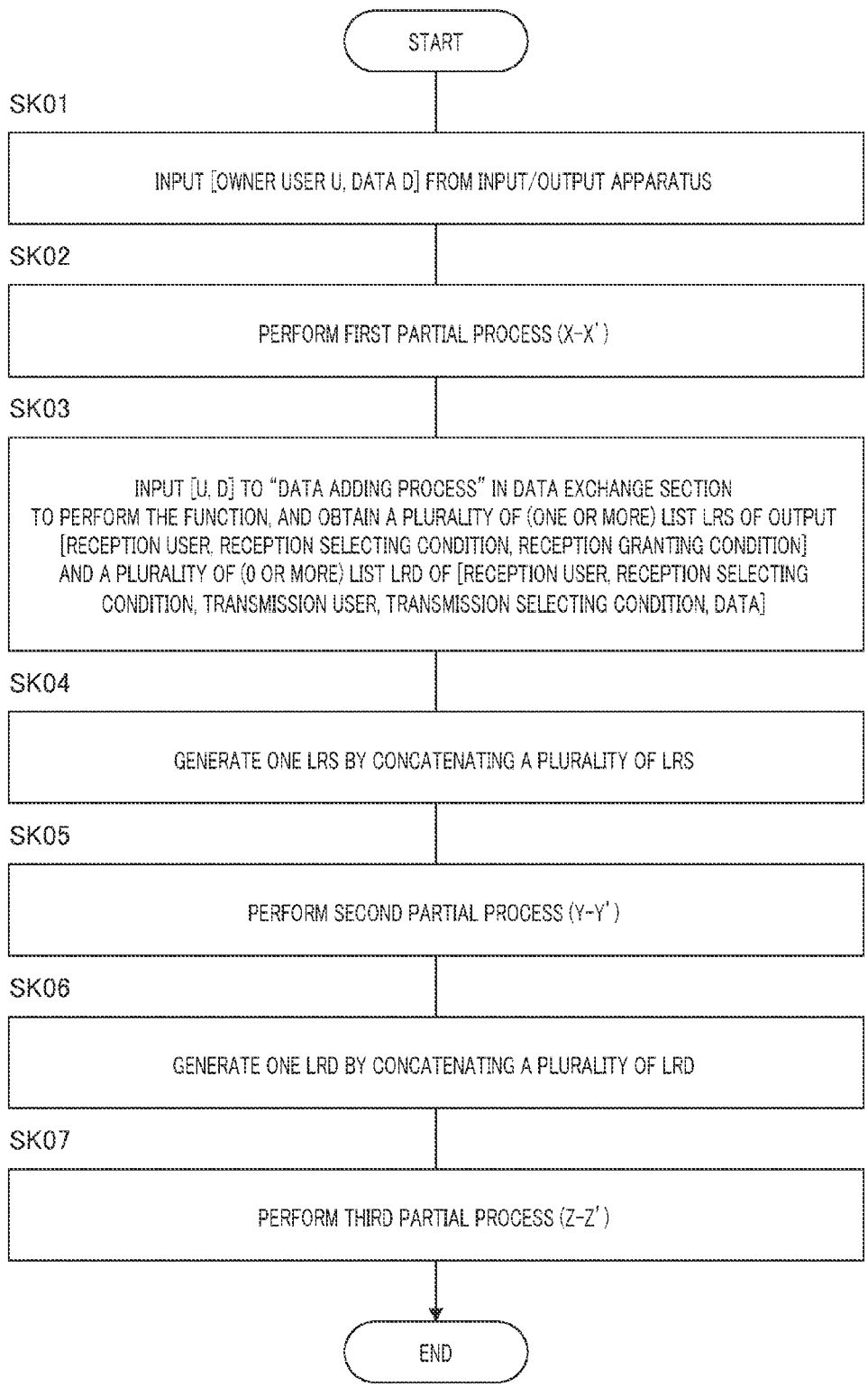
FIG. 19 is a flowchart illustrating a data adding command process by the data exchange system according to the present invention.

FIG. 19 is a flowchart illustrating the data adding command process.

Input/output control section 101 first receives an input of [owner user U, data D] from input/output apparatus 200 (SK01).

Next, input/output control section 101 performs the first partial process on D received in SK01, and replaces an alias included in D with a user identifier (SK02).

Input/output control section 101 subsequently outputs [U, D] to data exchange section 104 and causes data exchange section 104 to perform the data adding process, and obtains one or more list LRS of [reception user, reception selecting condition, reception granting condition] and 0 or more list LRD of [reception user, reception selecting condition, transmission user, transmission selecting condition, data] (SK03).

Input/output control section 101 concatenates a plurality of LRS obtained in SK03 to generate one LRS (SK04).

Input/output control section 101 performs the second partial process on the LRS, and stops display of [RU, RS, transmission user, transmission selecting condition, data] displayed on input/output apparatus 200 for each [reception user RU, reception selecting condition RS] in LRS (SK05).

Input/output control section 101 concatenates a plurality of LRD obtained in SK03 to generate one LRD (SK06).

Next, input/output control section 101 performs the third partial process on the LRD, causes input/output apparatus 200 suitable for the display of [reception user, reception selecting condition, transmission user, transmission selecting condition, data] included in LRD to display the items (SK07), and ends the process.

(Flow of Data Removing Command Process)

Figure 20:
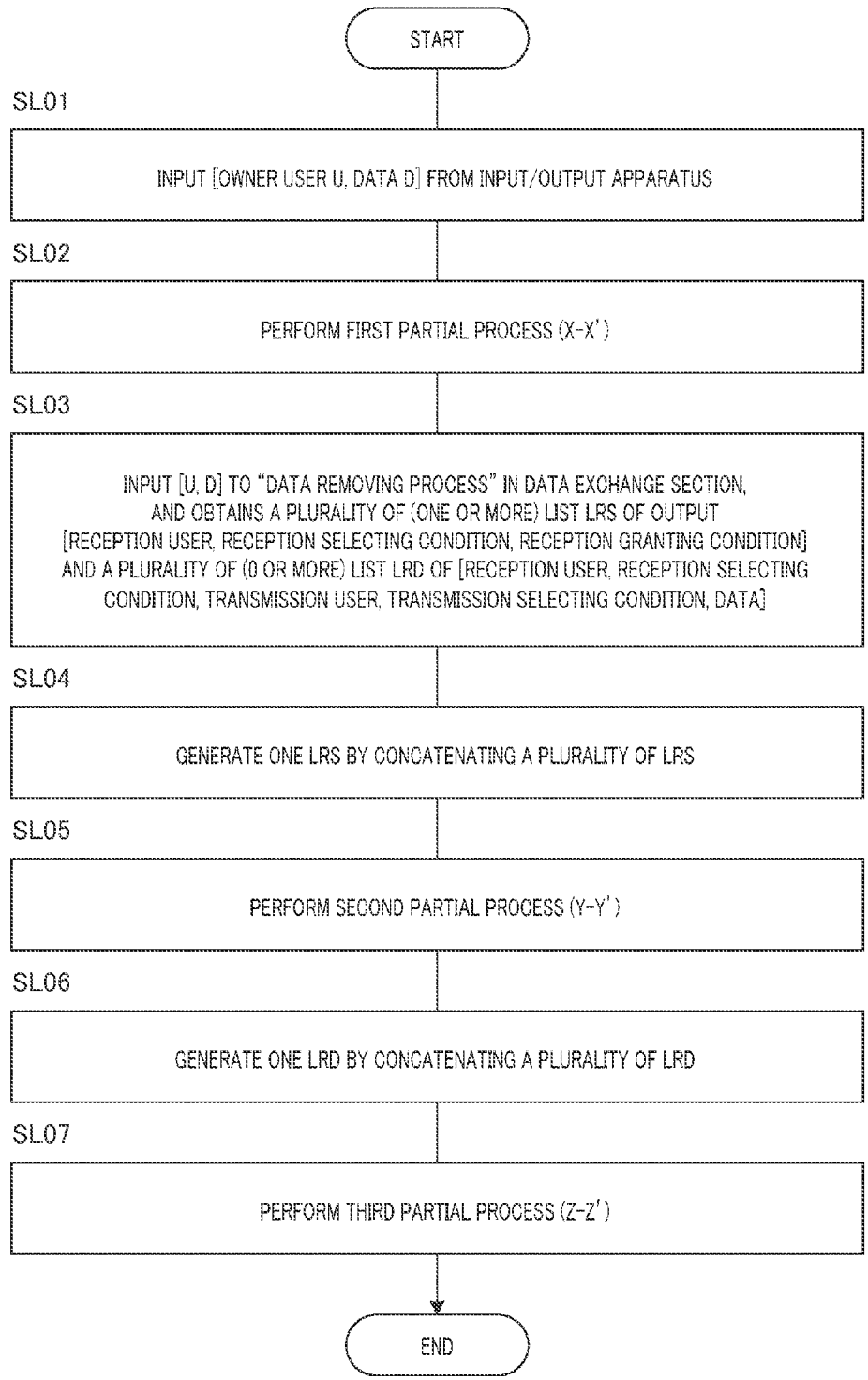
FIG. 20 is a flowchart illustrating a data removing command process by the data exchange system according to the present invention.

FIG. 20 is a flowchart illustrating the data removing command process.

Input/output control section 101 first receives an input of [owner user U, data D] from input/output apparatus 200 (SL01).

Next, input/output control section 101 performs the first partial process on D received in SL01, and replaces an alias included in D with a user identifier (SL02).

Input/output control section 101 subsequently outputs [U, D] to data exchange section 104 and causes data exchange section 104 to perform the data removing process, and obtains one or more list LRS of [reception user, reception selecting condition, reception granting condition] and 0 or more list LRD of [reception user, reception selecting condition, transmission user, transmission selecting condition, data] (SL03).

Input/output control section 101 concatenates a plurality of LRS obtained in SL03 to generate one LRS (SL04).

Input/output control section 101 performs the second partial process on the LRS, and causes input/output apparatus 200 to stop displaying each [RU, RS, transmission user, transmission selecting condition, data] displayed on input/output apparatus 200 for each [reception user RU, reception selecting condition RS] in LRS (SL05).

Input/output control section 101 concatenates a plurality of LRD obtained in SL03 to generate one LRD (SL06).

Next, input/output control section 101 performs the third partial process on the LRD, causes input/output apparatus 200 suitable for the display of each [reception user RU, reception selecting condition RS, transmission user SUA, transmission selecting condition SS, data D] included in LRD (SL07), and ends the process.

[Description on Operations Provided by System 100]

Operations provided by system 100 will be described in detail.

The operations provided by system 100 are performed through an input of corresponding command to input/output control section 101 via input/output apparatus 200.

(Selection Receiving Process)

The selection receiving command is received by input/output control section 101 in system 100 along with [reception user RU, reception selecting condition RS, reception granting condition RG, input/output apparatus IO].

Upon receiving the selection receiving command, input/output control section 101 performs the selection receiving command process.

Input/output control section 101 first outputs [RU, RS, RG] to data exchange section 104 in SG02 and performs the selection receiving process.

Data exchange section 104 performs the selection receiving process. With this, data exchange section 104 selects a transmission user who sets a transmission selecting condition connectable to specified reception selecting condition RS and who satisfies the reception granting condition RG assigned to the reception selecting condition RS and having a transmission granting condition assigned to the transmission selecting condition satisfied by the reception user RU who set the reception selecting condition RS. Data exchange section 104 associates a data item owned by the user and satisfying both the transmission selecting condition and the reception selecting condition RS with [RU, RS] and determines the data item as the reception data [RU, RS, transmission user, transmission selecting condition, data], and outputs the reception data as list LRD. The process is as described in the flow of the selection receiving process.

Next, in SG03, input/output control section 101 stops display of [RU, RS, transmission user, transmission selecting condition, data] having the same reception user RU and reception selecting condition RS displayed on input/output apparatus 200 by the previous transmission and reception.

Next, in SG04, input/output control section 101 stores information on input/output apparatus 200 for displaying each information record in LRD in input/output storage section 102 as [RU, RS, IO].

This action is for searching for and determining input/output apparatus 200 suitable for instruction when displaying or stopping display of the reception data associated with [RU, RS] necessary for processing another command.

Next, input/output control section 101 performs the third partial process in SG05. More specifically, input/output control section 101 receives output LRD of data exchange section 104 in SG02, replaces a user identifier included in the transmission user and the data of [RU, RS, transmission user, transmission selecting condition, data] included in LRD with an alias, causes input/output apparatus IO to display each reception data item, and ends the process.

With the execution process, system 100 can achieve the operation of the selection receiving operation, and can display data with which transmission/reception is performed in a form that does not specify the transmission user and a user referred in the data item.

(Reception Condition Removing Process)

The selection condition removing command is received by input/output control section 101 in system 100 along with [reception user RU, reception selecting condition RS, input/output apparatus IO].

Upon receiving the reception condition removing command, input/output control section 101 performs the receiving condition removing command process.

Input/output control section 101 first receives an input of [RU, RS] for the receiving condition removing process of data exchange section 104 in SH02, and performs the process.

Data exchange section 104 performs the reception condition removing process. With this, data exchange section 104 removes reception selecting condition RS in which reception user RU is specified and a reception granting condition assigned to reception selecting condition RS from the storage, and removes reception data [RU, RS, transmission user, transmission selecting condition, data] associated with [RU, RS]. This process is as described in the process flow in the reception condition removing process.

Next, in SH03, input/output control section 101 stops display of [RU, RS, transmission user, transmission selecting condition, data] having the same reception user RU and reception selecting condition RS displayed on input/output apparatus 200 by the previous transmission and reception.

Input/output control section 101 removes [RU, RS, IO] including registration of input/output apparatus 200 suitable for displaying reception data item associated with [RU, RS] registered in SH04, and ends the process.

With the process described above, system 100 achieves reception condition removing operation (process thereof), and stops display of the received data item associated with [reception user RU, reception selecting condition RS] by the previous transmission/reception.

(Selection Transmitting Process)

Selection transmitting command is provided to input/output control section 101 in system 100 along with [transmission user SU, transmission selecting condition SS, transmission granting condition SG].

Upon receiving the selection transmitting command, input/output control section 101 performs the selection transmitting command process.

Input/output control section 101 first outputs [SU, SS, SG] to data exchange section 104 in SI02 and performs the selection transmitting process.

Data exchange section 104 performs the selection transmitting process. With this, data exchange section 104 selects a reception user who sets a reception selecting condition connectable to specified transmission selecting condition SS, satisfies transmission granting condition SG assigned to transmission selecting condition SS, and transmission user SU who sets the transmission selecting condition SS satisfies the reception granting condition assigned to the reception selecting condition. Subsequently, data exchange section 104 determines a data item owned by the transmission user SU and satisfying both the transmission selecting condition SS and the reception selecting condition as a reception data item associated with the reception selecting condition. This process is as described in the process flow in the selection transmission process.

In this process, data exchange section 104 outputs list LRS of [reception user, reception selecting condition, reception granting condition] including reception data item that requires change in the display, and list LRD of [reception user, reception selecting condition, transmission user, transmission selecting condition, data] the reception data items that requires change in display of reception data.

Next, input/output control section 101 performs second partial process in SI03. More specifically, upon output LRS of data exchange section 104 in SI02, input/output control section 101 stops display of the received data associated with [reception user, reception selecting condition] that may have associated with reception data changed.

Input/output control section 101 then concatenates LRD provided from data exchange section 104 into one LRD, and performs the third partial process in SI05. More specifically, input/output control section 101 causes input/output apparatus 200 to display each reception data items included in LRD [reception user, reception selecting condition, transmission user, transmission selecting condition, data] after replacing the transmission user and a user identifier included in the data with aliases, and ends the process.

With the execution process, system 100 can achieve the operation of the selection transmitting operation, and can display data with which transmission/reception is performed in a form that does not specify the transmission user and the user referred in the data item.

(Transmission Condition Removing Process)

Transmission condition removing command is input to input/output control section 101 in system 100 along with [transmission user SU, transmission selecting condition SS].

Upon receiving the transmission condition removing command, input/output control section 101 performs the transmission condition removing command process.

In SJ02, input/output control section 101 first outputs [SU, SS] to data exchange section 104, and causes data exchange section 104 to perform the transmission condition removing process.

Data exchange section 104 performs the transmission condition removing process. With this, data exchange section 104 removes specified transmission selecting condition SS of specified transmission user SU and transmission granting condition SG assigned to transmission selecting condition SS from the storage, and removes [reception user, reception selecting condition, SU, SS, data] associated with each reception selecting condition connectable to the transmission selecting condition SS and determined as the reception data item from the reception data items. This process is as described in the process flow in the transmission condition removing process.

In this process, data exchange section 104 outputs list LRS of [reception user, reception selecting condition, reception granting condition] that requires change in display of reception data, and list LRD of [reception user, reception selecting condition, transmission user, transmission selecting condition, data] of the reception data that should be displayed after the change.

Next, input/output control section 101 performs the second partial process in SJ03. More specifically, upon output of LRS from data exchange section 104 in SJ02, input/output control section 101 stops display of the reception data items associated with [reception user, reception selecting condition] having possibility that an associated reception data item is changed.

Input/output control section 101 then concatenates LRD provided from data exchange section 104 into one LRD, and performs the third partial process in SJ05. More specifically, input/output control section 101 causes input/output apparatus 200 to display each received data [reception user RU, reception selecting condition RS, transmission user SUA, transmission selecting condition SS, data D] included in LRD after replacing a user identifier included in the transmission data and the data with an alias, and ends the process.

With the execution process, system 100 can achieve the operation of the transmission condition removing operation, and can display data with which transmission/reception is performed in a form that does not specify the transmission user and a user referred in the data item.

(Data Adding Process)

A data adding command is input to input/output control section 101 of system 100 along with [owner user U, data D].

Upon the input of the data adding command, input/output control section 101 performs the data adding command process.

Input/output control section 101 first performs the first partial process in SK02, and replaces each alias included in D with a user identifier.

Input/output control section 101 then outputs [U, D] to data exchange section 104 and causes data exchange section 104 to perform the data adding process.

Data exchange section 104 performs the data adding process. More specifically, data exchange section 104 adds specified data D to the storage as the data of a specified transmission (owner) user U, associates only data items of the transmission user U available for transmission/reception in a state after the data D is added with a reception selecting condition connectable to each transmission selecting condition of the transmission user U and determines the data item as the reception data item. Subsequently, data exchange section 104 performs the selection receiving operation again for each reception selecting condition of the transmission user U, and determines only data items available for transmission/reception after the data is added as the reception data items. This process is as described in the process flow in the data adding process.

In this process, data exchange section 104 outputs list LRS including [reception user, reception selecting condition, reception granting condition] that requires change in display of reception data, and list LRD including [reception user, reception selecting condition, transmission user, transmission selecting condition, data] including reception data to be displayed after the change.

In SK04, input/output control section 101 then concatenates LRS provided from data exchange section 104 into one LRS, and in SK05, performs the second partial process. More specifically, input/output control section 101 stops display of reception data items associated with [reception user, reception selecting condition] having possibility that an associated reception data item is changed.

Input/output control section 101 then concatenates LRD provided from data exchange section 104 into one LRD, and performs the third partial process in SK07. More specifically, input/output control section 101 causes input/output apparatus 200 to display each reception data [reception user RU, reception selecting condition RS, transmission user SUA, transmission selecting condition SS, data D] included in LRD after replacing the transmission user and a user identifier included in the data with aliases, and ends the process.

With the execution process, system 100 can achieve the operation of the data adding operation, and can display a data item with which transmission/reception is performed in a form that does not specify the transmission user and a user referred in the data item.

(Flow of Data Removing Process)

A data removing command is input to input/output control section 101 of system 100 along with [owner user U, data D].

Upon receiving the data removing command, input/output control section 101 performs the data removing command process.

Input/output control section 101 first performs "a partial process for replacing an alias included in input data D with a user identifier" so as to replace each alias included in D with a user identifier.

Input/output control section 101 then outputs [U, D] to data exchange section 104 and causes data exchange section 104 to perform the data removing process in SL02.

Data exchange section 104 performs the data removing process. More specifically, data exchange section 104 removes specified data D from the storage of transmission (owner) user U, and associates only the data items owned by the transmission user U available for transmission/reception in a state after the data D is removed with a reception selecting condition connectable to each transmission selecting condition of the transmission user U to determine the reception data item. Subsequently, data exchange section 104 performs the selective reception operation again for each reception selecting condition of the transmission user U, and determines only data items available for transmission/reception after the data item is removed as the reception data items. This process is as described in the process flow in the data removing process.

In this process, data exchange section 104 outputs list LRS of [reception user, reception selecting condition, reception granting condition] that requires change in the display of reception data, and list LRD of [reception user, reception selecting condition, transmission user, transmission selecting condition, data] of the reception data item that should be displayed after the change.

Input/output control section 101 then concatenates LRS provided from data exchange section 104 into one LRS, and performs the second partial process in SL05. More specifically, input/output control section 101 stops display of reception data items associated with [reception user, reception selecting condition] having possibility that an associated reception data item is changed.

Input/output control section 101 then concatenates LRD provided from data exchange section 104 into one LRD in SL06, and performs the third partial process in SL07. More specifically, input/output control section 101 causes input/output apparatus 200 to display each reception data [reception user RU, reception selecting condition RS, transmission user SUA, transmission selecting condition SS, data D] included in LRD after replacing the transmission user and a user identifier included in the data with aliases, and ends the process.

With the execution process, system 100 can achieve the operation of the data removing operation, and can display data with which transmission/reception is performed in a form that does not specify the transmission user and a user referred in the data item.

As described above, system 100 in the embodiment stores a reception selecting condition, a transmission selecting condition, a reception granting condition, a transmission granting condition, and owned data item associated with each user, and always performs available transmission/reception determined by the conditions and the owned data. Subsequently, system 100 in Embodiment stores transmitted/received (transmission user, data) in association with (reception user, reception selecting condition), and displays the data items in a form that does not specify the user.

However, the present invention is not limited to a form which allows execution of all of available transmission/reception in real time.

The present invention may be implemented such that transmission/reception is performed only when a pull-type search is performed, as in the conventional web search. More specifically, the present invention does not perform transmission/reception when adding and removing the transmission selecting condition, transmission granting condition, and the owned data, but can perform transmission/reception only when the reception user specifies the reception selecting condition and the reception granting condition and performs the selection receiving operation.

In this case, only selection receiving operation specifying reception selecting condition and the reception granting condition is performed, instead of transmitting/receiving data in real time by performing the selection transmitting operation and the selection receiving operation each time the storage content is changed. Accordingly, it is not necessary to store the reception selecting condition and the reception granting condition.

In addition, since the newest state is not reflected on the reception data in real time, once the reception data is displayed on input/output apparatus 200, it is not necessary to hold the reception data (performed transmission/reception) in system 100.

In contrast, according to the present invention, the transmission/reception is performed so as to update the reception data item only when the transmission user specifies the transmission selecting condition and the transmission granting condition and performs an operation for the selection transmitting operation, without the reception user performing transmission/reception of data items when registering the reception selecting condition and the reception granting condition, as in e-mail.

In this case, the registration on the reception selecting condition corresponds to the setting of the reception address and the reception port, and the registration of the transmission selecting condition corresponds to transmission to the address and the port.

Subsequently, the reception user specifies the reception selecting condition, and in the same manner as opening an inbox, views the reception data items stored in association with [reception user, reception selecting condition] at that time.

As described above, each of the processes in the operations described in Embodiment is included in Embodiments of the present invention. Subsequently, it is not necessary for the system according to the present invention to include all of the operations.

However, as in the description above, if the system includes all of the operations, an important supplemental effect that all of the available transmission/reception is performed in real time in synchronization with changes in the set condition and the registered data.

However, the aim of the present invention is to select a pair of [reception user, reception selecting condition, reception granting condition] and [transmission user, transmission selecting condition, transmission granting condition] having a reception selecting condition and a transmission selecting condition that are connectable and having a reception granting condition and a transmission granting condition satisfied by the owned data of the reception user and the transmission user who set the reception selecting condition and the transmission selecting condition, to select at least one [transmission user, data] including a data item satisfying both [reception selecting condition, transmission selecting condition] from the data items owned by the transmission user, and associates the selected item with [reception data, reception selecting condition] and determines the data item as the reception data item.

In view of the purpose, the description regarding system 100 including all of the operations described above (Example 1) and system 100 using selective or modified operations of the operations described above (Example 2) will be described.

The idea that a reception selecting condition and a transmission selecting condition are "connectable", that is, a procedure for selecting the pair will be described according to specific data and conditions.

Similarly, evaluations of a reception granting condition and a transmission granting condition, and a search for data satisfying both the reception selecting condition and the transmission selecting condition will be described. The evaluation and the search may be performed by a conventional data search technology.

Example 1

In the following description, a message exchange system aiming for exchanging informal information such as evaluations, impressions, experiences and others regarding restaurants will be described as Example 1 implementing Embodiment described above.

The message exchange system (hereafter referred to as "system") is used as means for exchanging informal information between users regarding taste and appearance of food on a menu and service at a shop.

The information written by each user on the following topics for each shop is held by the user who wrote the information.

Shop
Service
Appearance of menu item (each menu item)
Taste of menu item (each menu item)

The user enters evaluation points and comments on each topic. Entry time, shop (name), topic (any of the items above), author (user), and a message number are assigned to the information to generate a message. The message corresponds to a data item stored in a data storage section in Embodiment.

Messages entered and/or held by the user are data sequence each including time, shop, topic, author, message number, points, and comments.

In Example, "user" in the item is user identification information, and is a mobile phone number in the system.

However, when displaying the user, the user is displayed in an alias composed of 4-digit integers in order to prevent the user from being specified.

Note that, each message can be uniquely identified by a message ID consisting of the user and the message number.

FIG. 24 represents an example of a message. Note that, in the comments, another user (or message) is referred by an alias different from the other users, instead of the user identification information. The alias is consistent at least in the range of the following message board. Stated differently, the same alias is used for the same user.

With regard to each item in the message, the reception selecting condition and the transmission selecting condition are conditions for selecting a message by specifying a range for time, only one name for shops, and one or more topics.

The reception selecting condition and the transmission selecting condition are represented by a data sequence illustrated in FIG. 25, in the same manner as a message. The condition represented by the data sequence is "Message regarding appearance or taste of ramen at Chinese Restaurant, Shinjuku west exit branch after 2012/01/01 00:00:00 up until now".

In the system, the reception selecting condition and the transmission selecting condition are "connectable" when the conditions are determined such that a message satisfying the transmission selecting condition always satisfies the reception selecting condition. More specifically, the reception selecting condition and the transmission selecting condition are treated as "connectable" when the name of shop matches, a range of time in the transmission selecting condition is included in a range of the reception selecting condition, and all of the topics in the transmission selecting condition are included in the topics of the reception selecting condition.

The reception granting condition and the transmission granting condition specify a message that the transmission user and the reception user must own (essential message), and a message that the transmission user and the reception user must not own (prohibited message), respectively.

Stated differently, as a condition satisfied by each message, each user specifies only one name of the shop, at least one topic, a range of points, and keywords (word, not word).

The system specifies a message that includes, in comments, all of specified {word} in a specified range of time, a specified shop, any of specified topics, a specified range of points, and does not include any of the specified not {word} in comments. Note that, unspecified items are not limited.

In the example illustrated in FIG. 26, a message regarding the taste of ramen at Ramen professionals, having a point equal to or lower than 30 points, and including keyword "tastes bad" or "tastes terrible", but not "tasty" is specified, for example.

A data sequence for specifying an essential message and a prohibited message may be described for each set. Note that, specifying one of an essential message and a prohibited message may be omitted.

Each user browses a message board including messages selectively received based on the conditions from others or the user sorted by a specified item, and adds and deletes the user's own messages.

Upon specifying sorting keys, items can be specified as layer (concatenation) keys. For example, the topic is specified as the first key, and the time is specified as the second key. The message board provides an interface similar to a bulletin board to a user in that regard.

The user can use more than one message board. Each message board is generated by specifying a condition for selectively receiving messages to be displayed on the message board. The condition includes a reception selecting condition regarding messages to be received and displayed, and a reception granting condition regarding any message owned by a transmission user (owner) of the messages.

When the reception user inputs "selection receiving command" with the reception selecting condition and the reception granting condition and a sort key specified, the system sorts messages received based on these conditions by the specified sort key, and displays on input/output apparatus 200 as a message board.

The user may input the selection receiving command again by specifying a message board that has already been set (the reception selecting condition and the reception granting condition). In this case, the message board is deleted once, and is updated depending on the status of messages at that time.

In contrast, the user can disclose a message registered and owned by the user himself by displaying the message on a message board of another user by a "selection transmitting command".

The selection transmitting command includes a transmission selecting command for selecting messages to be disclosed, and a transmission granting condition regarding a given message owned by the reception user who receives the messages.

When the transmission user inputs "selection transmitting command", with the transmission selecting condition, the transmission granting condition, and a sort key specified, the system sorts messages owned by the transmission user selected based on the transmission selecting condition by the specified sort key, and displays the sorted messages on input/output apparatus 200 as a transmission list.

At the same time, the system determines, based on these conditions, a reception user who receives these messages and a message board used for displaying (receiving) the messages, adds the messages in the transmission list to each message board and sorts the messages again and updates the message board of the reception user on input/output apparatus 200.

An input by the user without specifying the reception granting condition or the transmission granting condition in the same format as the selection receiving command and the selection transmitting command, that is, an input not including the essential message or the prohibited message is provided, the command is treated as "reception condition removing command" or "transmission condition removing command".

Stated differently, selective reception or selective transmission (disclosure) regarding (reception user, reception selecting condition) and (transmission user, transmission selecting condition) that has been performed is stopped.

The user may input, using input/output apparatus 200, "data adding command" and "data deleting command" including messages in the formats described above so as to add or remove a message owned by the user.

The system modifies the reception data items stored in the reception data storage section 107 such that the reception data items are suitable for transmission/reception available in a state after the change by adding/removing message, and reflects the modification to the display on the message board.

The system processes each command described above based on the same procedure as described in the embodiment.

The configuration of the system, and processing by data exchange section 104 and input/output control section 101 are identical to those in Embodiment. Accordingly, in Example, methods for achieving function of each storage section are described with reference to specific data and conditions described above as information sufficient to implement the system.

In the system, the user (owner user, reception user, transmission user) uses a mobile phone number as an item of information record. Data sequences of the reception selecting condition and the transmission selecting condition are used for the reception selecting condition and the transmission selecting condition. Data sequences of the reception granting condition and the transmission granting condition are used for the reception granting condition and the transmission granting condition. Data sequences of the data are used for the data. As an alias, 4-digit integers are used. A port number used for communication with input/output apparatus 200 is used as input/output apparatus 200.

(Reception Condition Removing Function, Reception Condition Adding Function)

Reception condition storage section 105 stores a mobile phone number of a user and data sequences of the reception selecting condition and the reception granting condition as [reception user, reception selecting condition, reception granting condition].

Reception condition storage section 105 assigns indexes to the data sequences sorted by the following concatenation keys.

The priority of the keys is the first key, and the second key, from left to right.

X1: Shop in the reception selecting condition, reception user mobile phone number X2: Reception user mobile phone number The reception condition removing function is implemented, using index X1, by listing data sequences of [reception user, reception selecting condition, reception granting condition] having a matching shop and the mobile phone number of the reception user in the specified reception selecting condition, and by removing data sequences having a reception selecting condition matching the specified reception selecting condition.

The reception condition adding function is implemented, using index X1, by storing a data sequence of [reception user, reception selecting condition, reception granting condition] and adding an entry specifying the data sequence at a position at the tail of entries having a matching shop in the reception selecting condition specified and mobile phone number of the reception user.

(Reception Selecting Condition Searching Function)

Figure 21:
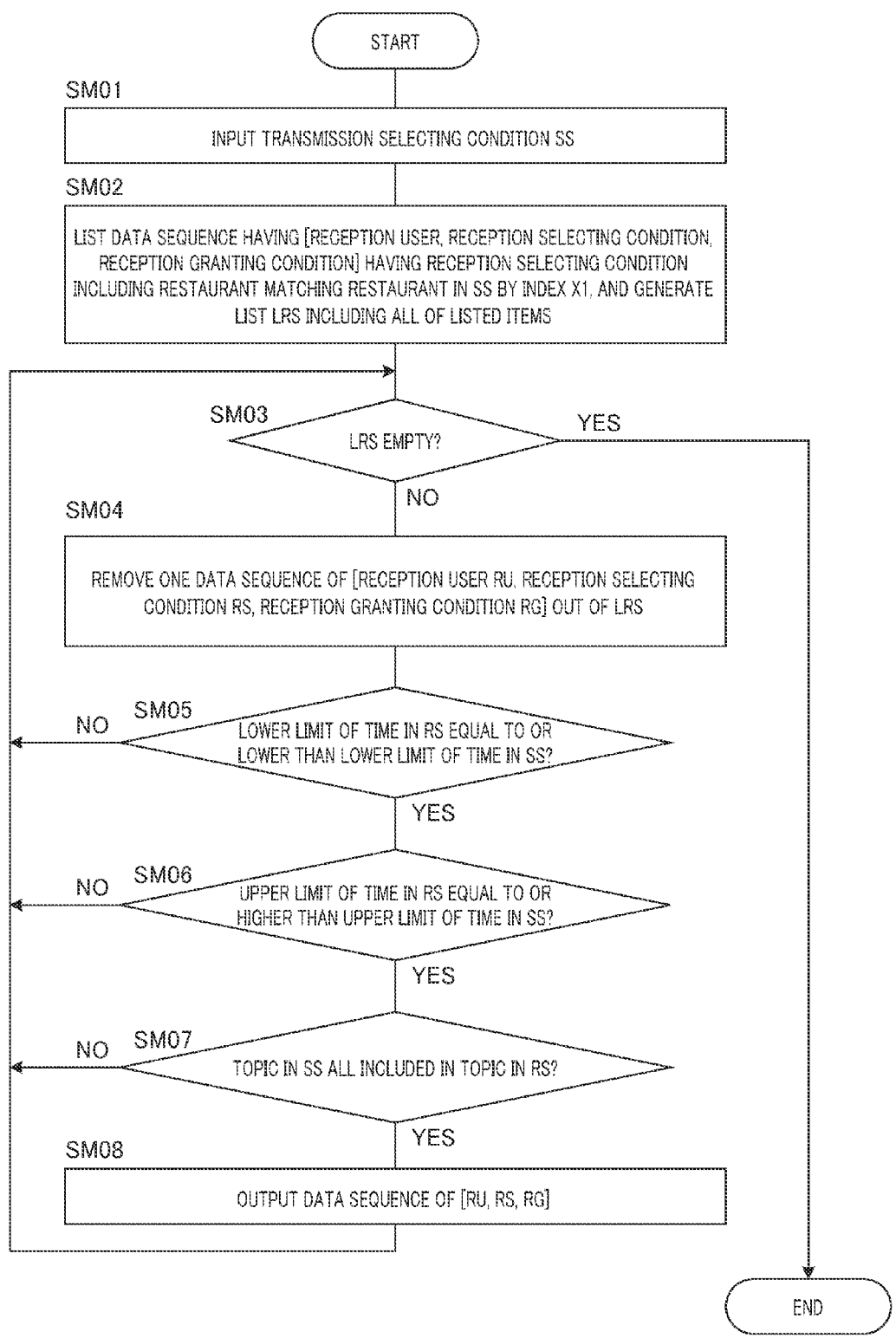
FIG. 21 is a flowchart illustrating a process for implementing searching function for reception selecting condition in Example 1 of the data exchange system according to the present invention.

FIG. 21 is a flowchart illustrating the process for implementing the reception selecting condition searching function.

The system first receives an input of transmission selecting condition SS (SM01).

Next, using index X1, the system lists data sequences having [reception user, reception selecting condition, reception granting condition] having a reception selecting condition including a shop matching the shop in SS, and generates list LRS including the listed data sequences (SM02).

Next, the system determines whether or not LRS is empty (SM03). If the determination in SM03 is yes, the system ends the process.

In contrast, if the determination in SM03 is no, the system removes one [reception user RU, reception selecting condition RS, reception granting condition RG] out of LRS (SM04).

Next, the system determines whether the RS has the lower limit in time lower than or equal to the lower limit in time in SS (SM05).

If the determination in SM05 is no, the process returns to SM03, and the system determines whether or not LRS is empty again. Subsequently, the system repeats the process from SM03 to SM05 as long as the determination in SM03 is no, and the determination in SM05 is no.

In contrast, if the determination in SM05 is yes, the system determines whether the upper limit of the time in RS is greater than or equal to the upper limit of the time in SS (SM06).

If the determination in SM06 is no, the process returns to SM03, and the system determines whether or not LRS is empty again. Subsequently, the system repeats the process from SM03 to SM06 as long as the determination in SM03 is no, the determination in SM05 is yes, and the determination in SM06 is no.

In contrast, if the determination in SM06 is yes, the system determines whether or not all of the topics in SS are included in the topics in RS (SM07).

If the determination in SM07 is no, the process returns to SM03, and the system determines whether or not LRS is empty again. Subsequently, the system repeats the process from SM03 to SM07 as long as the determination in SM03 is no, the determination in SM05 is yes, the determination in SM06 is yes, and the determination in SM07 is no.

In contrast, if the determination in SM07 is yes, the system outputs [RU, RS, RG] (SM08). Subsequently, the process returns to SM03, and the system determines whether or not LRS is empty again. Subsequently, the system repeats the process from SM03 to SM08 as long as the determination in SM03 is no, the determination in SM05 is yes, the determination in SM06 is yes, and the determination in SM07 is yes.

By performing the procedure, [reception user, reception selecting condition, reception granting condition] having a reception selecting condition including a matching shop name, a range of time in the transmission selecting condition included in a range of time in the reception selecting condition, and all of topics in the transmission selecting condition included in topics of the reception selecting condition is output.

(Reception Condition User Search Function)

The reception condition user search function can be implemented by listing data sequences of [reception user, reception selecting condition, reception granting condition] matching a mobile phone number of a specified reception user, by using index X2.

(Transmission Condition Removing Function, Transmission Condition Adding Function)

Transmission condition storage section 106 stores data sequences similar to the data sequences stored in reception condition storage section 105 as [transmission user, transmission selecting condition, transmission granting condition].

Transmission condition storage section 106 assigns indexes to the data sequences sorted by the following concatenation keys to these data sequences.

X3: Shop in the transmission selecting condition, transmission user mobile phone number X4: Transmission user mobile phone number, entire transmission selecting condition The transmission condition removing function is achieved, using index X3, by listing data sequences of [transmission user, transmission selecting condition, transmission granting condition] having a shop and a mobile phone number of the transmission user matching the specified transmission selecting condition, and removing, from the listed data sequences, data sequences having a transmission selecting condition matching the specified transmission selecting condition.

The transmission condition adding function is implemented by storing data sequences of [transmission user, transmission selecting condition, transmission granting condition] and adding, using index X3, an entry specifying the data sequence at a position at the tail of entries having a matching shop and a matching transmission user mobile phone number in the specified transmission selecting condition.

(Transmission Selecting Condition Searching Function)

Figure 22:
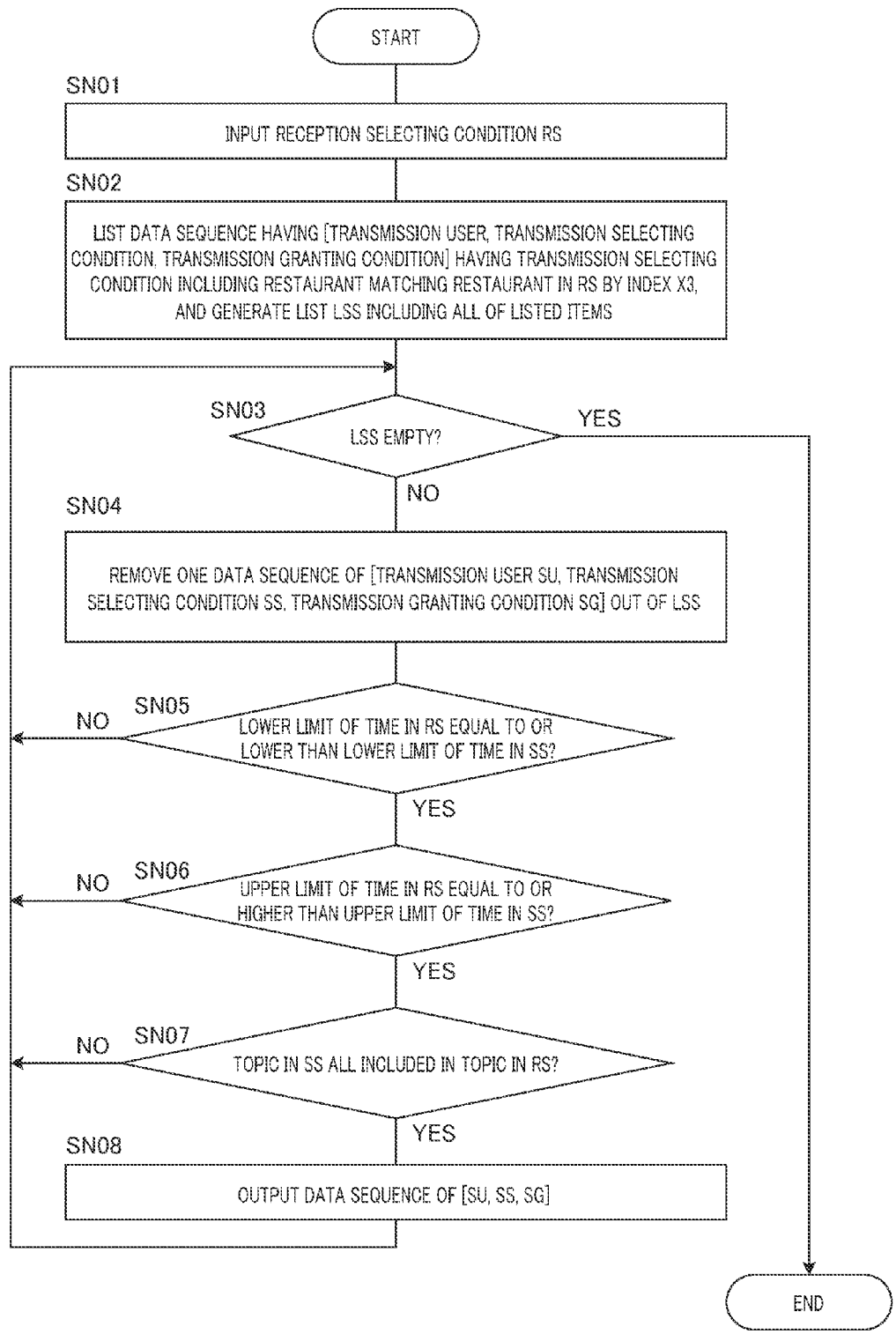
FIG. 22 is a flowchart illustrating a process for implementing searching function for transmission selecting condition in Example 1 of the data exchange system according to the present invention.

FIG. 22 is a flowchart illustrating the process for implementing the transmission selecting condition searching function.

The system first receives an input of reception selecting condition RS (SN01).

The system subsequently lists, using index X3, data sequences of [transmission user, transmission selecting condition, transmission granting condition] having a transmission selecting condition including a shop matching the shop in RS, and generates list LSS including the listed items (SN02).

The system subsequently determines whether or not LSS is empty (SN03). If the determination in SN03 is yes, the system ends the process.

If the determination in SN03 is no, the system removes one [transmission user SU, transmission selecting condition SS, transmission granting condition SG] out of LSS (SN04).

Next, the system determines whether the RS has the lower limit in time lower than or equal to the lower limit in time in SS (SN05).

If the determination in SN05 is no, the process returns to SN03, and the system determines whether or not LSS is empty again. Subsequently, the system repeats the process from SN03 to SN05 as long as the determination in SN03 is no, and the determination in SN05 is no.

In contrast, if the determination in SN05 is yes, the system determines whether the upper limit of the time in RS is greater than or equal to the upper limit of the time in SS (SN06).

If the determination in SN06 is no, the process returns to SN03, and the system determines whether or not LSS is empty again. Subsequently, the system repeats the process from SN03 to SN06 as long as the determination in SN03 is no, the determination in SN05 is yes, and the determination in SN06 is no.

In contrast, if the determination in SN06 is yes, the system determines whether or not all of the topics in SS are included in the topics in RS (SN07).

If the determination in SN07 is no, the process returns to SN03, and the system determines whether or not LSS is empty again. Subsequently, the system repeats the process from SN03 to SN07 as long as the determination in SN03 is no, the determination in SN05 is yes, the determination in SN06 is yes, and the determination in SN07 is no.

In contrast, if the determination in SN07 is yes, the system outputs [SU, SS, SG] (SN08). Subsequently, the process returns to SN03, and the system determines whether or not LSS is empty again. Subsequently, the system repeats the process from SN03 to SN08 as long as the determination in SN03 is no, the determination in SN05 is yes, the determination in SN06 is yes, and the determination in SN07 is yes.

By performing the procedure, [transmission user, transmission selecting condition, transmission granting condition] having a transmission selecting condition including a matching shop name, a range of time in the transmission selecting condition included in a range of time in the reception selecting condition, and all of topics in the transmission selecting condition included in topics of the reception selecting condition is output.

(Transmission Condition User Searching Function)

The transmission condition user searching function can be implemented, using index X4, by listing data sequences of [transmission user, transmission selecting condition, transmission granting condition] having a transmission user mobile phone number matching the specified mobile phone number of the transmission user.

(Owned Data Adding Function, Owned Data Removing Function)

Owned data storage section 108 stores data sequences of the message including an owner user mobile phone number as [owner user, data]. Note that, the owner user may be a transmission user or a reception user.

Owned data storage section 108 assigns the following indexes to the data sequences and stores the data sequences with the indexes.

X5: Owner user mobile phone number, shop, topic, time

X6: Entire message (data sequence)

The owned data adding function is implemented by storing the message above and adding an entry indicating the message to index X5 and index X6.

The owned data removing function is implemented by searching for index X6, specifies a message [transmission user, data] stored and removes a specified message, and removes entries of indexes X5 and X6 indicating the message.

(Granting Condition Determining Function)

Granting condition determining function is implemented by the following procedure using index X5.

1. Checking Essential Message in Reception Granting Condition

The system lists, using index X5, messages using the transmission user mobile phone number, the shop in the essential message, and the topic of the essential message (if there are more than one topic, each topic will be used) as keys.

Subsequently, the system checks the following conditions 1.1. to 1.3. for each of the listed messages, and if all of the conditions are satisfied, the system determines that the message as an essential message.

1.1. Compare points with the lower limit and the upper limit of the range of points in granting condition, and the points are greater than or equal to the lower limit and smaller than or equal to the upper limit.

1.2. Search whether or not the comments include words in {word} in a granting condition, and all of the words are included.

1.3. Search whether or not the comments include words in not{word} in a granting condition, and none of the words is included.

2. Checking Prohibited Message in Reception Granting Condition

The system lists, using index X5, messages using the transmission user mobile phone number, the shop in the prohibited message, the topic of the prohibited message (if there are more than one topic, each topic will be used) as keys.

Subsequently, the system checks the conditions 1.1. to 1.3. described above for each of the listed messages, and if all of the conditions are satisfied, the system determines that the message as a prohibited message.

3. Checking Essential Message in Reception Granting Condition

The system lists, using index X5, messages using the reception user mobile phone number, the shop in the essential message, the topic of the essential message (if there are more than one, each topic will be used) as keys.

Subsequently, the system checks the conditions 1.1. to 1.3. described above for each of the listed messages, and if all of the conditions are satisfied, the system determines that the message as an essential message.

4. Checking Prohibited Message in Reception Granting Condition

The system lists, using index X5, messages using the reception user mobile phone number, the shop in the prohibited message, the topic of the prohibited message (if there are more than one, each topic will be used) as keys.

Subsequently, the system checks the following conditions 1.1. to 1.3. for each of the listed messages, and if all of the conditions are satisfied, the system determines that the message as a prohibited message.

5. Final Check

When a message is detected in the item 1 and the item 3, and no message is detected in the item 2 and the item 4, the system determines that the reception granting condition and the transmission granting condition are satisfied for each reception user and transmission user, and determines that the reception granting condition and the transmission granting conditions are not satisfied otherwise.

(Selection Condition Searching Function)

Selection condition searching function is implemented by the following procedure using index X5.

1. Messages listed in the following item 2 are listed for each topic in the transmission selecting condition.

2. Using (i) a mobile phone number of a transmission user, a shop in the transmission selecting condition, a topic, and the lower limit of time, and (ii) a mobile phone number of a transmission user, a shop in the transmission selecting condition, a topic, and the upper limit of time as keys, messages having a matching mobile phone number, shop, and topic, and the time is greater than or equal to the lower limit and smaller than or equal to the upper limit are output, using index X5.

In the procedure described above, among data items owned by the transmission user, the data items satisfying the transmission selection condition are selected.

In the system, regarding the transmission selecting condition and the reception selecting condition which are connectable, the data items satisfying the transmission selecting condition always satisfy the reception selecting condition. Accordingly, evaluation on the reception selecting condition may be omitted.

(Reception Condition Adding Function and Others)

Reception data storage section 107 stores data sequences including a reception user mobile phone number, a data sequence of the reception selecting condition, a transmission user mobile phone number, a data sequence of the transmission selecting condition, and data sequences composed of the data sequence of the data as [reception user, reception selecting condition, transmission user, transmission selecting condition, data].

Reception data storage section 107 assigns indexes sorted by the following concatenation key to the data sequences.

X7: a reception user mobile phone number, a shop in the reception selecting condition, a transmission user mobile phone number, a shop in the transmission selecting condition The reception data adding function is implemented by storing data sequences of [reception user, reception selecting condition, transmission user, transmission selecting condition, data], by adding an entry specifying the data sequence to the tail of the entries having a matching sort key of index X7.

The reception data reception selecting condition removing function is implemented, using index X7, by listing data sequences of [reception user, reception selecting condition, transmission user, transmission selecting condition, data] having the matching specified reception user mobile phone number and the shop at the reception selecting condition, and by removing, from the listed data sequences, data sequences having a reception selecting condition specified by the reception selecting condition.

The reception data transmission selecting condition specifying removing function is implemented, using index X7, by listing data sequences of [reception user, reception selecting condition, transmission user, transmission selecting condition, data] having the matching specified reception user mobile phone number, the shop in the reception selecting condition, and by removing, from the listed data sequences, data sequences having a reception selecting condition specified by the reception selecting condition.

The reception data reception selecting condition searching function is implemented by listing, using index X7, data sequences of [reception user, reception selecting condition, transmission user, transmission selecting condition, data] having the matching specified reception user mobile phone number and the shop in the reception selecting condition, and by selectively listing, among the listed data sequences, data sequences having a reception selecting condition matching the specified reception selecting condition.

(Alias Searching Function)

Conversion storage section 103 stores, as [reception user, transmission user, alias], a data sequence including a reception user mobile phone number, a transmission user mobile phone number, and a unique 4-digit integer.

Conversion storage section 103 assigns the following indexes to the data sequences and stores the data sequences with the indexes.

X8: Reception user mobile phone number, transmission user mobile phone number

X9: Reception user mobile phone number, 4-digit integer

Conversion storage section 103 in the system includes pseudorandom number generating section that generates a pseudorandom number composed of a 4-digit integer. The pseudorandom number generating section may be configured by a known method for generating pseudorandom numbers.

The alias searching function is implemented by the following procedure.

1. Index X8 is searched using the reception user mobile phone number as the first key, and the transmission mobile phone number as the second key, and when a matching entry is found, a data sequence including [reception user, transmission user, alias] is returned.

2. When no matching entry is found, the next step is performed.

2.1. A 4-digit integer is generated by the pseudorandom number generating section, index X9 is searched using the reception user mobile phone number as the first key and the generated 4-digit integer as the second key, and when a matching entry is found, 2.1. is repeated again.

2.2. A data sequence including 4-digit integer having no matching entry, a transmission user mobile phone number, and a reception user mobile phone number is stored as [reception user, transmission user, alias], and adds an entry indicating the data sequence to indexes X8 and X9.

2.3. The data sequence is returned to the function which called the alias searching function.

(Transmission User Searching Function)

The transmission user searching function is implemented by the following procedure.

1. Search index X9 using a reception user mobile phone number as the first key, and a 4-digit integer as the second key, and returns a data sequence including [reception user, transmission user, alias] specified by the entry match.

In the system, input/output apparatus 200 and input/output control section 101 are connected by a network. Accordingly, input/output control section 101 treats input/output apparatus 200 as a port number connecting input/output apparatus 200. [Reception user, reception selecting condition] is represented as a data sequence similar to the data sequences described above, and [reception user, reception selecting condition, input/output apparatus 200] is handled as the data sequence with the port number representing input/output apparatus 200 added.

Input/output storage section 102 assigns indexes sorted by the following concatenation key to the data sequences, and stores the data sequences.

X0: Reception user mobile phone number, reception selecting condition

The reception display adding function, the reception display removing function, and reception input/output apparatus 200 searching function is implemented by an operation for storing or removing the data sequence of [reception user, reception selecting condition, input/output apparatus 200] and an operation on index X0.

The system uses a computer connected to a network by the port number above as input/output apparatus 200.

The computer includes a program for displaying, on a message board window, a reception data item received from a port for each [reception user, reception selecting condition], and a program for adding, to an input command and an information record, a port number representing input/output apparatus 200, and transmitting the data sequence to the port.

A program for displaying a message on the message board window sorts received messages by a sort key provided with the selection receiving command specifying the reception user and the reception selecting condition, and displays the received messages.

Using the system having the configuration described above, the user inputs, to input/output apparatus 200, a selection receiving command specifying the reception selecting condition and the reception granting condition, as the reception user. With this, with regard to a transmission user who has already input the selection transmitting command, and registered the conditions with a transmission selecting condition connectable to the reception selecting condition and the transmission granting condition specified, only when the transmission user and the reception user (the user himself) satisfy the reception granting condition and the transmission granting condition, respectively, among messages owned by the transmission user, messages satisfying both of the reception selecting condition and the transmission selecting condition can be displayed on a message board corresponding to the reception selecting condition of the reception user (the user himself).

The user inputs, as a transmission user, a selection transmitting command with a transmission selecting condition and the transmission granting condition specified to the system. With this, with regard to a reception user who has already input the selection receiving command with a reception selecting condition connectable to the transmission selecting condition, and the reception granting condition specified, and registered the conditions, only when the reception user and the transmission user (the user himself) satisfy the transmission granting condition and the reception granting condition, respectively, among messages owned by the transmission user, messages satisfying both of the reception selecting condition and the transmission selecting condition, among the messages owned by the transmission user (the user himself) can be displayed on a message board corresponding to the reception selecting condition of the reception user, in addition to the messages that have already been received.

Upon displaying messages on the message board, the identification information of the owner (transmission) user of each message is converted into an alias before display, including the identification of the user included in a comment.

With these operations, messages can be received and transmitted between unspecified users while limiting the partner of transmission/reception without disclosing identification information of the partner by a selecting condition regarding the message to be transmitted/received, and a granting condition regarding messages owned by the transmission user and the reception user.

The user can also remove the reception selecting condition that has been registered by the user himself and stop receiving and displaying messages performed by using the reception selecting condition, by inputting the reception condition removing command with the reception selecting condition specified.

The user can also remove the transmission selecting condition registered by the user himself and stop transmitting messages using the transmission selecting condition, remove messages received by the reception user by the transmission/reception from the reception data, and removes from the display to the reception user by inputting a transmission condition removing command by specifying the transmission selecting condition.

By inputting a data adding command including a new message, the user adds the message to owned messages of the user's own, and updates owned data of the user received and displayed by the reception user and the data received by the user as the reception user to available transmission/reception data in a state after the message is added.

By inputting a data removing command including the message identical to the owned message, the user removes the message from the owned messages of the user's own, and updates owned data of the user received and displayed by the reception user and the data received by the user as the reception user to available transmission/reception data in a state after the message is removed.

With the operations of the system, the user can exchange messages in real time limiting a transmission/reception partner, without mutually disclosing identification information.

Example 2

In the following Example 2, a public personal information database system treating information record-type personal information as data items, which is an example of a system implemented by modifying Embodiment described above will be described.

In the public personal information database system (hereafter referred to as the system), the configuration of each procedure described in Embodiment is changed and transmission/reception is actually performed only when the reception user inputs a selection receiving command from input/output apparatus 200.

Stated differently, in the same manner as the regular database search and the Internet search, changes in available transmission/reception are not reflected in real time to the display of the reception data item and the display to the reception user, in synchronization with changes in owned data, transmission selecting conditions, and transmission granting conditions, from the side of the transmission user.

Accordingly, in the system, the configuration of Embodiment is changed as follows, and the configuration after the change is applied to the specific data process.

In the system, since it is not necessary to use the reception condition removing command, the procedure for the reception condition removing command is omitted from the procedure performed by the input/output control section 101 and the procedure for receiving condition removing process is omitted from the procedure performed by data exchange section 104.

Furthermore, in the system, reception condition storage section 105 and input/output storage section 102 are removed from functional blocks configuring the system. Furthermore, in the system, a step using the function of reception condition storage section 105 and input/output storage section 102 and a step executed using the processing result of the functions are removed from the procedures by input/output control section 101 and data exchange section 104.

Note that, a data part of [owner user, data] handled by the system does not include a user identifier. Accordingly, in the third partial process, steps from SZ06 to SZ09 are omitted, and the process immediately proceeds from SZ05 to SZ10.

In addition, the first partial process is omitted from the procedure.

Furthermore, SA02 and SA03 are omitted from the selection receiving process procedure.

Furthermore, since it is not necessary to store the data item selectively received in the reception data storage section 107 after the data item is displayed to the reception user, SA04 is moved to immediately before or immediately after SA14, and all of the reception data items searched in SA13 are removed.

In the system, the reception data storage section 107 merely stores the reception data item transmitted/received by the selection receiving process temporarily before the data item is displayed by input/output apparatus 200.

Furthermore, SG04 is omitted from the selection receiving command process procedure.

All of steps at SC04 or after are omitted from the selection transmitting process procedure, and the process ends when SC03 ends.

In the selection transmitting command process procedure, the content in SI02 is changed to "input [SU, SS, SG] and perform "selection transmitting process" by data exchange section 104", and two subsequent partial processes and SI03 are omitted. Accordingly, the process ends when SI02 ends.

In the transmission condition removing process procedure, all of the steps at and after SD04 are omitted, and the process ends when SD02 ends.

In the transmission condition removing command process procedure, the process in SJ02 is changed to "input [SU, SS] and perform "transmission condition removing process" by data exchange section 104", and two subsequent partial processes and SJ03 are omitted. Accordingly, the process ends when SJ02 ends.

In data adding process procedure, all of the steps at and after SE03 are omitted, and the process ends when SE02 ends.

In data adding command process procedure, the process in SK02 is changed to "input [U, D] and perform "data adding process" by data exchange section 104", all of three partial processes and SK03 and SK04 are omitted, and only SK01 and SK02 are performed.

From the data removing process procedure, all of steps at and after SF03 are omitted, and the process ends when SF02 ends.

In the data removing command process procedure, the detail of SL02 is changed to "input [U, D] and performs "data removing process" by data exchange section 104". All of the three partial processes and SL03 and SL04 are omitted, and only SL01 and SL02 are performed.

As described above, the transmission/reception is performed in the system only when the reception user inputs the selection receiving command. The selection transmitting command and the transmission condition removing command merely adds (registers) or removes the transmission selecting condition and the transmission granting condition, and the data adding command and the data removing command merely adds and removes the owned data.

The personal information record handled by the system includes a plurality of fields, and each field includes a field name and a field value.

Each information record includes a field with a field name "owner" including a user ID of the owner.

In the following description, an example in which personal information record including the following fields is used as a data item is described.

Owner, age, height, weight, blood glucose level

In the following description, a value in each field is represented by adding "value" after the field (name). For example, a value in "age" field is referred to as "age value", and a value in "blood glucose level" field is referred to as "blood glucose level value".

For one owner (transmission user), information records having the same owner value are registered for each age, up until the user's current age.

Among the age values of the information records having the same owner value, the largest age value represents the owner's current age.

The owned data storage section 108 stores the information records as rows of a table having each field as a column.

The rows are treated as data sequences including field names and field values separated by commas ",".

The data sequences are referred to as data information records.

Owner, user159, age, 15, height, 155, weight, 46, blood glucose level, 80
Owner, user159, age, 18, height, 162, weight, 44, blood glucose level, 65
Owner, user314, age, 17, height, 165, weight, 50, blood glucose level, 75

The data information record is used as (transmission user, data) in the system.

The reception selecting condition and the transmission selecting condition include a field name to be combined and received (searched) and two values representing the lower limit and the upper limit of a range of field values that the user wishes to receive in combination separated by commas "," are arranged in an order from age, height, weight, and blood glucose level separated by commas ",".

An equal sign "=" before a value representing the upper limit or the lower limit indicates that the upper limit or the lower limit includes the value.

For example, the following reception selecting condition specifies reception of "age and weight data" satisfying (the same information record) "an age value of 18 or lower, and a weight value greater than or equal to 45 and smaller than 55".

Age, =18, weight, =45, 55

In the system, the reception selecting condition and the transmission selecting condition are "connectable" when the conditions are set such that a data item satisfying the reception selecting condition always satisfies the transmission selecting condition.

Stated differently, when the field name in the reception selecting condition and the field name specified by the transmission selecting condition match and when the range of field values in the reception selecting condition is included in the range of field values in the transmission selecting condition, the conditions are treated as "connectable".

A reception granting condition and a transmission granting condition stored in association with the reception selecting condition and the transmission selecting condition specify a data item that a transmission user and a reception user must own (an essential information record) and a data item that the user must not own (prohibited information record) in a form similar to the reception selecting condition described above.

For example, a reception granting condition indicating that the reception of a data item owned by a user who owns an information record satisfying "height value over 160" and who does not own an information record satisfying "age value over 18" is represented by the following two data sequences.

Height, 160,
Age, 18,

To put it differently, the condition represents a user who "is 18 years old or younger at present, and has height already (or once) passed 160".

In the system, the user (reception user, transmission user) is identified by a user ID in the system.

[Reception user, reception selecting condition, reception granting condition] and [transmission user, transmission selecting condition, transmission granting condition] are represented as follows, for example, by separating the user ID and each data sequence by "/".

user314/age, =18, weight, =45, 55/height, 160, /age, 18,

In the data sequence, a data sequence corresponding to [reception user, reception selecting condition] or [transmission user, transmission selecting condition] is [user314/age, =18, weight, =45, 55]. In addition, a data sequence corresponding to the reception granting condition or the transmission granting condition is [/height, 160, /age, 18,].

In the system, the selection transmitting command and the transmission condition removing command do not perform transmission and reception, the transmission selecting condition only necessary for transmission/reception is omitted from [reception user, reception selecting condition, transmission user, transmission selecting condition, data], and [reception user, reception selecting condition, transmission user, data] is used as the reception data item.

In the system, a data sequence [reception user, reception selecting condition, transmission user, data] is obtained by selecting and combining a data sequence corresponding to [reception user, reception selecting condition] and a data sequence of a field specified as the reception selecting condition, that is, [reception user, reception selecting condition, transmission user, selected data].

[Reception user, reception selecting condition, alias, selected data] output by input/output control section 101 to input/output apparatus 200 is a data sequence obtained by the transmission user (user ID) of the data sequence to an alias composed of a 4-digit integer, in the same manner as Example 1.

[Reception user, transmission user, alias] is a data sequence obtained by concatenating user IDs of the reception user and the transmission user, and an alias composed of a 4-digit integer.

In the system, input/output apparatus 200 is connected to the network, in the same manner as Example 1. A data sequence [reception user, reception selecting condition, input/output apparatus 200] is generated by concatenating a data sequence corresponding to [reception user, reception selecting condition] described above and a connection port number to input/output apparatus 200.

(Transmission Condition Removing Function, Transmission Condition Adding Function)

Transmission condition storage section 106 stores the data sequences of [transmission user, transmission selecting condition, transmission granting condition], and assigns indexes sorted by the following concatenation keys to the data sequences.

X3: A character string connecting each field name in the transmission selecting condition in an order of appearance in the data information record.

X4: Transmission user ID, data sequence of the transmission selecting condition

The transmission condition removing function is implemented by determining, using index X4, a data sequence of [transmission user, transmission selecting condition, transmission granting condition] including a data sequence of the input transmission user ID and the transmission selecting condition, and removes the data sequence (and removes each entry of indexes X3 and X4 specifying the data sequences).

The transmission condition adding function is implemented by storing a data sequence of [transmission user, transmission selecting condition, transmission granting condition], and adding, using index X3, an entry specifying the data sequence to a part for adding an entry having a character string connecting field names of the input transmission selecting condition in an order of appearance in the data information record, (if matching entries exist, at the end of the entries), and adding, using index X4, an entry specifying the data sequence at a part for adding an entry having the input transmission user ID and a data sequence of the transmission selecting condition as keys.

(Transmission Selecting Condition Searching Function)

Figure 23:
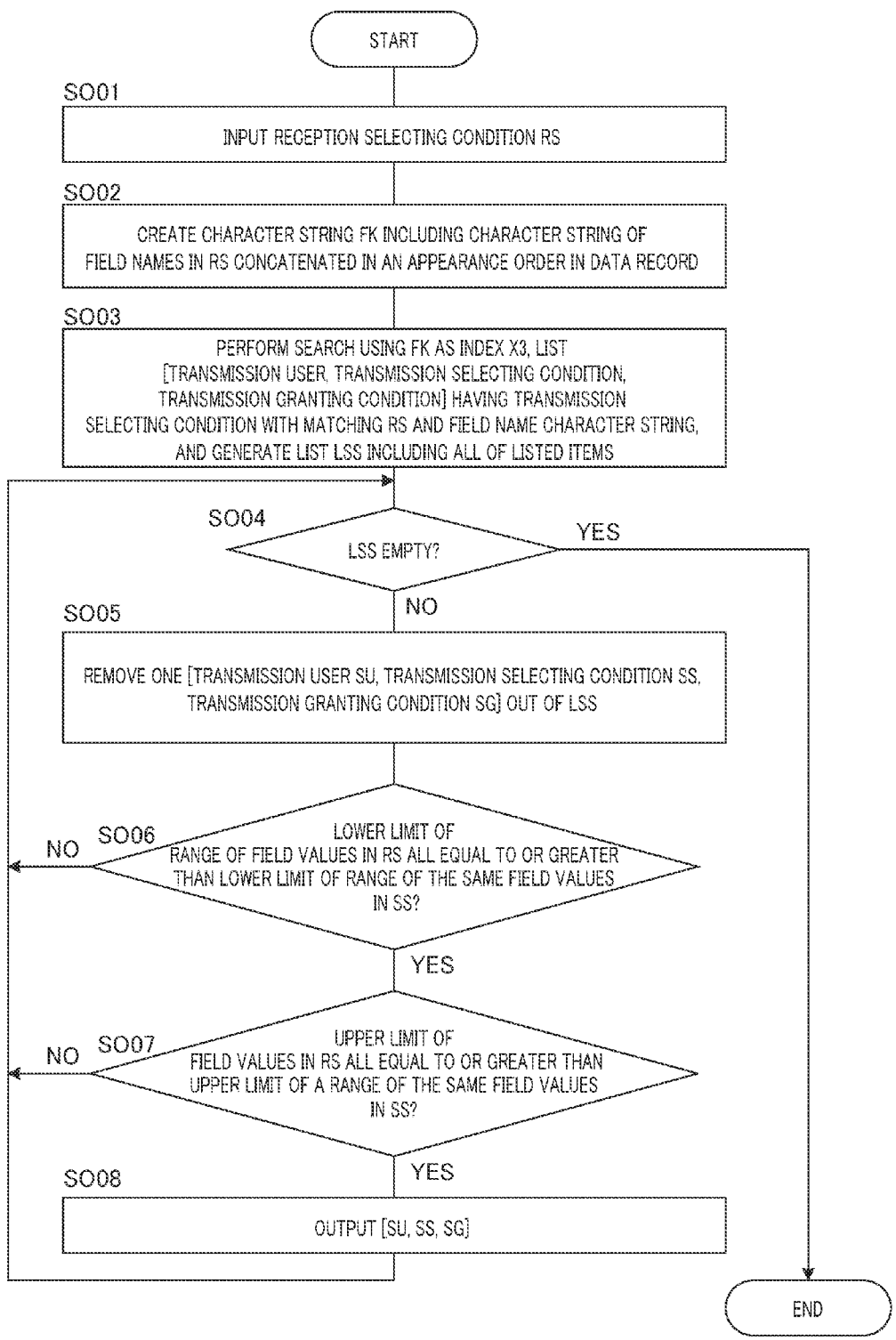
FIG. 23 is a flowchart illustrating a process for implementing searching function for transmission selecting condition according to Example 2 of the data exchange system according to the present invention.

FIG. 23 is a flowchart illustrating the process for implementing the transmission selecting condition searching function.

The system first receives an input of reception selecting condition RS (SO01).

Subsequently, the system creates character string FK including a character string of field names in RS concatenated in the appearance order in the data information record (SO02).

The system subsequently searches index X3 using FK as a key, lists [transmission user, transmission selecting condition, transmission granting condition] having a transmission selecting condition with field name character string matching with RS, and generates a list LSS including the listed items (SO03).

The system subsequently determines whether or not LSS is empty (SO04). If the determination in SO04 is yes, the system ends the process.

In contrast, if the determination in SO04 is no, the system removes one [transmission user SU, transmission selecting condition SS, transmission granting condition SG] out of LSS (SO05).

With regard to SS, the system subsequently determines whether or not the lower limit of a range of the field values in the RS is greater than or equal to the lower limit of the range of the field values under the same name in the SS (SO06).

If the determination in SO06 is no, the process returns to SO04, and the system determines whether or not LSS is empty again. Subsequently, the system repeats the process from SO04 to SO06 as long as the determination in SO04 is no, and the determination in SO06 is no.

In contrast, if the determination in SO06 is yes, the system determines whether the upper limit of the range of the field values in the RS is smaller than or equal to the upper limit of the range of the field values under the same name in SS (SO07).

If the determination in SO07 is no, the process returns to SO04, and the system determines whether or not LSS is empty again. Subsequently, the system repeats the process from SO04 to SO07 as long as the determination in SO04 is no, the determination in SO06 is yes, and the determination in SO07 is no.

In contrast, if the determination in SO07 is yes, the system outputs [SU, SS, SG] (SO08). Subsequently, the process returns to SO04, and the system determines whether or not LSS is empty again. Subsequently, the system repeats the process from SO04 to SO08 as long as the determination in SO04 is no, the determination in SO06 is yes, and the determination in SO07 is yes.

By implementing the procedure, [transmission user, transmission selecting condition, transmission granting condition] having field names specified in the transmission selecting condition matching the field names in the input reception selecting condition, and the range of field values in the reception selecting condition is included in the range of field values under the same names in the transmission selecting condition is output.

(Owned Data Adding Function, Owned Data Removing Function)

Owned data storage section 108 stores the data sequences of the data information record as [owner user, data], and assigns indexes sorted by the following concatenation key to the data sequences.

X5: Owner user ID, data sequence of data information record

The owned data adding function is implemented by storing the data information record above, and adding an entry indicating the message to index X5.

The owned data removing function is implemented by searching index X5, specifying a data information record matching the input data information record, removing the specified data information record, and removing an entry of index X5 representing the specified record.

(Granting Condition Determining Function)

Granting condition determining function is implemented by the following procedure using index X5.

1. The system lists, using index X5, data information records having an input transmission user ID matching (represented by an entry) the owner user ID of the first key, and determines whether or not each of the data information records is an essential information record or a prohibited information record based on the reception granting condition.

More specifically, the system determines whether or not a field value specified as an essential information record or a prohibited information record is in a specified range by comparing the lower limit and the upper limit that are specified with the field values in the listed data information records.

When at least one data information record determined as the essential information record exists and when no data information record determined as a prohibited information record exists, the system determines that the reception granting condition with regard to the transmission user is satisfied.

2. The system lists, using index X5, a data information record having an input reception user ID matching an owner user ID of the first key (specified by an entry), and determines whether or not each of the data information records is the essential information record or the prohibited information record for the transmission granting condition.

More specifically, the system determines whether or not a field value specified as an essential information record or a prohibited information record is in a specified range by comparing the lower limit and the upper limit that are specified with the field values in the listed data information records.

When at least one data information record determined as the essential information record exists, and when no data information record satisfying the prohibited information record exists, the system determines that the transmission granting condition is satisfied with regard to the reception user.

3. When the determination shows that both the reception granting condition and the transmission granting condition are satisfied, the system determines that the reception granting condition and the transmission granting condition are satisfied.

(Selection Condition Searching Function)

The selection condition searching function is implemented by the following procedure using index X5.

1. The system lists, using index X5, data information records having an owner ID of the first key matching the input transmission user ID (specified by an entry), and determines whether or not field values are in a range of field values specified by the reception selecting condition.

More specifically, the system performs the determination by comparing the specified lower limit and the specified upper limit with the field values in the data information records.

2. After the determination, the system extracts a transmission user ID and each field name and each field value that are specified, for each data information record including a field value in a range of field value specified in the reception selecting condition, and creates a data sequence including concatenated transmission ID, field names, and values, and outputs the data sequence as [transmission user, selected data].

(Received Data Adding Function, Received Data Reception Selecting Condition Removing Function, Received Data Reception Selecting Condition Searching Function)

Reception data storage section 107 stores the data sequences of [reception user, reception selecting condition, transmission user, selected data] described above, and assigns indexes sorted by the following concatenation key to the data sequences.

X7: Reception user ID, data sequence of the reception selecting condition

The reception data adding function is implemented by adding a data sequence of [reception user, reception selecting condition, transmission user, selected data] and adding an entry representing the data sequence to the tail of entries having a match with the sort key in index X7.

The received data reception selecting condition removing function is implemented, using index X7, by listing data sequences of [reception user, reception selecting condition, transmission user, selected data] matching data sequences of the specified reception user ID and the data sequence of the reception selecting condition, removing the listed data sequences, and removing each entry of index X7 representing the data sequences.

The reception data reception selecting condition searching function is implemented by listing data sequences of [reception user, reception selecting condition, transmission user, selected data] matching the specified reception user ID and data sequences of the reception selecting condition, and outputting the listed data sequences.

Conversion storage section 103 stores the data sequences of [reception user, transmission user, alias] described above, and assigns indexes sorted by the following concatenation keys to the data sequences.
X8: Reception user ID, transmission user ID
X9: Reception user ID, 4-digit integer Conversion storage section 103 in the system includes a pseudorandom number generating section that generates a 4-digit integer pseudorandom number in the same manner as conversion storage section 103 in Example 1, the alias searching function and the transmission user searching function can be implemented by using a reception user ID instead of a reception user mobile phone number, and a transmission user ID instead of a transmission user mobile phone number, in a procedure for implementing the functions in Example 1.

Input/output storage section 102 stores data sequences of [reception user, reception selecting condition, input/output apparatus 200] described above, and assigns indexes sorted by the following concatenation key to the data sequences.
X0: Reception user ID, data sequence of the reception selecting condition The reception display adding function, the reception display removing function, and reception input/output apparatus 200 searching function are implemented by an operation for storing or removing the data sequence of [reception user, reception selecting condition, input/output apparatus 200] and an operation on index X0.

In the same manner as Example 1, a computer connected to the network using the port number is used as input/output apparatus 200 in the system.

The computer includes a program for displaying reception data received from a port for each [reception user, reception selecting condition] and a program for adding a port number representing input/output apparatus 200 to an input command and an information record, and transmitting the data to the port.

Using the system having the configuration described above, the user inputs, to input/output apparatus 200, a selection receiving command specifying the reception selecting condition and the reception granting condition, as the reception user. With this, with regard to a transmission user who specifies a transmission selecting condition connectable to the reception selecting condition and a transmission granting condition, and inputs a selection transmitting command for registering the conditions, only when the transmission user and the reception user (the user himself) satisfies the reception granting condition and the transmission granting condition, respectively, the data item satisfying both the reception selecting condition and the transmission selecting condition can be associated with the reception selecting condition of the reception user (the user himself), and the data item can be displayed on input/output apparatus 200.

The user inputs, as a transmission user, a selection transmitting command specifying a transmission selecting condition and a transmission granting condition to the system.

With this, the transmission user has registered the transmission selecting condition and the transmission granting condition associated with the user himself. Hence, thereafter with regard to a reception user, a selection receiving command with a reception selecting condition connectable to the transmission selecting condition and a reception granting condition are specified, only when the reception user and the transmission user (the user himself) satisfies the transmission granting condition and the reception granting condition, respectively, a data item satisfying both the reception selecting condition and the transmission selecting condition among the data items owned by the transmission user can be associated with the reception selecting condition of the reception user, and the data item can be displayed on input/output apparatus 200.

Upon the display on input/output apparatus 200, the identification information of owner (transmission) user of each data item is converted into an alias and the alias is displayed.

With the operations described above, the present invention restricts a transmission/reception partner by a selection condition regarding data to be transmitted/received and a granting condition with regard to the data owned by the transmission user and the reception user, and transmits/receives personal information data other than the identification information between unspecified users without specifying or disclosing the identification information of the partner.

In addition, the user can remove the transmission selecting condition (and transmission granting condition) that the user has already registered, by inputting the transmission condition removing command specifying the transmission selecting condition. Subsequently, even if a reception user inputs a selection receiving commend with a reception selecting condition connectable to the transmission selecting condition and the reception granting condition, the reception user does not receive the owned data of the transmission user (the user himself) which satisfies both the transmission selecting condition that has been removed and the reception selecting condition.

Furthermore, the user can add the data information record to the data information record owned by the user himself by inputting a data adding command including a new data information record. Thereafter, the user can add the data information record to the data item to be transmitted/received when the selection receiving command is input, and the presence of the data information record affects the determination/judgment of the reception granting condition and the transmission granting condition.

Similarly, the user can remove the data information record from the data information records owned by the user by inputting a data removing command including the same data information record as a data information record owned by the user. Thereafter, the user can remove the data information record from the data to be transmitted/received when the selection receiving command is input, and the absence of the data information record affects the determination/judgment of the reception granting condition and the transmission granting condition.

With these operations of the system, the user can exchange (search) personal information data other than the identification information while limiting the partner for transmission/reception and without mutually disclosing the identification information.

Note that, the present invention is not limited to Embodiment including Example 1 or Example 2. The present invention can be implemented as arbitrary system 100 which includes selecting (determining) a pair of [reception user, reception selecting condition, reception granting condition] and [transmission user, transmission selecting condition, transmission granting condition] having the reception selecting condition and the transmission selecting condition that are connectable to each other and the reception granting condition and the transmission granting condition satisfied by the data item owned by the reception user and the transmission user who set the conditions, selecting (determining), among the data items owned by the transmission user, at least one [transmission user, data] having data items satisfying both [reception selecting condition, transmission selecting condition], and determining as (storing) the selected [transmission user, data] in association with [reception user, reception selecting condition].

In Example 1, all of transmission/reception available based on the owned data and conditions in system 100 is performed, and the state stored as the reception data item is maintained in real time by a change in the reception data according to the change in the owned data and the conditions. In Example 2, all of transmission/reception available through the specified (reception user and) reception selecting condition and the reception granting condition are performed, and the reception data is displayed.

However, these are merely examples of the method for selecting transmission/reception to be executed among available transmission/reception. The present invention can be implemented by including at least one of available transmission/reception.

For example, in Example 2, an upper limit for the number of transmission/reception to be executed in one command is provided, and when transmission/reception exceeding the upper limit are available, only transmission/reception as many as the upper limit may be executed, instead of executing all of the transmission/reception that are available.

Furthermore, in the embodiment, transmission/reception is performed in synchronization with the command input by the user. However, the present invention is not limited to the operation. System 100 may perform transmission/reception regularly, and the user can search and view [reception user, reception selecting condition, transmission user, transmission selecting condition, data] stored in reception data storage section 107, specifying [reception user, reception selecting condition].

Note that, in Embodiment and Examples, a search for a connectable transmission selecting condition, that is, determination on whether or not the condition is connectable is performed for selecting a transmission selecting condition or a reception selecting condition that are connectable to a reception selecting condition of one reception user or a transmission selecting condition of one transmission user from transmission selecting conditions or reception selecting conditions of a plurality of users. More specifically, in Embodiment and Examples, connectable transmission selecting conditions or reception selecting conditions of the users are selected from the transmission selecting conditions or the reception selecting conditions of a plurality of the users. The present invention is not limited to this operation, and the reception selecting condition of the specified reception user and the transmission selecting condition of the transmission user may be determined as to whether the conditions are connectable, and transmission/reception (disclosure/non-disclosure of data) may be performed between the reception user and the transmission user based on the determination result.

For example, with regard to mobile game machines, game machines encountering each other at a close range mutually exchange data. In the data exchange system, a reception user and a transmission user are already determined when transmission/reception is necessary. According to the present invention, reception selecting conditions, reception granting conditions, transmission selecting conditions, and transmission granting conditions specified by the users (usually set in advance and stored) are exchanged first between the predetermined users (game machines), and determination on availability of transmission/reception and determination on data to be transmitted/received can be determined based on the conditions and the data items owned by the users mutually, by one of the game machines, or a remote server.

Alternatively, the present invention may be implemented using the reception selecting condition and the transmission selecting condition only, without the reception granting condition and the transmission granting condition.

Even in this case, the transmission user can transmit the data owned by the user himself and satisfying the transmission user's transmission selecting condition only to a reception user who set the reception selecting condition connectable to the transmission selecting condition, without specifying a partner.

Furthermore, in this case, by setting the reception selecting condition, the reception user can receive the data satisfying the reception selecting condition (and transmission selecting condition) only from the data owned by the transmission user who set a transmission selecting condition connectable to the reception selecting condition, without specifying the partner.

According to the present invention, the content of the reception selecting condition and the transmission selecting condition, and a standard for determining whether the conditions are "connectable or not" may be changed into various modifications according to the purpose of specific data or data exchange.

For example, in Example 1, a standard "a match in a topic at the beginning of a data sequence specifying the topic" may be added to a standard for determining whether or not the conditions are connectable. The addition can be made by, for example, inserting a determination step having a role similar to the determination steps before and after "the beginning of the topic in SS matches the beginning of the topic in RS?" between steps SM06 and SM07, and between steps SN06 and SN07.

As described above, according to the present invention, the determination standard on whether or not the conditions are connectable is not limited to a standard with regard to a set of data selected by the reception selecting condition and the transmission selecting condition.

Furthermore, according to the present invention, transmission/reception may not be limited to transmission/reception between users having a reception selecting condition and a transmission selecting condition that are connectable, the partner for transmission/reception is limited using only a reception granting condition or a transmission granting condition, and transmission/reception is performed without specifying the partner but limiting the partner.

In this case, the reception selecting condition or the transmission selecting condition are used only as a condition for selecting data transmitted/received between a reception user and a transmission user available for transmission/reception.

According to the present invention, conditions such as the reception selecting condition, the transmission selecting condition, the reception granting condition, and the transmission granting condition may be included in the data owned by the user. More advanced restriction on the communication partner and the data can be set by specifying a condition regarding the conditions themselves as a part of the conditions or by including a step for evaluating/determining a result of evaluation/determination of the conditions to a procedure for evaluating/determining the condition.

INDUSTRIAL APPLICABILITY

The present invention is applicable to a data exchange system and a data exchange system for exchanging data on a network.

REFERENCE SIGNS LIST

100 Data exchange system
101 Input/output control section
102 Input/output storage section
103 Conversion storage section
104 Data exchange section
105 Reception condition storage section
106 Transmission condition storage section
107 Reception data storage section
108 Owned data storage section
200 Input/output apparatus

The invention claimed is:

1. A data exchange apparatus which is used for exchanging data between a transmission user who transmits the data and a reception user who receives the data, and in which a transmission selecting condition is a condition set by the transmission user for selecting a data item to be transmitted, and a reception selecting condition is a condition set by the reception user for selecting a data item to be received, the data exchange apparatus comprising a memory; and
a data exchange section determines whether each pair of a transmission selecting condition and a reception selecting condition in the memory satisfies a standard regarding of relationship between the transmission selecting condition and the reception selecting condition, and selects the pair of the transmission selecting condition and the reception selecting condition that satisfy the standard, wherein
the data exchange section exchanges a data item satisfying both the transmission selecting condition and the reception selecting condition in the selected pair between a transmission user and a reception user corresponding to the transmission selecting condition and the reception selecting condition in the selected pair, and
neither the transmission selecting condition nor the reception selecting condition specify either the transmission user or the reception user within the selecting condition.

2. The data exchange apparatus according to claim 1, wherein
the data exchange section determines whether or not the standard is satisfied based on a feature of a reception selecting condition and a transmission selecting condition in representation.

3. The data exchange apparatus according to claim 1, wherein:
the transmission user owns data and transmits the owned data;
the reception user owns data and receives data;
a transmission granting condition is a condition set by the transmission user for each transmission selecting condition, for selecting a reception user who is allowed to receive a data item satisfying the transmission selecting condition;
a reception granting condition is a condition set by the reception user for each reception selecting condition, for selecting a transmission user who is allowed to transmit a data item satisfying the reception selecting condition;
the data exchange section includes a step of determining, for each pair of the transmission granting condition and the reception granting condition, whether or not a transmission user corresponding to the transmission granting condition in the pair satisfies the reception granting condition in the pair and a reception user corresponding to the reception granting condition in the pair satisfies the transmission granting condition in the pair; and
the data exchange section exchanges a data item satisfying both the transmission selecting condition and the reception selecting condition in the selected pair between a transmission user and a reception user who correspond to the transmission selecting condition and the reception selecting condition in the selected pair and are determined as mutually satisfying a reception granting condition and a transmission granting condition, respectively set by the reception user and the transmission user.

4. The data exchange apparatus according to claim 1, further comprising
a conversion storage section that stores a correspondence between an alias and user identification information of a user represented by the alias; and
an input/output control section that replaces an alias included in an input data item with user identification information corresponding to the alias with reference to the conversion storage section, and replaces user identification information included in an output data item and user identification information assigned to the output data item with an alias corresponding to the user identification information with reference to the conversion storage section.

5. A data exchange apparatus used for exchanging data between a transmission user who owns data and transmits the owned data and a reception user who owns data and receives data,
a transmission granting condition being a condition set by the transmission user for each transmission selecting condition, with regard to the data owned by the reception user, for selecting a reception user who is allowed to receive a data item satisfying the transmission selecting condition,
a reception granting condition being a condition set by the reception user for each reception selecting condition, with regard to the data owned by the transmission user, for selecting a transmission user who is allowed to transmit a data item satisfying the reception selecting condition, the data exchange apparatus comprising
a memory; and
a data exchange section determines, for each pair of the transmission granting condition and the reception granting condition in the memory, whether or not a transmission user corresponding to the transmission granting condition in the pair satisfies the reception granting condition in the pair and a reception user corresponding to the reception granting condition in the pair satisfies the transmission granting condition in the pair, and selects a pair of a transmission user and a reception user who mutually satisfying a reception granting condition and a transmission granting condition, respectively set by the reception user and the transmission user, and the data exchange section exchanges a data item between the transmission user and the reception user in the selected pair, wherein neither the transmission selecting condition nor the reception selecting condition specify either the transmission user or the reception user within the selecting condition.

6. The data exchange apparatus according to claim 5, wherein a transmission selecting condition is a condition set by the transmission user for selecting a data item, a reception selecting condition is a condition set by the reception user for selecting a data item, the data exchange section determines whether or not each pair of-the transmission selecting condition and the reception selecting condition in the memory satisfies a standard regarding of relationship between the transmission selecting condition and the reception selecting condition, and the data exchange section exchanges a data item satisfying both the transmission selecting condition and the reception selecting condition in the selected pair between a transmission user and a reception user who correspond to the transmission selecting condition and the reception selecting condition in the selected pair and are determined as mutually satisfying a reception granting condition and a transmission granting condition each set by a communication partner.

7. The data exchange apparatus according to claim 5, further comprising a conversion storage section that stores a correspondence between an alias and user identification information of a user represented by the alias; and an input/output control section that replaces an alias included in an input data item with user identification information corresponding to the alias with reference to the conversion storage section, and replaces user identification information included in the output data item and user identification information assigned to an output data item with an alias corresponding to the user identification information with reference to the conversion storage section.

8. A data exchange method which is used for exchanging data between a transmission user who transmits data and a reception user who receives data, and in which a transmission selecting condition is a condition set by the transmission user for selecting a data item to be transmitted, and a reception selecting condition is a condition set by the reception user for selecting a data item to be received, the data exchange method comprising:

determining whether or not each pair of a transmission selecting condition and a reception selecting condition in the memory satisfies a standard regarding of relationship between the transmission selecting condition and the reception selecting condition;

selecting the pair of the transmission selecting condition and the reception selecting condition that satisfy the predetermined standard; and exchanging a data item satisfying both the transmission selecting condition and the reception selecting condition in the selected pair between a transmission user and a reception user corresponding to the transmission selecting condition and the reception selecting condition in the selected pair, wherein neither the transmission selecting condition nor the reception selecting condition specify either the transmission user or the reception user within the selecting condition.

9. A data exchange method used for exchanging data between a transmission user who owns data and transmits the owned data and a reception user who owns data and receives data, a transmission granting condition being a condition set by the transmission user for each transmission selecting condition, with regard to the data owned by the reception user who is allowed to receive a data item satisfying the transmission selecting condition, for selecting a reception user, a reception granting condition being a condition set by the reception user, with regard to the data owned by the transmission user, for selecting a transmission user, the data exchange method comprising:

determining, for each pair of the transmission granting condition and the reception granting condition, whether or not a transmission user corresponding to the transmission granting condition in the pair satisfies the reception granting condition in the pair and a reception user corresponding to the reception granting condition in the pair satisfies the transmission granting condition in the pair, selecting a pair of a transmission user and a reception user who mutually satisfying a reception granting condition and a transmission granting condition, respectively set by the reception user and the transmission user, and exchanging a data item between the transmission user and the reception user in the selected pair.

10. The data exchange apparatus according to claim 1, wherein the standard comprises a match of keywords in the transmission selecting condition and the reception selecting condition.

11. The data exchange method according to claim 8, wherein the standard comprises a match of keywords in the transmission selecting condition and the reception selecting condition.

\* \* \* \* \*